United States Patent
Vinayak et al.

(10) Patent No.: US 9,383,895 B1
(45) Date of Patent: Jul. 5, 2016

(54) METHODS AND SYSTEMS FOR INTERACTIVELY PRODUCING SHAPES IN THREE-DIMENSIONAL SPACE

(71) Applicants: F. Vinayak, West Lafayette, IN (US); Hairong Liu, West Lafayette, IN (US); Karthik Ramani, West Lafayette, IN (US); Raja Jasti, Cupertino, CA (US)

(72) Inventors: F. Vinayak, West Lafayette, IN (US); Hairong Liu, West Lafayette, IN (US); Karthik Ramani, West Lafayette, IN (US); Raja Jasti, Cupertino, CA (US)

( * ) Notice: Subject to any disclaimer, the term of this patent is extended or adjusted under 35 U.S.C. 154(b) by 231 days.

(21) Appl. No.: 13/886,691

(22) Filed: May 3, 2013

Related U.S. Application Data

(60) Provisional application No. 61/643,252, filed on May 5, 2012, provisional application No. 61/671,773, filed on Jul. 15, 2012.

(51) Int. Cl.
| | |
|---|---|
| *G06F 3/0481* | (2013.01) |
| *G06F 3/042* | (2006.01) |
| *G06F 3/01* | (2006.01) |
| *G06T 19/20* | (2011.01) |
| *G06T 19/00* | (2011.01) |

(52) U.S. Cl.
CPC ............ *G06F 3/04815* (2013.01); *G06F 3/017* (2013.01); *G06F 3/011* (2013.01); *G06F 3/0426* (2013.01); *G06T 19/00* (2013.01); *G06T 19/20* (2013.01); *G06T 2219/2016* (2013.01); *G06T 2219/2021* (2013.01)

(58) Field of Classification Search
CPC ....... G06F 3/017; G06F 3/011; G06F 3/0426; G06F 3/04815; G06T 19/20; G06T 19/00; G06T 2219/2016; G06T 2219/2021
See application file for complete search history.

(56) References Cited

U.S. PATENT DOCUMENTS

| | | | |
|---|---|---|---|
| 4,600,919 A | 7/1986 | Stern | |
| 5,877,778 A | 3/1999 | Dow et al. | |
| 6,104,412 A | 8/2000 | Tsutsuguchi et al. | |
| 6,317,130 B1 | 11/2001 | Ishikawa et al. | |
| 7,095,401 B2 | 8/2006 | Liu et al. | |
| 7,212,197 B1 | 5/2007 | Schkolne et al. | |
| 7,308,112 B2 | 12/2007 | Fujimura et al. | |
| 7,519,223 B2 | 4/2009 | Dehlin et al. | |
| 8,232,990 B2 * | 7/2012 | King et al. | 345/419 |
| 8,558,759 B1 * | 10/2013 | Prada Gomez et al. | 345/7 |
| 2005/0275638 A1 * | 12/2005 | Kolmykov-Zotov et al. | 345/179 |
| 2008/0013793 A1 * | 1/2008 | Hillis et al. | 382/114 |
| 2009/0006292 A1 * | 1/2009 | Block | 706/20 |
| 2010/0034462 A1 | 2/2010 | Nevatia et al. | |

(Continued)

OTHER PUBLICATIONS

Alexa, et al., "As-Rigid-As-Possible Shape Interpolation", SIGGRAPH 2000, pp. 157-164.

(Continued)

*Primary Examiner* — Ting Lee
(74) *Attorney, Agent, or Firm* — Pillsbury Winthrop Shaw Pittman LLP

(57) ABSTRACT

A system and method for 3D design includes defining a three-dimensional virtual interaction space visualized with a 3D camera system operable to generate three-dimensional coordinate data corresponding to physical objects within the interaction space. A physical gesture of the user within the interaction space is interpreted according to pre-determined rules, the physical gesture including a movement of a physical object. A virtual shape is generated or manipulated in response to the interpretation of the physical gesture, the virtual shape residing virtually within the interaction space. A representation of the virtual 3D shape is interactively displayed during the physical gesture.

29 Claims, 54 Drawing Sheets

Frequent Pattern

Outliers

(56) References Cited

U.S. PATENT DOCUMENTS

| | | | |
|---|---|---|---|
| 2010/0199228 A1 | 8/2010 | Latta et al. | |
| 2011/0164129 A1 | 7/2011 | Postolov et al. | |
| 2012/0001875 A1* | 1/2012 | Li et al. | 345/177 |
| 2013/0057469 A1* | 3/2013 | Ajika | 345/156 |

OTHER PUBLICATIONS

Angelidis, et al., "Swirling-sweepers: Constant-volume Modeling"; Graphical Models, vol. 68, 2006, pp. 324-332.

Argyros, et al., "Binocular Hand Tracking and reconstruction Based on 2D Shape Matching", Proc. of $18^{th}$ Int'l Conf. on Pattern Recognition, 2006, pp. 1-4.

Athistos, et al., "Estimating 3D Hand Pose from a Cluttered Image", Proc. of IEEE Computer Soc. Conf. on Computer vision and Pattern Recognition, 2003, pp. 1-8.

Barr, Alan H., "Global and Local Deformations of Solid Primitives", Computer Graphics, vol. 18, No. 3, Jul. 1984, pp. 21-30.

Botsch, et al., "An Intuitive Framework for Real-Time Freeform Modeling", Computer Graphics Group, ACM, 2004, pp. 630-634.

Chang, et al., "Direct Manipulation of Generalized cylinders Based on B-Spline Motion", The Visual Computer, vol. 14, 1998, pp. 228-239.

Chaudhuri, et al., "Data-driven Suggestions for Creativity Support in 3D Modeling", ACM Transactions on Graphics, vol. 29, No. 6, Article 183, Dec. 2010, pp. 1-9.

Chaudhuri, et al., "Probabilistic Reasoning for Assembly-Based 3D Modeling", ACM Transactions on Graphics, vol. 30, No. 4, Article 35, Jul. 2011, pp. 1-9.

Cheshire, D. G., Evans, M. A., & Dean, C. J. (Jul. 2001). Haptic modeling an alternative industrial design methodology. In Proceedings of eurohaptics (vol. 2001, pp. 124-128).

Choi, Jaewon, "Developing a 3-Dimensional Kinematic Model of the Hand for Ergonomic Analyses of Hand Posture, Hand Space Envelope and Tendon Excursion", Ph.D. Thesis, University of Michigan—Mechanical Engineering, 2008, pp. 1-178.

Choi, et al., "Sweep Surfaces Modeling Via Coordinate Transformations and Blending", Computer Aided Design, vol. 22, No. 2, Mar. 1990, pp. 87-96.

Cobos, et al., "Efficient Human Hand Kinematics for Manipulation Tasks", IEEE/RJS Int'l Conf. on Intelligent Robots and Systems, Sep. 22-26, 2008, pp. 2246-2251.

Comaniciu, et al., "Mean Shift: A Robust Approach Toward Feature Space Analysis", IEEE Transactions on Pattern Analysis and Machine Intelligence, vol. 14, No. 5, May 2002, pp. 603-619.

Erol, et al., "A review on Vision-Based Full DOF Hand Motion Estimation", Proc. of the 2005 IEEE Computer Soc. Conf. on Computer Vision and Pattern Recognition, 2005, pp. 1-8.

Feix, T., Pawlik, R., Schmiedmayer, H., Romero, J., & Kragic, D. (Jun. 2009). A comprehensive grasp taxonomy. In Robotics, Science and Systems: Workshop on Understanding the Human Hand for Advancing Robotic Manipulation (pp. 2-3).

Forstmann et al., "Deformation Styles for Spline-based Skeletal Animation", Eurographics, ACM SIGGRAPH Sump. on Computer Animation, 2007, pp. 1-10.

Fuge, et al., "Conceptual Design and Modification of Freeform Surfaces Using Dual Shape Representations in Augmented Reality Environments", Computer-Aided Design, 2011, pp. 1-13.

Hamer, et al., "Tracking a Hand Manipulating an Object", IEEE $12^{th}$ Int'l. Conf on Computer Vision, 2009, pp. 1475-1482.

Hirota, et al., "Fast Volume-Preserving Free form Deformation Using Multi-Level Optimization", $5^{th}$ Fymp. on solid Modeling, 1999, pp. 234-245.

Holz, et al., "Data Miming: Inferring Spatial Object Descriptions from Human Gesture", CHI 2011—Session: Gestures, Body & Touch, May 7-12, 2011, pp. 811-820.

Horvath, Imre, "Investigation of hand Motion Language in Shape Conceptualization", Journal of Computing and Information Science in Engineering, Mar. 2004, pp. 37-42.

Horváth, I. (2005). On some crucial issues of computer support of conceptual design. Product engineering: ecodesign, technologies and green energy, pp. 91-103.

Hyun, D. E., Yoon, S. H., Chang, J. W., Seong, J. K., Kim, M. S., & Jüttler, B. (2005). Sweep-based human deformation. The Visual Computer, 21(8-10), 542-550.

Igarashi, et al., "As-Rigid-As-Possible Shape Manipulation", Association for Computing Machinery, Inc., 2005, pp. 1134-1141.

Ingram, et al., "The Statistics of natural Hand Movements", Exp. Brain Res., vol. 188, 2008, pp. 223-236.

Jacobson, et al., "Bounded Biharmonic Weights for Real-Time Deformation", ACM Transactions on Graphics, vol. 30, No. 4, Article 78, Jul. 2011, pp. 1-8.

Joshi, et al., "Harmonic Coordinates for Character Articulation", ACM Transactions on Graphics, vol. 26, No. 3, Article 71, Jul. 2007, pp. 1-9.

Kato, et al., "Articulated Hand Motion Tracking Using ICA-based Motion Analysis and Particle Filtering", Journal of Multimedia, vol. 1, No. 3, Jun. 2006, pp. 52-60.

Kim, et al., "Modeling and Animation of Generalized Cylinders with Variable Radius Offset Space Curves", Journal of Visualization and Computer Animation, vol. 5, No. 4, 1994, pp. 189-207.

Ko, et al., "Automatic Assembling Procedure Generation from Mating Conditions", Computer-Aided Design, vol. 19, No. 1, Jan./Feb. 1987, pp. 3-10.

Lee, Kunwoo, et al., "A Hierarchical Data Structure for Representing Assemblies: Part I", Computer-Aided Design, vol. 17, No. 1, Jan./Feb. 1985, pp. 15-19.

Lee, Kunwoo, et al., "Interference of the Positions of Components in an Assembly: Part 2", Computer-Aided Design, vol. 17, No. 1, Jan./Feb. 1985, pp. 20-24.

Lin, et al., "Modeling the Constraints of Human Hand Motion", IEEE, 2000, pp. 121-126.

Lipman, et al., "Differential Coordinates for Interactive Mesh Editing", Proc. of the Shap Modeling International 2004, pp. 1-10.

Manresa, et al., "Hand Tracing and Gesture Recognition for Human-Computer Interaction", Electronic Letters on Computer Vision and Image Analysis, vol. 5, No. 3, 1005, pp. 96-104.

Marler, et al., "Human Grasp Prediction and Analysis", Safety and Risk Modeling and Its Applications, 2011, pp. 397-424.

Oikonomidis, et al., "Efficient Model-based 3D Tracking of Hand Articulations Using Kinect", BVMC, 2011, pp. 1-11.

Panin, et al., "Real-Time Articulated Hand Detection and Pose Estimation", ISVA 2009, pp. 1131-1140.

Pena-Pitarch, et al., "Virtual Human Hand: Grasping Simulation", Dgital Human Modeling, 2009, pp. 140-149.

Prime Sensor™ NITE 1.3 Algorithms Notes, Ver. 1.0, 2010, pp. 1-14.

Rezaei, et al., 3D Pose Estimation via Elliptical Fourier Descriptors for Deformable Hand Representations, IEEE, 2008, pp. 1871-1875.

Rehg, et al., "Model-Based Tracking of Self-Occluding Articulated Objects", Proc. of $5^{th}$ Int'l. Conf. on Computer Vision, Jun. 10-23, 1995, pp. 612-617.

Robertson, et al., "Impact of CAD Tools on Creative Problem Solving in Engineering Design", Computer-Aided Design, vol. 41, 2009, pp. 136-146.

Rocheleau et al., "System for Interactive Assembly Modeling", Computer-Aided Design, vol. 19, No. 2, Mar. 1987, pp. 65-72.

Rusak, Zoltan, et al., "A New Approach to Interactive Grasping Simulating of Product Concepts in a Virtual Reality Environment", Proc. of the ASME 2007, Int'l Design Engineering Technical Conferences & Computers and Information in Engineering Conference, Sep. 4-7, 2007, pp. 1-9.

Scali, S., Shillito, A.M., & Wright, M. (2002). Thinking in space: concept physical models and the call for new digital tools. Crafts in the 20th Century, Edinburgh, pp. 1-11.

Schkolne, et al., "Surface Drawing: Creating Organic 3D Shapes with the Hand and Tangible Tools," Letters CHI, vol. 3, No. 1, Mar. 31-Apr. 2001, pp. 261-268.

Schlattmann, M., & Klein, R. (Apr. 2009). Efficient bimanual symmetric 3D manipulation for markerless hand-tracking. In Virtual Reality International Conference (VRIC) (vol. 2), p. 1-10.

Sederberg, et al., "Free-Form Deformation of solid Geometric Models", SIGGRAPH 1986, pp. 151-160.

(56) References Cited

OTHER PUBLICATIONS

Shah, et al., "Assembly Modeling as an Extensio of Feature-Based Design", Research in Engineering Design, vol. 5, 1993, pp. 218-237.
Singh, K., & Fiume, E. (Jul. 1998). Wires: a geometric deformation technique. In Proceedings of the 25th annual conference on Computer graphics and interactive techniques (pp. 405-414).
Stokoe, et al., "Sign Language Structure: An Outline of the Virtual Communication Systems of the American Deaf", Journal of Deaf Studies and Deaf Education, vol. 10, No. 1, 2005, pp. 1-37.
Sudderth, et al., "Visual Hand Tracking Using Nonparametric Belief Propagation", Proc. of IEEE Computer Soc. Conf on Computer Vision and Pattern Recognition, 2004, pp. 1-9.
Suryanarayan, et al., "Dynamic Hand Pose Recognition Using Depth Data", 2010 Int'l conf. on Pattern Recognition, pp. 3105-3108.
Talton, et al., "Exploratory Modeling with Collaborative Design Spaces", ACM Transactions on Graphics, vol. 28, No. 5, Article 167, Dec. 2009, pp. 1-10.
Tangkuampien, T., & Suter, D. (2006). Real-Time Human Pose Inference using Kernel Principal Component Pre-image Approximations. In BMVC (pp. 599-608).
Taubin, Gabriel, "A Signal Processing Approach to Fair Surface Design", ACM, 1995, pp. 351-358.
Van Dam, Andries, "Post-WIMP User Interfaces", Communications of the ACM, Feb. 1997, vol. 40, No. 2, pp. 63-67.
Van Nierop, et al., "A Natural Human Hand Model", Visual Computer, vol. 24, 2008, pp. 31-44.
Varga, E., Using Hand Motions in conceptual Shape Design: Theories, Methods and Tools, Product Engineering: Tools and Methods Based on Virtual Reality, 2008, pp. 367-382.
Wang, et al., "6D Hands: Markerless Hand Tracking for Computer Aided Design", UIST 2011, Oct. 16-19, 2011, pp. 549-557.
Welch, et al., "Variational Surface Modeling", Computer Graphics, vol. 26, Jul. 2, 1992, pp. 157-166.
Wesley, et al., et al., "A Geometric Modeling system for Automated Mechanical Assembly", IBM J. Res. Development, vol. 24, No. 1, Jan. 1980, pp. 64-74.
Wu, et al., "Capturing natural Hand Articulation", IEEE, 2001, pp. 426-432.
Ye, et al., "Synthesis of Detailed Hand Manipulations Using Contact Sampling", ACM Transactions on Graphics, vol. 31, No. 4, Article 41, Jul. 2012, pp. 1-10.
Yoon, et al., "Sweep-based Freeform Deformations", Eurographics 2006, vol. 25, No. 3, pp. 1-10.
Zhang, et al., "Review of Shape Representation and Description Techniques", Pattern Recognition, vol. 37, 2004, pp. 1-19.
Zhou, et al., "Large Mesh Deformation Using the Volumetric Graph Laplacian", Association for Computing Machinery, Inc., 2005, pp. 496-503.
Lee, Joo-Haeng, "Modeling Generalized Cylinders using Direction Map Representation", Computer-Aided Design, vol. 37, 2005, pp. 837-846.
Horvath, I., "On Some Crucial Issues of Computer Support of Conceptual Design", Product Engineering Ecodesign Technologies and Green Energy, (2004), pp. 123-142.

* cited by examiner

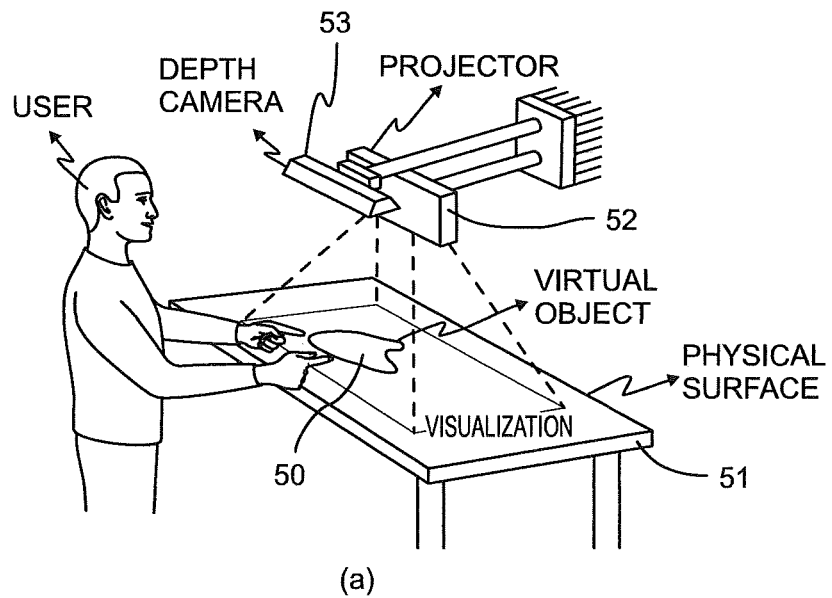
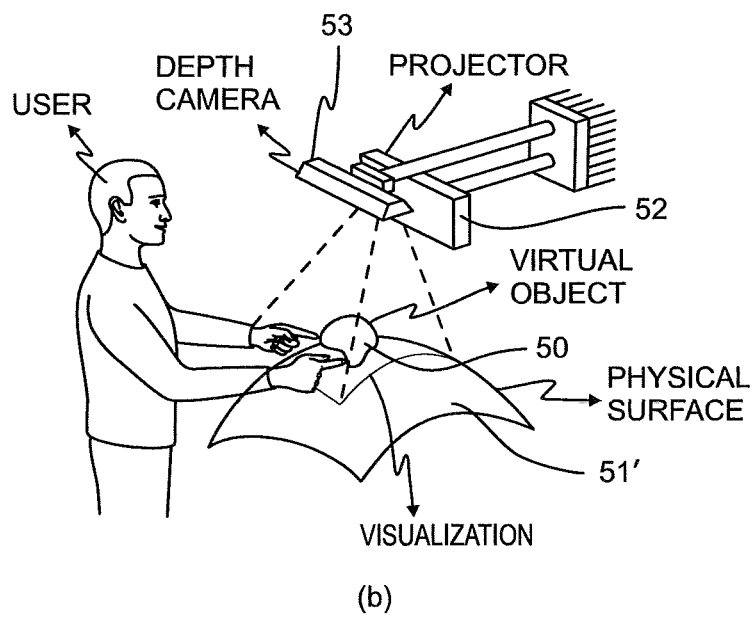
FIG. 7

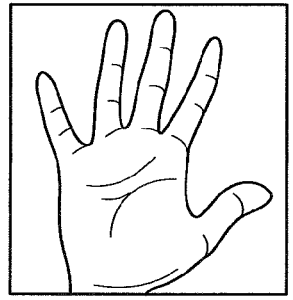 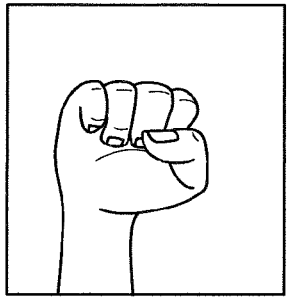 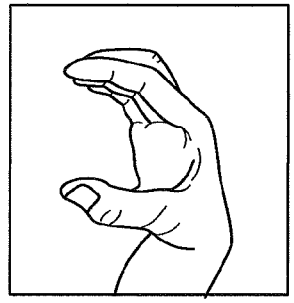
(a) Release/Press (Modeling)  (b) Grab (Modeling)  (c) Hold (Modeling)
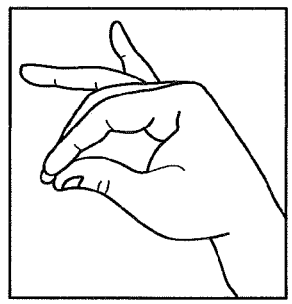 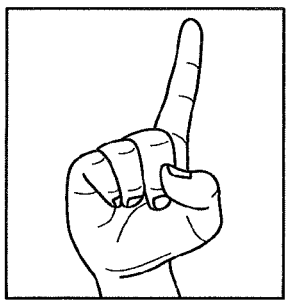 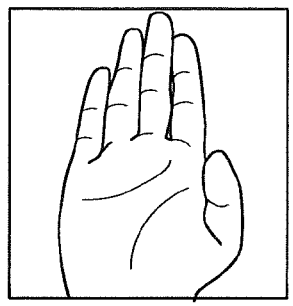
(d) Pinch (Modeling)  (e) Point (Modeling/Auxilliary)  (f) Knife/Copy (Modeling/Auxilliary)
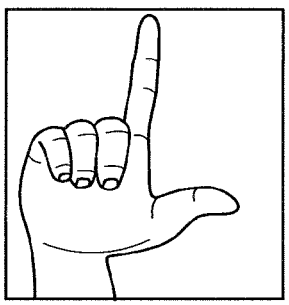
(g) Save (Auxilliary)
FIG. 8

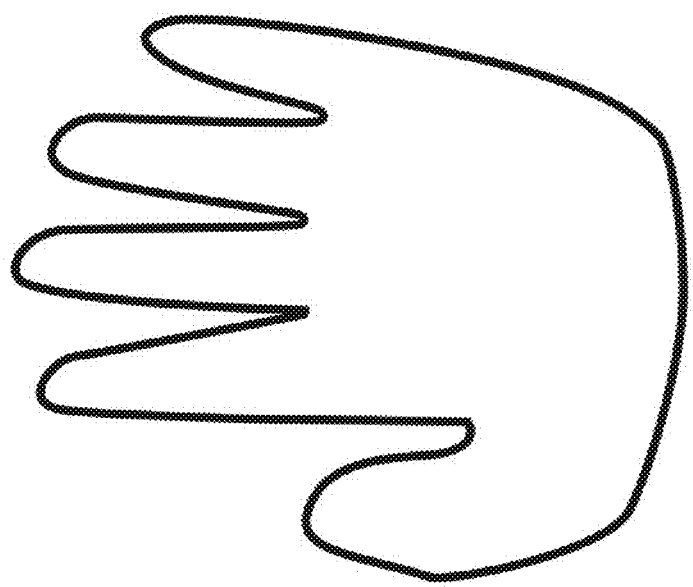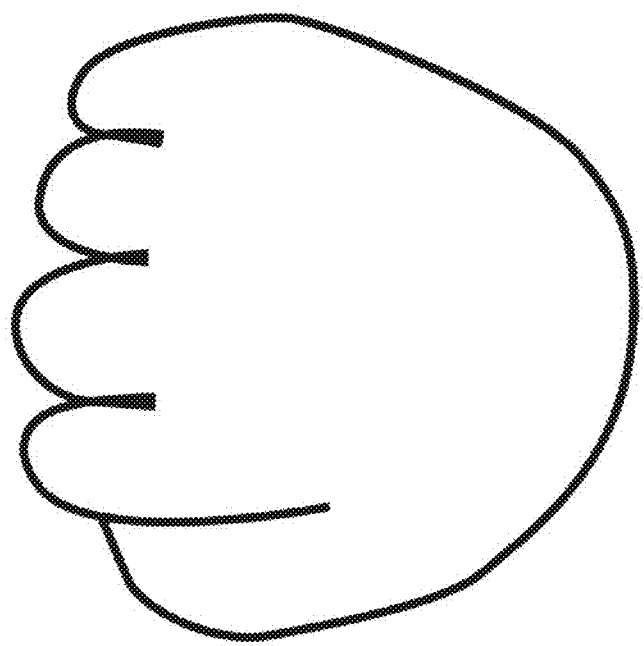
FIG. 22

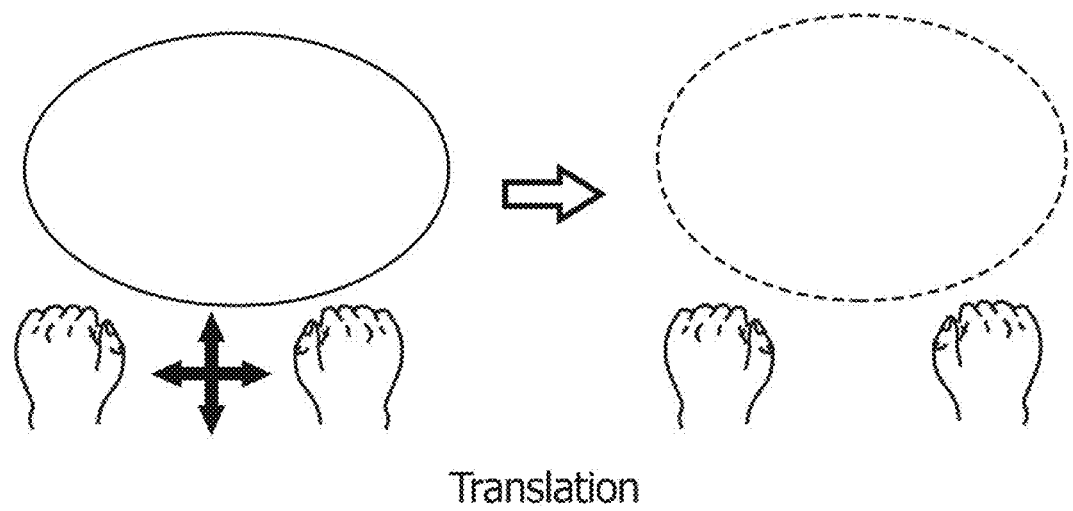
Translation
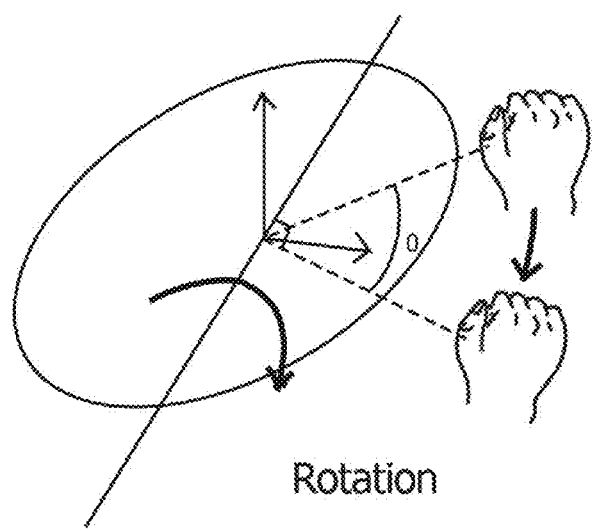
Rotation
FIG. 25

Scaling

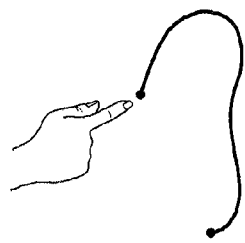
(a) 3D Curve (modeling)
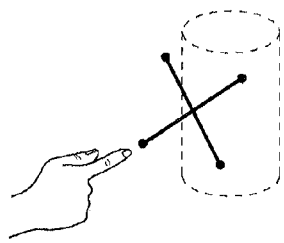
(b) Delete (auxilliary)
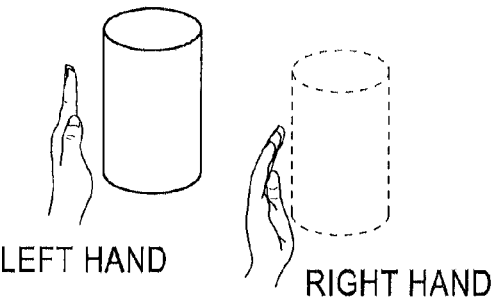
(c) Copy (auxilliary)
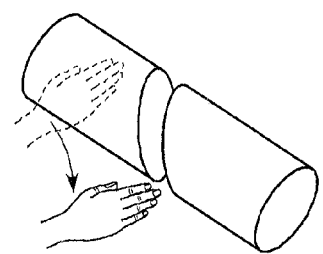
(d) Knife (modeling)
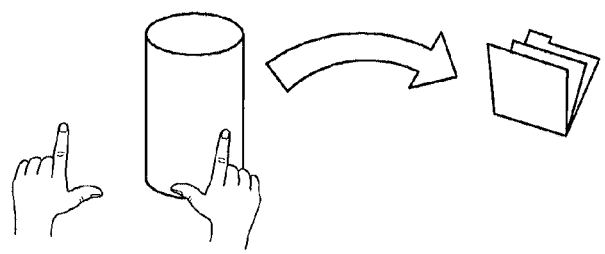
(E) Save (auxilliary)
FIG. 27

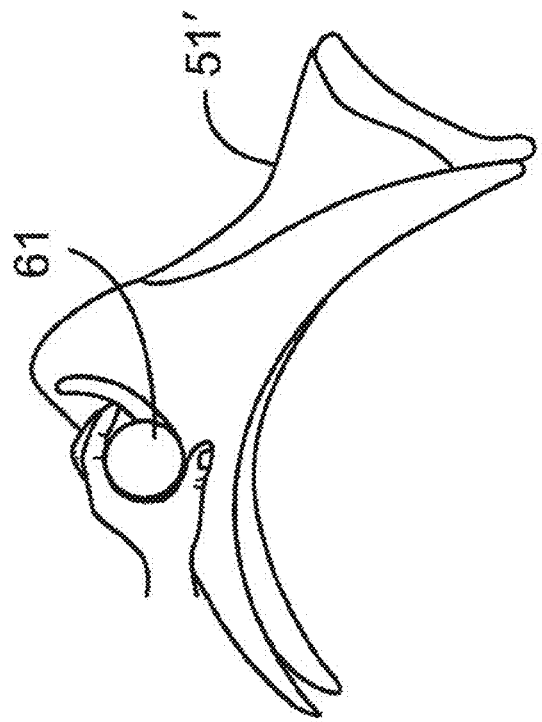
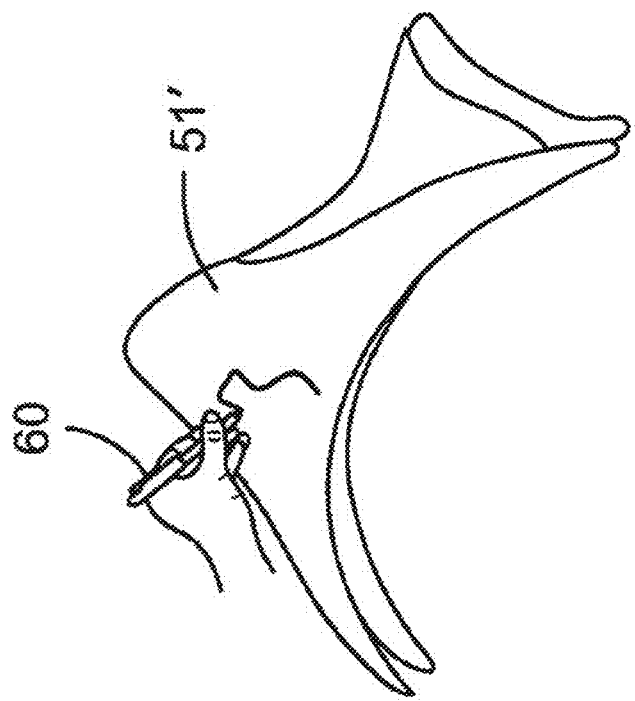
FIG. 28A
FIG. 28B

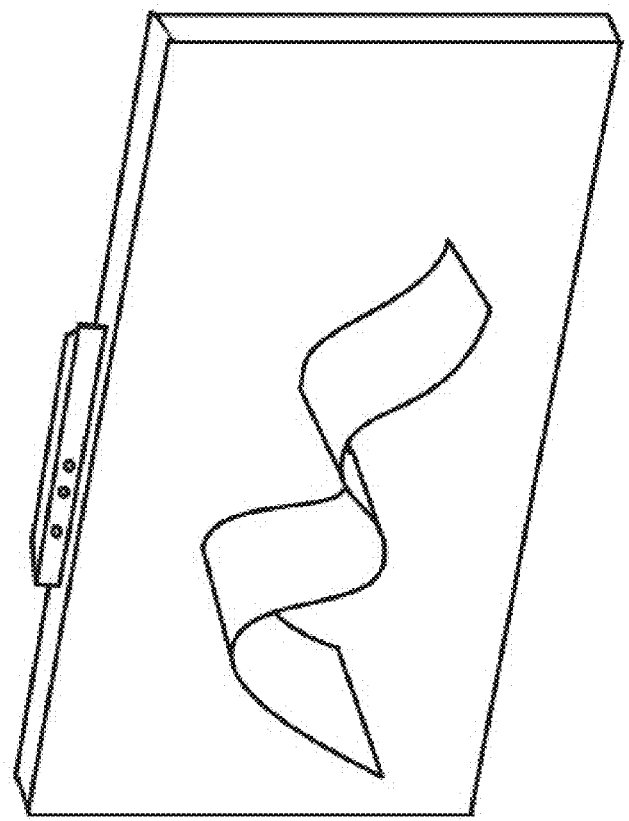
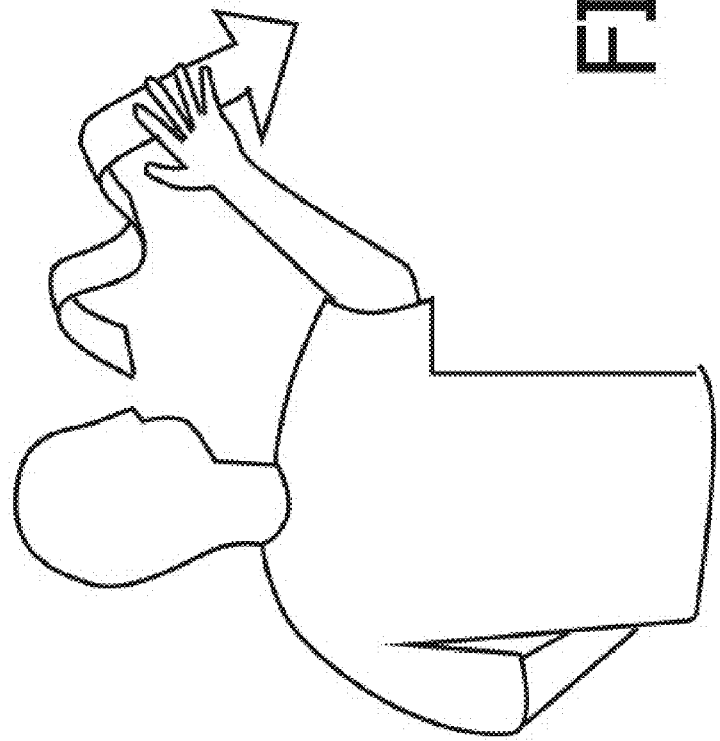
FIG. 41

STEP 1: Selection of object/geometric entities
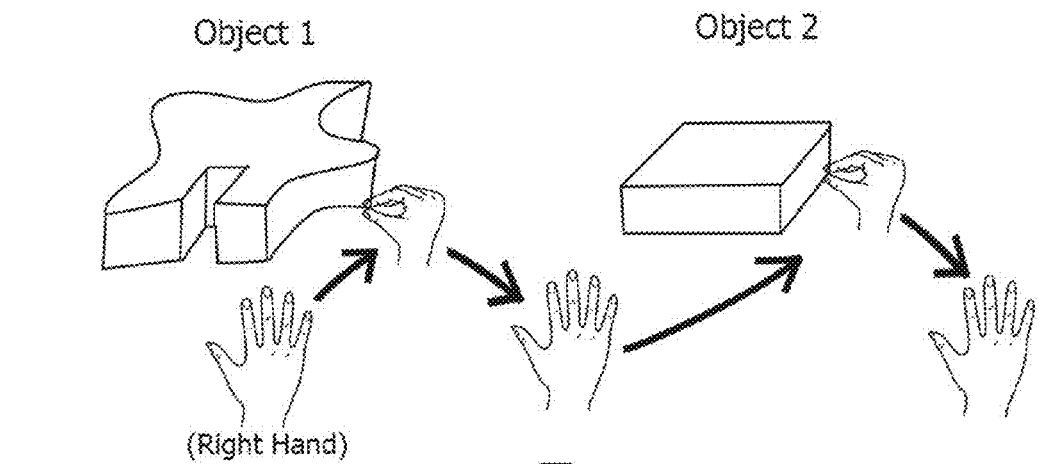
STEP 2: Contraint Application
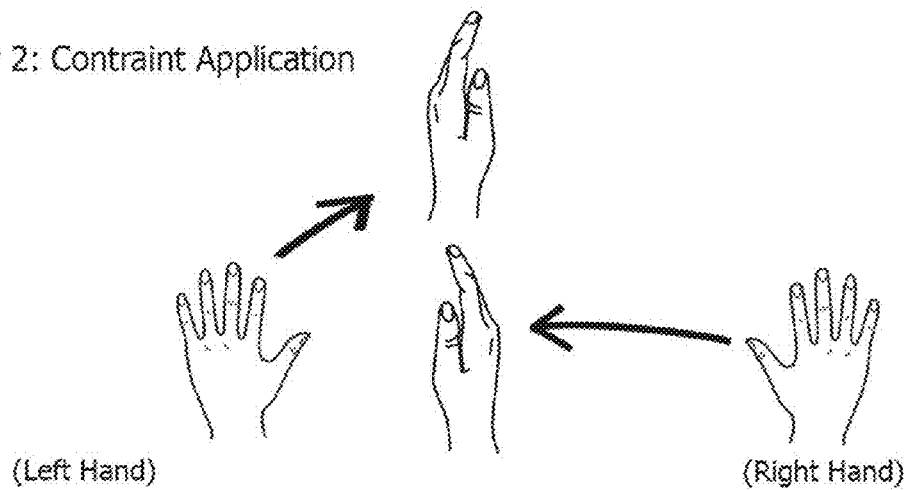
FIG. 50

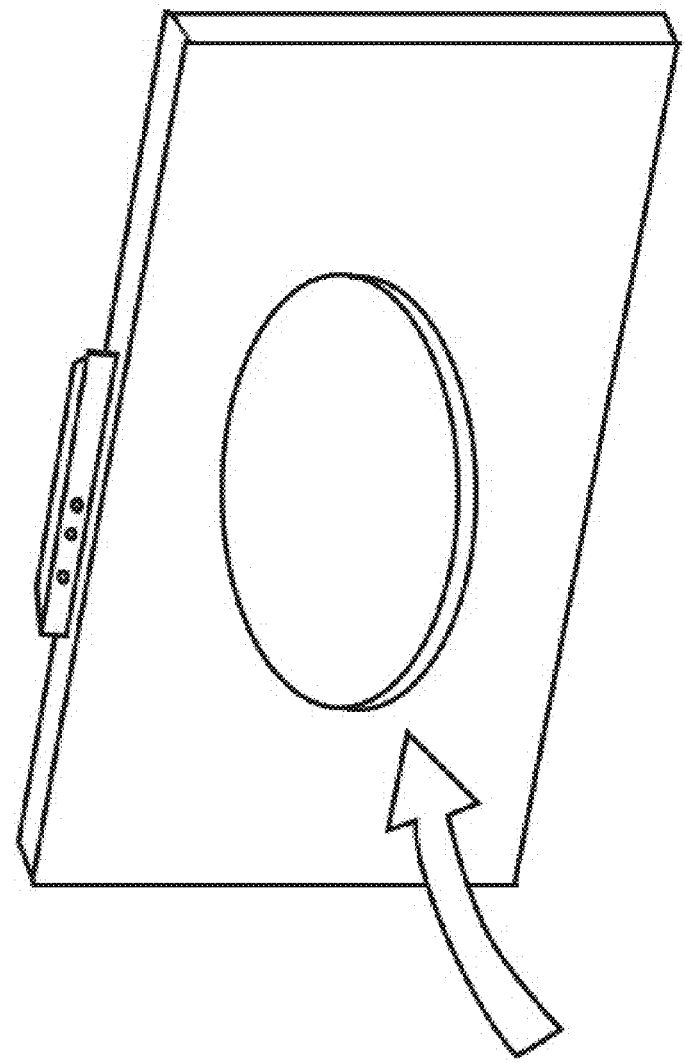
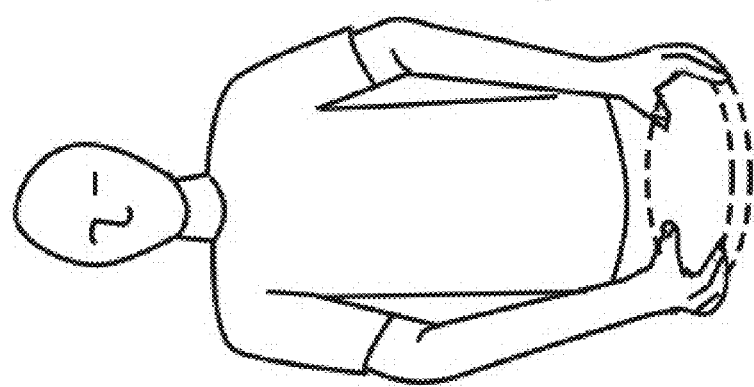
FIG. 54

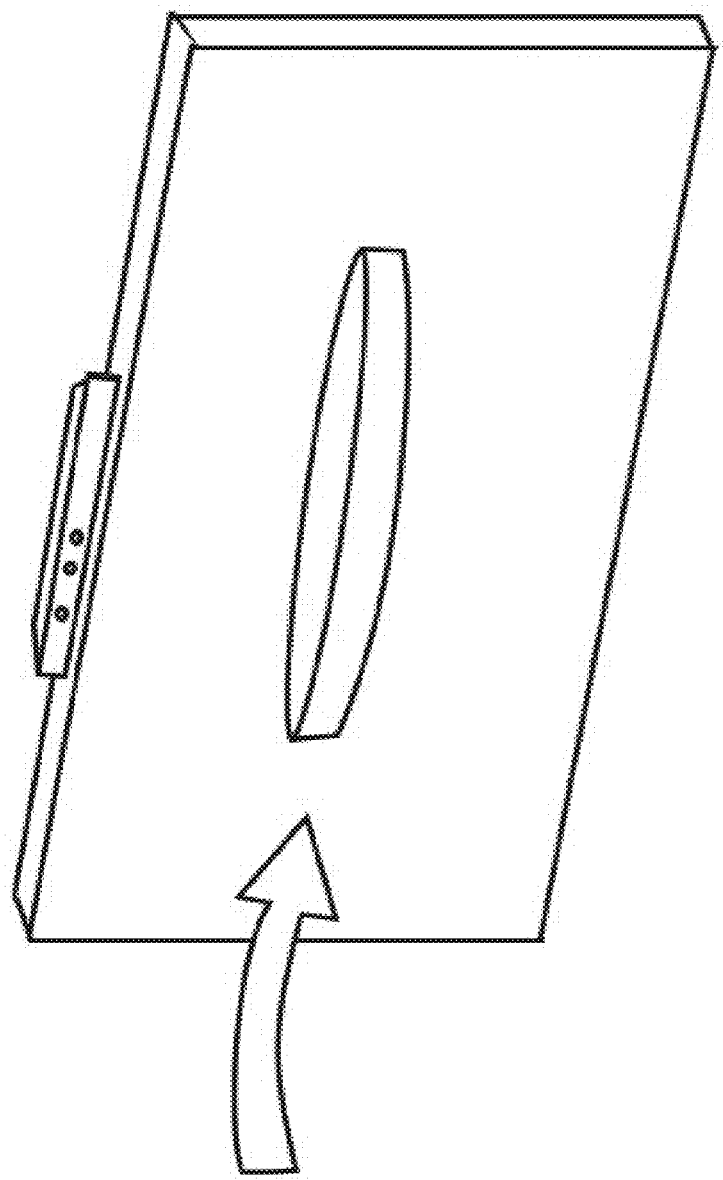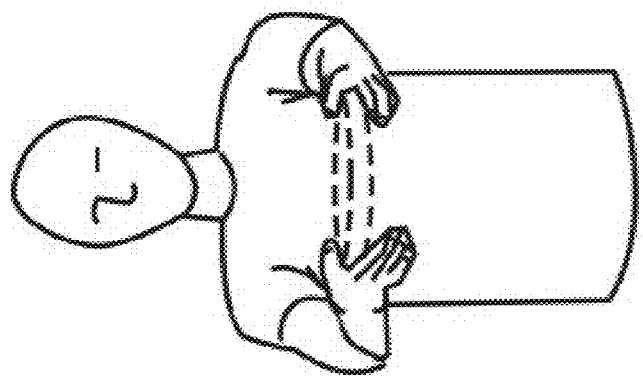
FIG. 55

METHODS AND SYSTEMS FOR INTERACTIVELY PRODUCING SHAPES IN THREE-DIMENSIONAL SPACE

REFERENCE TO RELATED APPLICATION AND PRIORITY CLAIM

This application is a utility filing from and claims priority to U.S. Provisional Application No. 61/643,252, filed on May 5, 2012, entitled "A Natural Gesture Driven Intelligent, Interactive and Collaborative 3D Shape Design Framework Using Depth Camera(s)", the entire disclosure of which is incorporated herein by reference, and to U.S. Provisional Application No. 61/671,773, filed on Jul. 15, 2012, entitled "Methods and Systems for Interactively Producing Shapes in Three-Dimensional Space", the entire disclosure of which is incorporated herein by reference.

BACKGROUND

The long standing method for creating and designing two- and three-dimensional shapes requires interaction with computational systems through keyboards and a mouse. Typical functions are enabled by the user pointing the mouse at specific locations on the screen and by manipulating the displayed image using icons on windows. This interface, often dubbed "Windows-Icons-Menus and Pointers" (WIMP), has been the primary mode of interaction with 2D and 3D content represented on computers. In the area of 3D modeling the modeling tools are typically based on 2D input devices, WIMP driven interfaces and stringent procedural steps, and remain difficult to use and time-consuming to learn. Most of these tools rely on initially creating geometry as 2D artifacts and then transforming those artifacts into a 3D geometry through tedious operations built into predetermined procedures.

The complicated nature of the current computer-based design keeps 3D modeling outside the grasp of the common un-trained user. Move over, current techniques severely curb the ability of humans to generate, manipulate and interact with shapes, and adversely influence creativity, which lies at the core of shape conceptualization. It has been said that, "conceptual design can be seen as a cognitive process, in which ideation, externalization, synthesis and manipulation of mental entities, called design concepts, takes place in symbiosis in a short-term evolutionary process". (Horvath, I., *On some Crucial Issues of Computer Support of Conceptual Design*, Product Engineering Ecodesign Technologies and Green Energy: 123-142 (2004)). The nature and speed of current interactions and the disconnect between concepts and their expressions are the attributes of the current computer-based tools and systems that has stifled the evolution of conceptual design of shapes or creative games, particularly those requiring 3D interactions with environments that combine virtual and physical environments.

Current highly digitized industrial processes have tended to overlook the role of the designer in the process itself. For instance, the interfaces of computer-aided-design (CAD) software are typically counterintuitive and the lack of spontaneity afforded by the current CAD modeling methods can be disruptive to the design and creative process. Although computer systems commonly provide parametric functions for creating 3D geometric-models, the conceptual design process is still cognitively tedious, requires significant training to use computer graphics and CAD tools, and is time-consuming to learn and use. This is not only true of CAD software, but of all computer tools in general. These computers and programmatic interactions occur in unnatural ways that are cognitively tedious and that complicate the creation of real, unreal and imagined shapes.

Computational support systems for design applications can be categorized as: (1) goal driven routine design systems (used by those who have significant domain knowledge); (2) exploratory design systems (intended towards brainstorming and facilitating creativity); and (3) evolutionary design systems (aimed at supporting the developmental mode of graphic ideation i.e. focused exploration involving the evolution of a single concept). Most current commercial design systems fall into the first category. Some very recent theoretical work has been directed towards the other two categories, but no commercially-realizable system has yet been created.

In the human design process, visual ideas are expressed by acting them out, talking about them, or even writing them. Hardware and software has gradually evolved to address the way humans intuitively design or create. The invention of the mouse in 1970 by Doug Engelbart is an example of the evolution of human interaction with computers and the corresponding evolution of our way of creating, manipulating, developing and accessing digital information. The key impact of this invention was that it mapped physical human motion, typically in a 2D plane, into a corresponding action on a virtual user interface. Recent innovations in capacitive touch-based interfaces have taken a significant step forward in the human-machine interface and have further reduced the "distance" between the computer and the user in a 2D interface. However, the WIMP (windows, icons, menus, and pointers) paradigm has remained dominant in human-computer interactions despite growing discussions that reality-based systems facilitate expert human-computer interaction with little or no prior instructions to the user. Just like one does not need a manual to use everyday objects, in a similar manner it would be extremely desirable that the human-computer interface allow the user to easily play around with objects in the real world represented virtually as the interface itself.

Despite the advancement of 3D geometric modeling techniques for animation, gaming and other scenarios, the current computer-based tools are unable to facilitate a designer environment that is congenial for creation and creative exploration of shape concepts in a fluid manner without extensive learning of tool use. The current highly digitized industrial tools split the 3D modeling process into a set of hierarchical 2D processes, thus overlooking the role of the designer in the process itself, which makes the interface counterintuitive and disruptive due to the lack of spontaneity in the modeling methods. Current CAD software frameworks have been shown to inhibit creativity when used too early in the design process due to the preciseness of the visual representations (which discourages further revisions), the time-consuming drafting process (which increases the cost of exploring a particular idea), and the expert-level knowledge necessary (which requires special training to acquire). For this reason, such tools are better used in later stages of design which inherently limits and even prevents access to 3D modeling techniques to the lay designer and to many professional designers.

Expression and description of shapes via hand and body movements is a frequent occurrence in general human communication. From a design aspect, natural gesticulation can also be critical in the description of spatial objects. While 2D artifacts like sketches and drawings are better off being created with 2D interfaces, the creation of 3D shapes using 2D interfaces hampers the ability of designers to experiment at conceptual and artistic levels. Creation of organic and free-form shapes thus far been generally limited to glove-based and augmented reality interfaces that are either difficult to setup, involve wearable devices or are expensive to procure. Moreover, the glove-based systems often physically tie the user to the computer, which can significantly limit the "workspace" for the creative design process.

The expression of visual ideas through 2D sketches has naturally evolved through history. Limited by available resources (and money) designers have tended to resort to low-tech physical artifacts such as pen, paper, whiteboards, flip charts, and design notebooks, as well as general-purpose computer software such as word processors, drawing editors, and presentation packages, to support the design process. Common among all of these tools (particularly the low tech tools) is that they impose little restriction on natural use and can be used nearly transparently in creative activities without requiring the users to shift the focus from the creative product to how to manipulate the tools themselves. This low barrier of entry facilitates creativity and refinement and lets the design team concentrate on ideas rather than arcane machinery. A similar natural or intuitive approach to 3D design has thus far not been possible, at least not without an intrusive input device or user interface. The natural human expression of shape is the essence of creativity and visual thinking, which can open up new vistas in the design process, especially in early stages of design, as well as in the development of and interaction with creative and constructive games. Reality-based systems facilitate expert human-computer interaction for all users, expert and novice alike, with little or no prior instruction or training.

SUMMARY

A set of frameworks, process and methods are provided that are aimed at enabling the expression, manipulation, and exploration of 3D free-form shape designs through natural interactions with human gestures. A method is provided for generating a shape in three-dimensional space comprising: defining a three-dimensional interaction space in the proximity of a user; visualizing the interaction space with a three-dimensional camera system operable to generate three-dimensional coordinate data corresponding to physical objects within the interaction space; interpreting a physical gesture of the user within the interaction space according to pre-determined rules, the physical gesture including a movement of a physical object; generating or manipulating a virtual shape in response to the interpretation of the physical gesture, the virtual shape residing virtually within the interaction space; and interactively displaying a representation of the virtual three-dimensional shape during the physical gesture.

In one aspect, the step of interpreting a physical gesture includes determining the context of the gesture in relation to the interaction space and/or virtual shape, wherein a different rule is applied to the same physical gesture in different contexts. This determination may include determining the spatial proximity of a physical object to the virtual shape within the interaction space and determining the location of the physical object on the virtual surface of the virtual shape.

In another aspect, the physical gesture includes pointing with a finger of at least one hand of the user within the interaction space and the predetermined rule applied to the gesture in one context is that movement of the finger generates a three-dimensional shape, while in another context the movement modifies or manipulates the three-dimensional shape at the location

DESCRIPTION OF THE FIGURES

FIGS. 7(a)-7(b) are representations of 3D shape generation in which a virtual object is projected onto a physical surface, according to one feature of the systems and methods disclosed herein.

FIGS. 8(a)-8(g) are pictures of hand gestures usable with the systems and methods disclosed herein.

FIG. 22 are representations of the "grab" and "extend" hand gestures used to perform operations and procedures according to the systems and methods disclosed herein.

FIG. 25 is a representation of two-handed gestures for translating and rotating a virtual shape or object.

FIGS. 27(a)-27(e) are representations of postures and associated functions according to the systems and methods disclosed herein.

FIGS. 28(a)-28(b) are representations of virtual tools for modeling on a 3D virtual surface according to one feature of the systems and methods disclosed herein.

FIG. 41 is a representation of the creation of a free-form surface by a user's gesture.

FIG. 50 is a representation of a user-defined constraints applied to virtual shapes or objects to be combined.

FIG. 54 is a representation of user gesture for generating an overhead view of a virtual shape or object being created or modified by the user.

FIG. 55 is a representation of a user gesture for a front view of the virtual shape or object.

DETAILED DESCRIPTION

In the following detailed description of the embodiments, reference is made to the accompanying drawings, which are shown by way of illustration of specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present disclosure. It is also to be understood that the various disclosed embodiments, although different, are not necessarily mutually exclusive. For example, a particular feature, structure or characteristic described in one embodiment may be included within other embodiments. The following description is, therefore, not to be taken in a limiting sense.

System Overview

Figure 1:
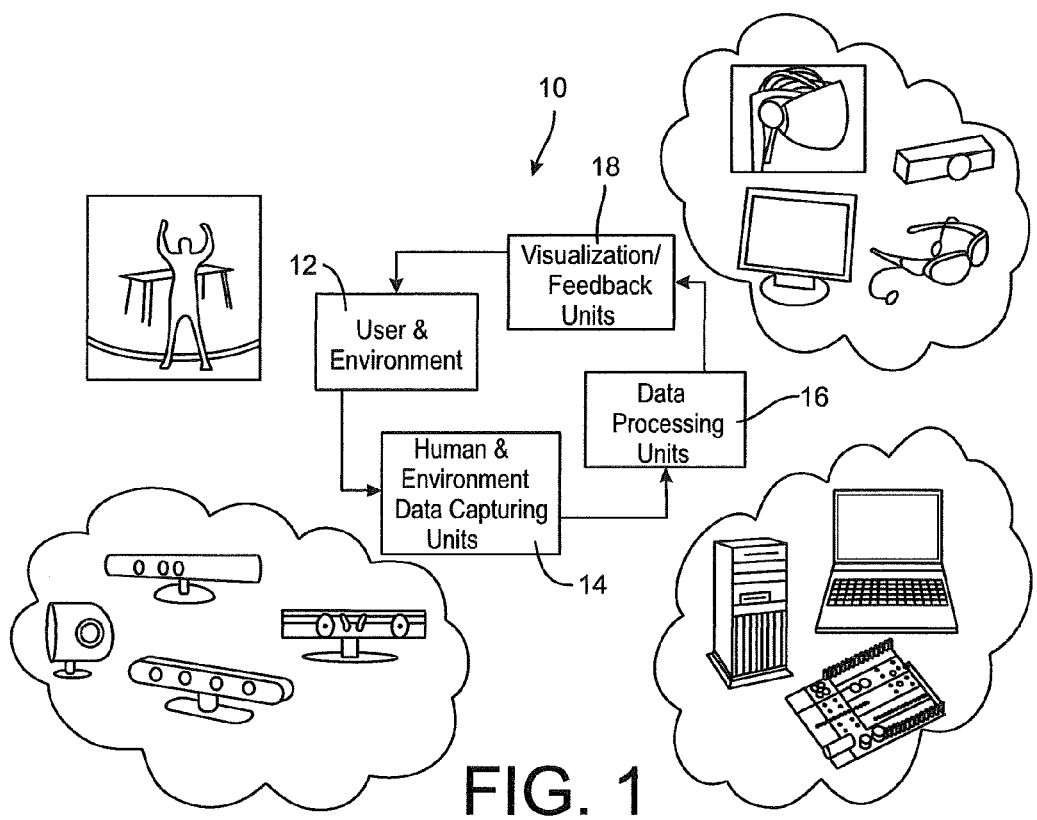
FIG. 1 is a diagram of the components of a three-dimensional design system according to the present disclosure.

The present disclosure contemplates a three-dimensional (3D) design system 10 incorporating four primary components shown in FIG. 1, namely: (a) the user and environment 12, (b) human and environment data capture units 14; (c) data processing units 16; and (d) visualization/feedback units 18. It is contemplated that the visualization, data processing, and data capturing units 14, 16 and 18, respectively, may all be combined into common unit, but for the purposes of the present discussion the components and their respective functionality are considered separately.

The first "component" 12 of the system is the user, which in a typical case would be a human designer or person intending the modeling of 3D shapes, and the environment is the users' spatial surroundings. The environment may be an empty design studio or may incorporate additional elements, such as a table-top surface equipped or a vertical wall setup equipped with visualization capabilities. The environment may also include a touch-display device seamlessly integrated with other aspects of the system, although such a device is not required to perform the 3D design methods described herein.

The second component is the human and environment data capture unit 14, which refers to a hardware device with associated software that is capable of providing data regarding the locations and motions of multiple users and/or objects in the environment in a non-intrusive untethered manner. Thus, one benefit of the present system and method is that there is no requirement that the user wear a device (i.e., a glove) or utilize an instrument tethered to a computer system (i.e., a mouse or keyboard) for the purposes of capturing all the data needed for the design process. In accordance with one aspect of the present system, the data capture unit is capable of generating 3D data of any person or object in the environment, including movement within the environment. Thus, the data capture unit can include a 3D motion camera system, such as a stereoscopic system or a depth camera. In one specific embodiment, the data capture unit can be a commodity depth camera, such as the Kinect® by Microsoft Corp., the Xtion PRO™ by Asus Computer International, or the ZCam® developed by 3DV Systems, Ltd. These commercially available camera systems are illustrative of the depth camera that may be incorporated into the system of FIG. 1.

In a broader sense, as used herein the term "depth camera" refers to a motion camera that generates data corresponding to a visual depiction of a scene including both a two dimensional photograph of the scene and a corresponding depth map of the photograph. The scene includes anything within the field of view of the camera, such as objects and subjects that are located at varying distances from the camera. The two dimensional photograph is typically generated with a digital camera and includes a two-dimensional array of pixels that form a photographic image of the scene. The depth map includes a plurality of data elements that correspond to a distance between the camera and different objects in the scene. In one embodiment, the depth map includes a distance value corresponding to each pixel in the two dimensional photograph. In some embodiments, the depth camera generates a series of two dimensional photographs and corresponding depth maps in a video recording generated at various rates, such as 30, 60, or 120 photographs per second.

The depth cameras generate the depth map using one or more techniques known in the art. One embodiment includes an active emitter and backscatter detector that actively scans the scene to measure the distance between the camera and objects that are captured in the photograph of the scene. For example, an infrared emitter directs infrared light into the scene and an infrared receiver detects reflected infrared light from different objects in the scene. The depth camera generates a depth map that corresponds to a time delay between emitting the infrared light and receiving the reflected light from different objects in the scene. In other embodiments, the depth camera is a stereoscopic device including two or more cameras and associated software that produce multiple photographs of a scene taken from different locations and generate a depth map with reference to the multiple photographs. Still other embodiments generate a depth map using one or more photographs from a single camera. For example, one embodiment identifies shadows in a photograph and identifies the distance from one or more objects in the scene to the camera with reference to the shadows.

Returning to FIG. 1, the data processing units 16 refer to one or more computing devices which can interpret the data acquired by the data capturing unit(s) and convert those interpretations into meaningful actions in software or firmware applications. These units can include a mainframe or networked computer system, a standard personal desktop or laptop computer, or a programmed embedded system with microcontrollers, such as the Arduino™ open source platform.

Finally, the visualization/feedback units 18 are responsible for providing a feedback to the user of the modeling processes, the operations being performed by the user, and/or the movements of the user or objects within the environment. Such units may include a standard visual display such as a computer screen, a projection system or a head-mounted display such as the type used in virtual reality (VR) systems. The feedback units may include audio or tactile feedback devices. The visualization/feedback units 18 may also include devices capable of producing physical objects derived from the design process, whether locally or off-site.

In certain embodiments the data processing unit(s) 16 is configured to create a natural one-to-one mapping between the visualization environment and creation/interaction environment. For example, the units of the system of FIG. 1 are configured so that the hand movements of a user can be natural without needing to alter the movements to permit visualization or to perform the design tasks. The visual display may include a direct image of the user as well as a skeletal image, as described herein, together with a representation of the virtual or physical objects being generated, modified or manipulated in the design process. This aspect is especially pleasing to users in gaming environments and can increase the sense of involvement in any setting, whether gaming or 3D shape creation.

The Shape-Gesture-Context Interplay

The 3D design system disclosed herein provides an avenue for "shape exploration", which can be categorized into three components, namely: (a) shape creation; (b) shape modification; and (c) shape manipulation. As used herein, the term "shape creation" shall mean the use of body motions, and more particularly hand and arm motions, to generate a shape from scratch within a working volume or interaction space around a user. The term "shape modification" shall refer to interactions with shapes with the intention of changing the geometric characteristics of the shape. "Shape manipulation" as used herein refers to pick-place-orient operations—i.e., rigid body translations and rotations.

The present system and method for 3D shape generation implements a general computational framework "Shape-Gesture-Context Interplay" (SGC-I) which unifies the shape exploration process with the gestural intent of the user/designer. In this framework, "shape" is considered as the operand, "gesture" as the operator and "context" as the activity interpreter. "Interplay" refers to the entire operation. This framework enables the automatic deduction of the user's intent, as well as the nature and extent of geometric constraints, by interpreting human gestures and motions. In general terms, the users "intent" is defined as the combination of gesture and context. An example of intent is when a user intends to lift a coffee cup. The "shape" of the user's hand (i.e., to grasp the coffee cup) together with the upward movement of the hand identifies the "gesture" while the contact of the hand with the handle of the cup is interpreted as the "context".

Figure 2:
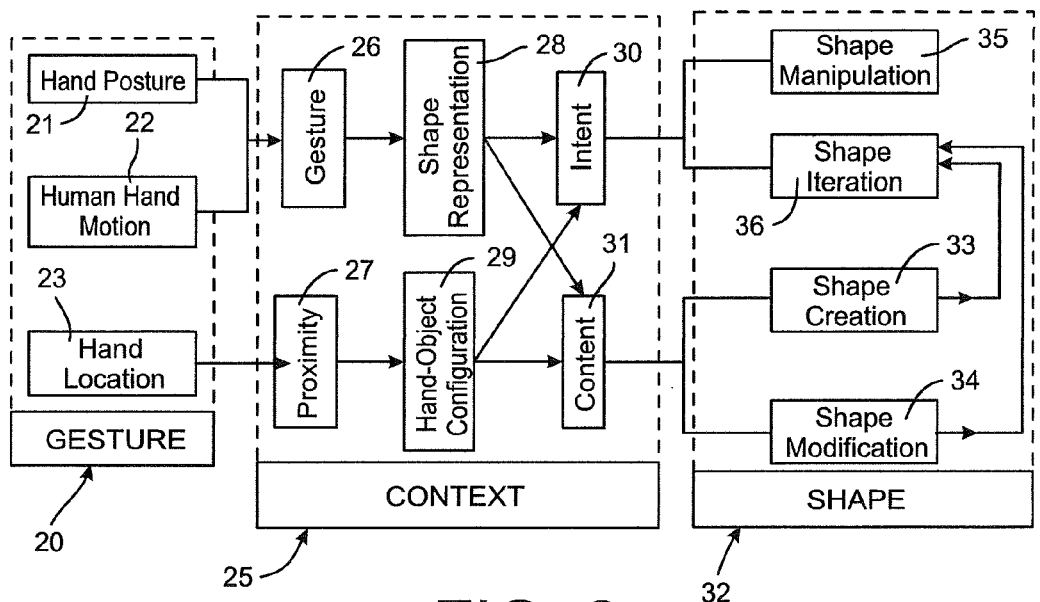
FIG. 2 is a block diagram of a shape-gesture-context interplay according to one feature of the systems and methods disclosed herein.

The general SGC-I framework is depicted in the flow chart of FIG. 2. For the present description, the user interaction is described as hand movements, although the concepts described herein can be implemented for any movement of the user/designer. The Gesture Module 20 of the SGC-I framework includes sub-modules adapted to determine posture 21, motion 22 and location 23 of the user's hand or hands. These attributes of the hand(s) are recognized and tracked in the Gesture Module which feeds information to the Context Module 25. The Context Module 25 includes sub-modules adapted to evaluate the user's gesture 26, as defined by posture 21 and motion 22, to determine in sub-module 28 a shape representation being generated by the user. The Context Module 25 further includes a sub-module that evaluates the proximity 27 to a shape within the working or interaction space, as defined by the hand location information 23, to ultimately identify a hand-object configuration 29. The shape representation 28 and hand-object configuration 29 are further processed in sub-modules configured to identify the intent 30 and content 31 of the 3D shape interactions by the user. The Shape Module 32 includes sub-modules that then implement the creation 33, modification 34 and manipulation 35 operations of 3D shapes based upon the intent 30 and content 31 information supplied by the Context Module 25. A shape iteration sub-module 36 integrates the 3D shape information generated by the other sub-modules 34, 35, 36 to produce the final 3D shape and digital model. It can be appreciated that each module 20, 25, 32 or the sub-modules may reside in one or more data processing units 16 of the system, or may be implemented in a combination of the data capturing units 14 and data processing units 16. With this general description of the module architecture, details of each module will be presented.

Shape

Shape is the subject of the design intended by the user or, more precisely, a given geometric representation of an object in virtual space. The representation of shapes has been studied extensively in the development of CAD systems. In general terms, these representations include: (a) decomposition models; (b) constructive models; and (c) boundary models. Boundary model representations (commonly called B-reps), and especially polyhedral models, are known to be directly useful for graphical applications. Parametric surface modeling makes use of Bezier, B-Splines and NURBS for modeling complex shapes. Shape representations based on contours and mesh regions have also been recently investigated, as well as differential coordinate representations for surface editing. Much of the CAD development has dealt with the creation of the shapes with pointing devices (such as the mouse) and the interactions with virtual objects, such as controlling the position and orientation or the shape of a CAD object by manually moving a sensor. Even in virtual reality based CAD systems physical sensors or devices for 3D manipulation of objects are used for the creation and modification of shape data. For instance, U.S. Pat. No. 7,212,197 describes free-form surface design using 3D locations of a glove or sensors located on the hands. All the previous work related to creating shapes has been through the use of a mouse and commands that are typically sequential and procedural, using pull down menus and selections on the object, with the shape itself being predefined.

On the other hand, according to the methods of the present disclosure, shape modeling is directly derived from the interpretations of hand (or hand-arm) motions and gestures to generate preliminary or rough shapes. The representations of these generated shapes—such as point clouds, edge-based, facet-based and parametric representations—can be encoded seamlessly with the intended interactions in a compact form based on the gestures and motions of the hands and arms. The shape modeling process of the present disclosure can be described as involving the creation of rough 3D shapes to communicate the designer's intent to the computer, coupled with intuitive methods for further modification and refinement. Using simple and natural hand (or hand-arm) motions, the designer can realistically control the deformation of a virtual shape according to context specific modeling metaphors in real-time.

Gesture

The second prong of the SGC-I framework is gesture, which is defined herein as a prescribed action performed by the user in 3D space for defining the intention of a design operation related to 3D shapes. In general, gestures are used to express thoughts and emotions, emphasize speech, and indicate intent and attitude—all elements that have been adapted in the present system and method to the expression of 3D shapes. The present system relies upon hand-based interactions that can be categorized as: a) hand and arm posture; b) hand and arm motion; and c) hand and arm gesture. Postures are defined as the individual spatial configurations of the wrist, palm and fingers (hand) and elbow and shoulders (arm), apart from motion. Motion is the temporal variation of the spatial configurations of the hand and the arm, namely dynamic articulations of the hand and arm that obey certain kinematic constraints.

The estimation of the poses or postures of hand and arms is a central requirement for the shape exploration disclosed herein. The pose of the human hand can be described as the spatial configuration of each finger and the palm—i.e., the kinematic parameters (joint angles) of the hand. Known algorithms for determining pose and postures of the human arm and body are by and large based on 2D images obtained from single or multiple cameras where a plurality of images are analyzed using descriptors, such as described in U.S. Pat. No. 7,095,401 of Liu et al., the entire disclosure of which is incorporated herein by reference, and in published application No. 2010/0034462, the entire disclosure of which is also incorporated herein by reference. Computer-vision based pose estimation algorithms can be categorized into two broad categories—(a) single frame algorithms; and (b) model-based tracking algorithms—although there is frequently an overlap of approaches followed in these categories. Feature-based algorithms involve extraction of relevant features of the hand-like silhouettes and boundary contours, which is typically followed by a global search amongst pose samples, template matching or inverse-kinematics. Other methods use deformable geometric models of the hand to estimate poses. Model-based learning and feature-tracking based algorithms involve the tracking of the hand and subsequent estimation of the joint angles using single or multiple hypotheses. Certain commonly used approaches are based on Bayesian filtering, particle filters and grid based filters. Again, the focus in the prior art has been on determining hand pose and posture from 2D images.

The advent of low-cost 3D depth cameras has recently spurred investigation into algorithms for 3D hand-pose estimation, such as compressed 3D shape descriptors using depth data from the Zcam™ depth camera for 3D hand pose recovery. A robust hand pose estimation based on particle swarm optimization on the GPU has been developed using depth images from the Microsoft Kinect® system. Hybrid methods of gesture recognition using 2D image and depth data have been used to recognize hand gestures, such as the methods described in U.S. Pat. No. 7,308,112, issued on Dec. 11, 2007, the disclosure of which is incorporated herein by reference.

The kinematic representation of hands has been employed in many of the model-based approaches mentioned above. Different degree-of-freedom (DOF) models have been suggested based on the methods applied for the pose estimation algorithm, so that these particular hand representations are more application-specific. Hand representation and kinematics has been widely studied in robotics, ergonomics, and digital human modeling. Like other joints of the human body, joints on the human hands are coupled with each other such that their motion is constrained by the motion of the neighboring joints. These joint constraints in the kinematic hand model have been quantified in terms of the relationship between joint angles.

In previous research involving gestures, the scope of the gesture recognition has been limited to facilitate classification or recognition of the gesture. For example, an interactive table displaying images and objects has been used with an optical component that detects the gestures to determine if the fingers are on top of or hovering near the display surface (see, e.g., U.S. Pat. No. 7,519,223 to Dehlin et al., issued on Apr. 14, 2009). In other work, a 2D gesture input is sensed in proximity to a display device which then generates a 3D object based on the displayed 2D object (see, U.S. Published App. 2011/0164129 A1 to King et al., published on Jul. 7, 2011). According to the system disclosed herein, more generic gestures are sensed in 3D space and are not confined by a display device or proximity to specific hardware.

The Context Module of FIG. 2, as implemented by the data processing units of the system shown in FIG. 1, can utilize any known techniques or approach to estimate the pose and posture of the user's hand or hands that is capable of evaluating three-dimensional hand movements. However the present system is differentiated from prior investigations of hand kinematics in the way that hand gesture is interpreted and how action is taken on that gesture. For the present system, any gesture recognition method may be used as long as it discriminates the intended gesture to take requisite action. The system may use one or more combinations of the known gesture recognition methods. In accordance with one aspect of the present system and method, the user has the capability to teach the system to recognize a particular gesture and to assign the gesture to a particular action in a particular context, such as when the gesture is performed in the proximity of a real or virtual object.

The system of FIGS. 1-2 is configured to locate the user's hand with respect to a virtual object (sub-module 23), and to detect the shape of the hand and its motion (sub-modules 21, 22), constituting a gesture, in order to inform the Context Module regarding the type of interaction intended by the gesture. In one embodiment, the gesture recognition and training feature can be accomplished using a random forest method for hand posture classification, which can be implemented efficiently on any conventional GPU. In accordance with one embodiment of the present system, the user's hand postures are observed by a depth camera, such as the Microsoft Kinect® camera system. The Kinect® camera provides digital images (640×480 resolution) of its observed environment in a four-channel RGB-D format at 30 Hz (i.e., 30 frames/second) wherein, the "RGB" values specify the color of each pixel and "D" signifies the depth value (11-bit resolution) at each pixel. The strategy for hand posture classification implemented herein involves the training of the random forest with a set of hand data obtained from the Kinect®. By way of explanation, suppose the training dataset $\psi$ contains n data points $-\psi=\{p_1, K, p_n\}$, in which $p_i=\{x_i, y_i\}$, where $x_i$ is an 80×80 patch and $y_i$ is the label of this patch. A random forest is an ensemble of T random decision trees, each consisting of split and leaf nodes. Each split node consists of a feature $f_{104}$. To classify each patch x, one starts at the root of each tree, and repeatedly branches left or right according to the result of the comparison $f_\psi<0$. At the leaf node of tree t, a learning distribution $p_t(c|x)$ is obtained. The distributions are averaged over all random decision trees in the random forest to give the final classification, that is $$P(c \mid x) = \frac{1}{T}\sum_{t=1}^{T} P_t(c \mid x).$$

The present system employs a depth comparison feature by computing $f_\psi(x)=d_x(u)-d_x(v)$, where $\psi=(u,v)$ and u and v are 2 D integer coordinates within the range $[0,79]^2$. $d_x(u)$ and $d_x(v)$ represent the depth value of the patch x at position u and v, respectively. In one approach, twenty 20 random decision trees are trained, with each tree trained independently on all training data, using the following algorithm:

1. Randomly propose a set of splitting candidates $\psi=(u, v)$.
2. Partition the set of examples $Q=\{p\}$ into left and right subsets by each $\psi$:

$$Q_l(\psi)=\{p|f_\psi(p)<0\}$$

$$Q_r(\omega)=\{p|f_\psi(p)\geq 0\}$$

3. Compute the $\psi$ giving the largest gain in information:

$$\psi^* = \underset{\psi}{\operatorname{argmax}}\, G(\psi)$$

$$G(\psi) = H(Q) - \sum_{s\in\{l,r\}} \frac{|Q_s(\psi)|}{|Q|} H(Q_s(\psi)),$$

where H (Q) represents Shannon entropy of the set Q.

4. If the largest gain $G(\psi^*)$ is sufficient, and the depth in the tree is below a pre-specified threshold (15, for example), then recurse for left and right subsets $Q_l(\psi^*)$ and $Q_r(\psi)$.

In one specific example, three hand postures were classified, namely, release, grab and point, as illustrated in FIGS. 8a, b and e. For each posture, 10,000 frames of data in several orientations and distances from the camera was collected, resulting in a total of 30,000 frames. For each posture, a portion of frames was randomly sampled for training, while the rest of the frames were reserved for testing. The following table shows the accuracy of classifying a gesture as either release, grab or point as a function of the amount of training provided for the random forest method:

| Training size | 50% | 60% | 70% | 80% | 90% |
|---|---|---|---|---|---|
| Point | 86.48% | 86.45% | 88.73% | 88.40% | 89.80% |
| Release | 92.98% | 93.40% | 94.27% | 94.55% | 95.00% |
| Grab | 94.00% | 94.80% | 95.33% | 95.55% | 97.50% |
| Average | 91.15% | 91.55% | 92.78% | 92.83% | 94.10% |

As the table illustrates, the classification precision is very high, especially, when more training data is used. The random forest method is very efficient in classification, since only hundreds of comparisons are needed for each classification. In the specific example, the average time to classify a hand posture was only 0.039 milliseconds.

In human-computer interaction (HCI), naturalness and flexibility are two key factors. The evolution of user interface (UI) witnessed the transition from text-based UI using a keyboard to GUI-based interface using a mouse. However, in many tasks, such as shape creation, more flexible and natural interactions are needed to enable the user to freely express ideas, as well as precisely design in a familiar manner. In current virtual environment (VE) applications, keyboard, mouse, wand and joystick are still the most popular and dominant interface devices. However, for humans the more natural way of expressing ideas is to use gestures. In fact, gesture is so fundamental in our human interaction that all of us are masters of gesture. Recognizing gestures is a complex task which involves many aspects such as motion modeling, motion analysis, pattern recognition and machine learning, even psycholinguistic studies. Sign language is an important case of communicative gestures. Since sign languages are highly structural, they are very suitable for acting as a test-bed for vision algorithms.

Broadly speaking, current gesture recognition methods can be classified into three main categories, based on the methods to model gestures. The first category is to model the low-level dynamics of human motion, such as by a condensation algorithm, to serve as a quantitative representation of simple movements so that those simple movements can be recognized in a reduced space by the trajectories of motion parameters. The second category is to mine the underlying semantics, such as extended variable-valued logic. Due to the high level abstraction in semantics, this category of methods is suitable for recognizing complex gestures. The third category, which is also most popular category, is the HMM framework which relies upon a statistical model derived from extensive research in the past decades.

One problem with current gesture recognition methods is that they all need clean training data to learn a good model; however, this may be impractical in many situations, especially in the context of human computer interaction. The obtained training data is the continuous sequence of gestures, with no segmentation, and no labels. It is tedious, if not impossible, to manually label such data, especially as the size of data grows rapidly. In the noisy training data, it can be observed that clean instances form some obvious clusters, called frequent patterns. Thus, instead of directly training a model based on the noisy data, it is possible to first detect frequent patterns in the noisy data and then identify the clean instances in a process referred to as data cleaning After cleaning, traditional machine learning methods can be applied to the data. This framework not only eliminates the needs of tedious human labeling, but also enables robust selective recognition, and in particular enables recognition of pre-defined gestures while ignoring other gestures.

The framework contemplated herein is an interplay of salient features, frequent pattern mining, description and random forest classification. To deal with large variances among instances of a frequent pattern, it is essential to automatically detect relevant salient features and discard irrelevant features. The salient features are automatically selected by the process of frequent pattern mining. The random forest classification depends on the outputs of frequent pattern mining, which is intended to find clean training data in an automated way; however, its performance also depends on salient features. The interplay of these three factors provides an extremely robust and powerful platform for gesture recognition.

Figure 9:
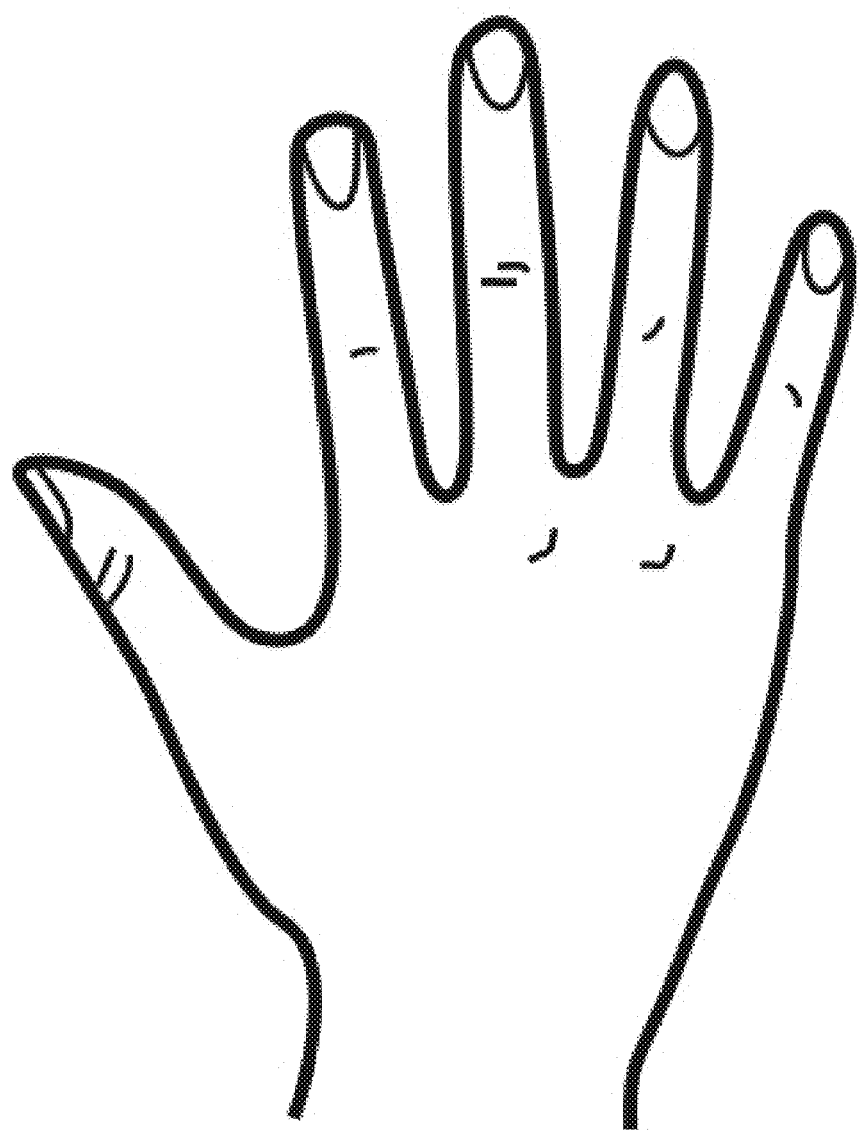
FIGS. 9-11 are representations of three types of gestures in accordance with one aspect of the present disclosure.
Figure 10:
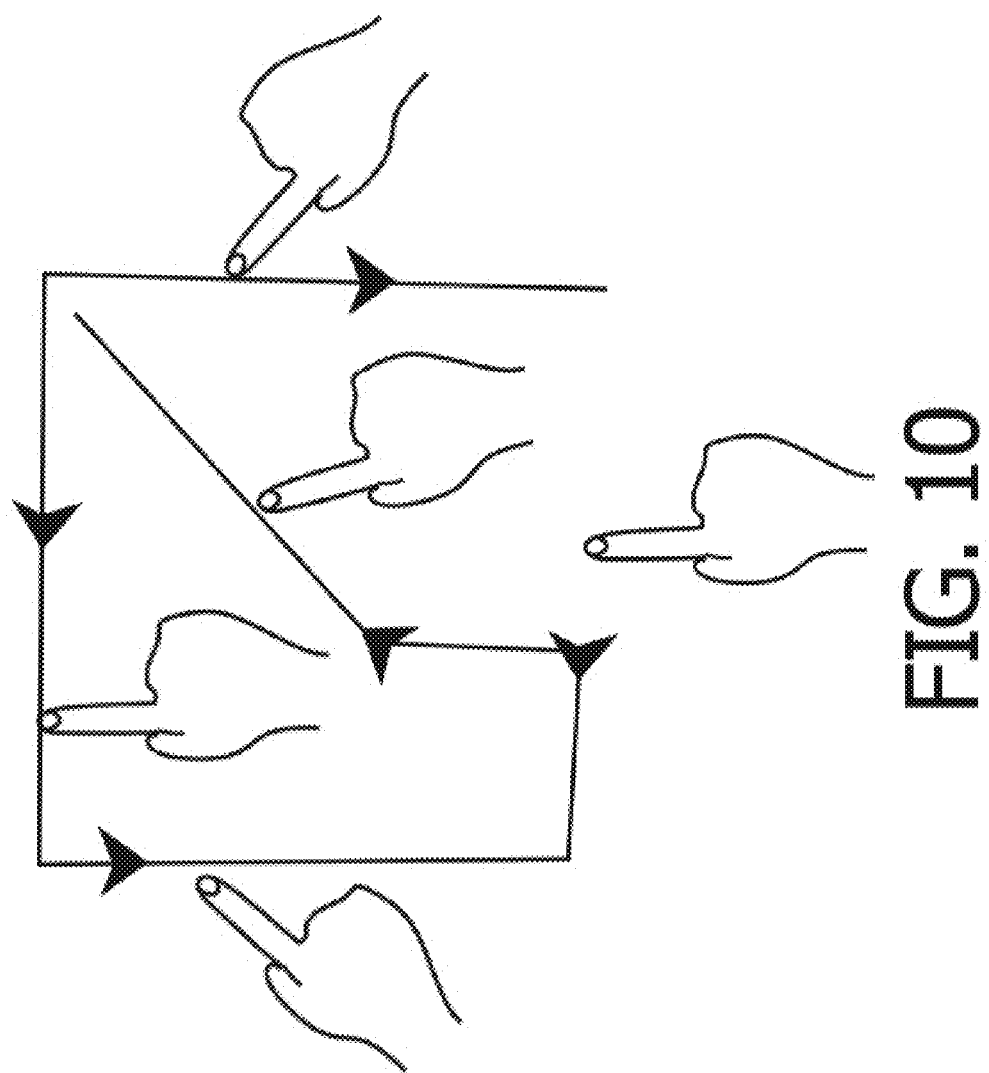
Figure 11:
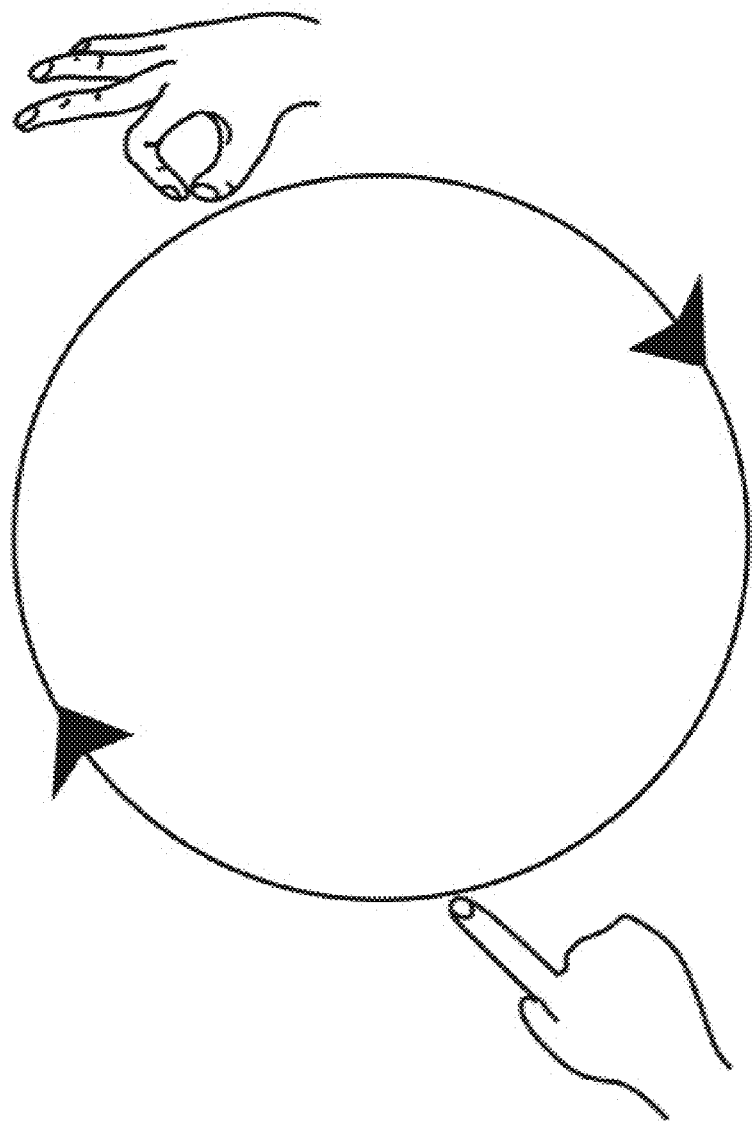

In one aspect of the present disclosure, a gesture is considered as a mixture of hand postures and hand trajectories, identified in three subclasses. The first class is posture only as depicted in FIG. 9, the second class is trajectory only as shown in FIG. 10, and the third class is their mixture as illustrated in FIG. 11. It can be noted that in the trajectory only subclass of FIG. Xb, the hand trajectory maps out the shape of rectangle, and the posture of the hand along this trajectory is irrelevant. In the first class, each posture is considered to be a gesture, thus it is an event which does not occupy time. In the second and third classes, each gesture is a sequence, with each shot in this sequence representing the position and posture of hands at a point in time. Thus, a gesture in the second and third classes occupy a period of time.

Recognition of posture in the first class (FIG. 9) is relatively easy due to easy segmentation of the image of the hand. However, recognition of the second class is more difficult since automatic segmentations are needed. The difficulty of recognition of third class depends on how the gestures are utilized. For example, if the posture is constant in the whole procedure of a gesture and it can thus be used to segment the gesture, the recognition becomes much easier. On the other hand, if the posture varies in the procedure of a gesture, then recognition is more difficult.

The present disclosure contemplates a framework having two phases: training phase and testing phase. In the training phase, the input includes sequences of gestures, with each sequence having a label. The output of this phase is a model which will be used in testing phase to detect known gestures. The focus of the training phase is mainly the precision of classification, while the focus of the testing phase is on both efficiency and effectiveness. In the present framework, the training is different from traditional training, since in the traditional training the training data is automatically separated.

Training Phase

Figure 12:
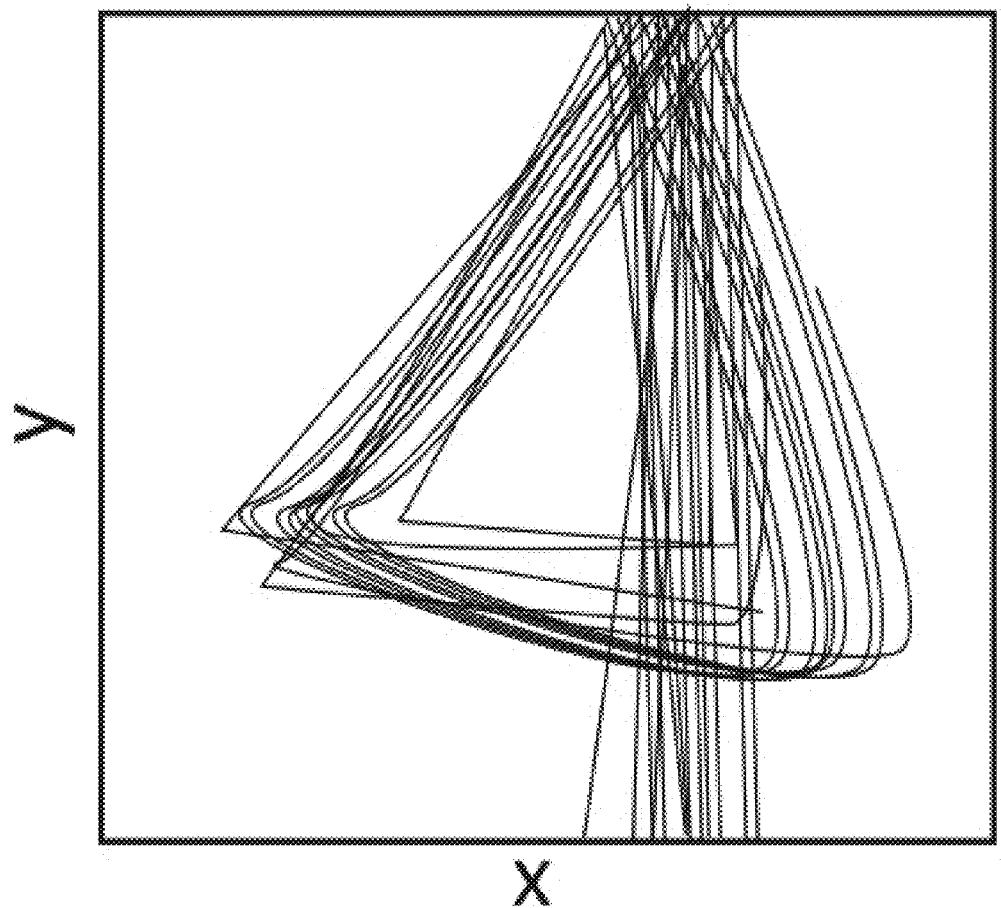
FIG. 12-13 are representations of gesture paths in a training phase of the present system.
Figure 13:
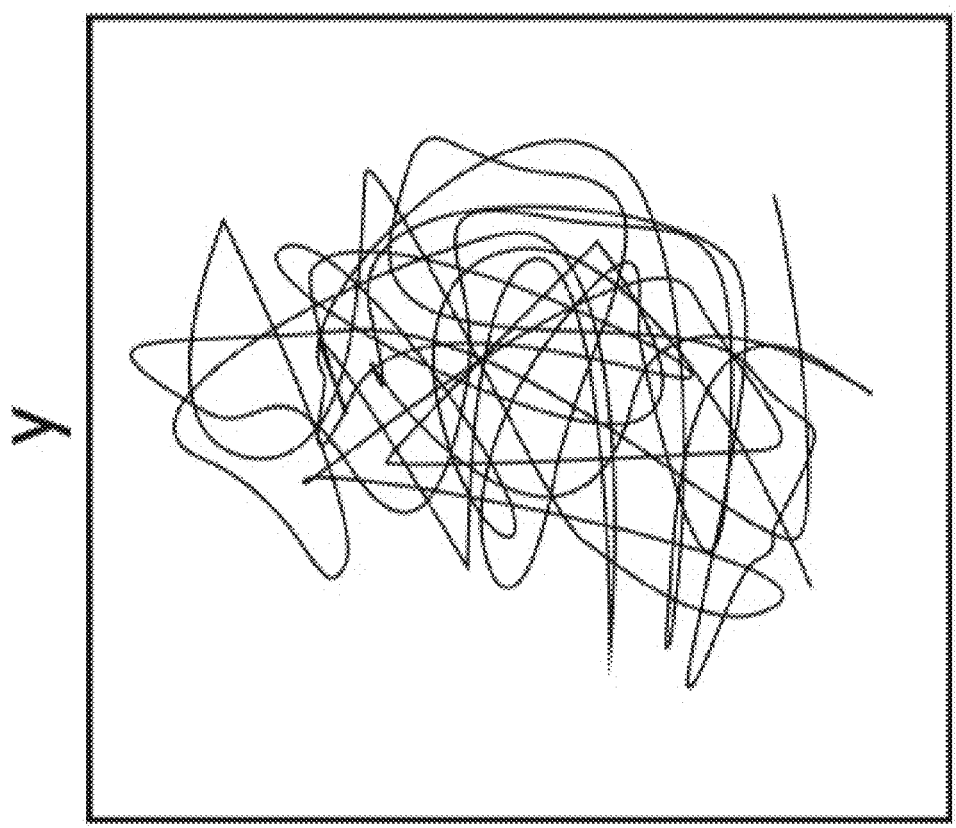
Figure 14:
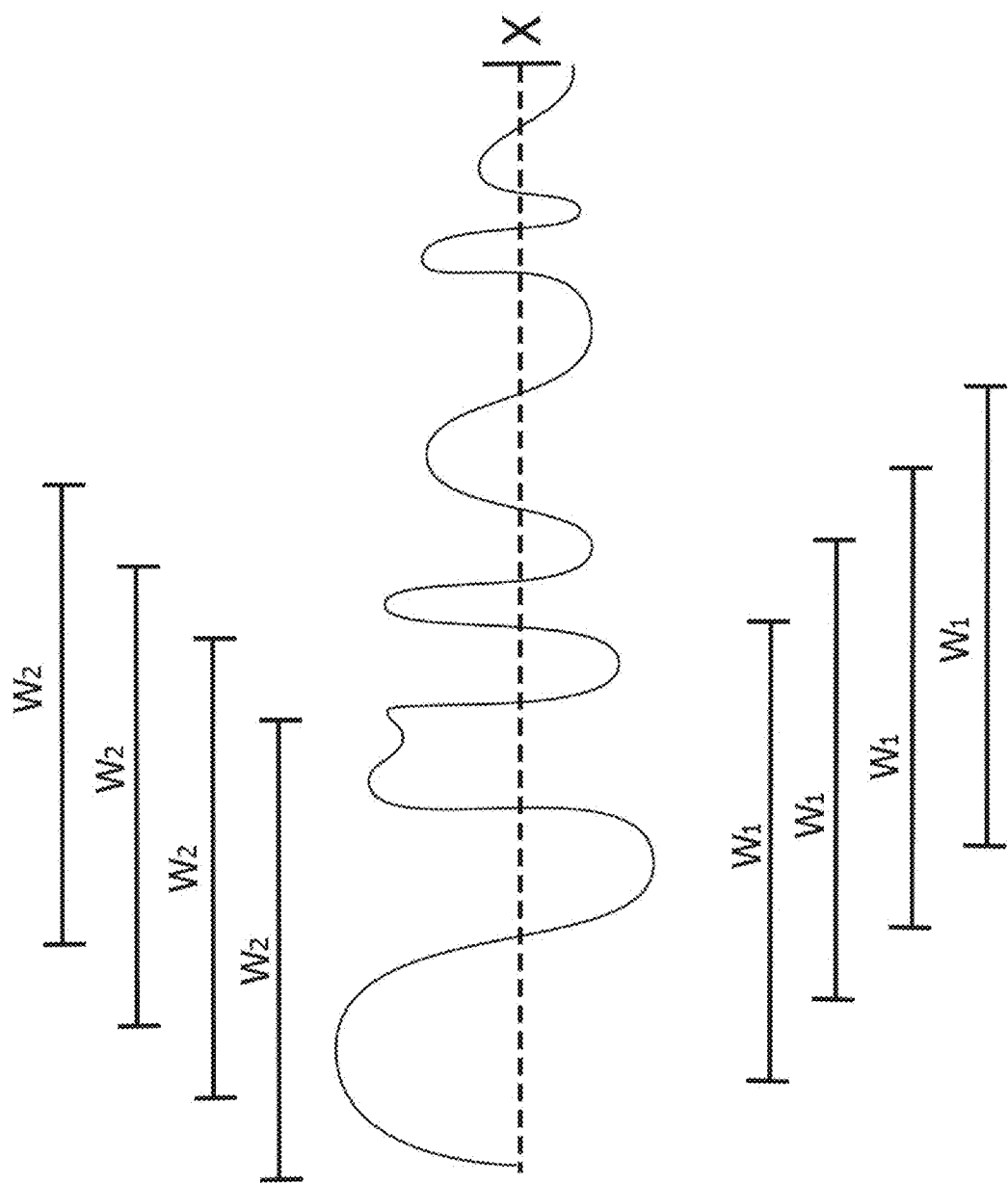
FIG. 14 is a graph of sampling using a gesture using multi-scale sliding time windows in accordance with one aspect of the present disclosure.
Figure 15:
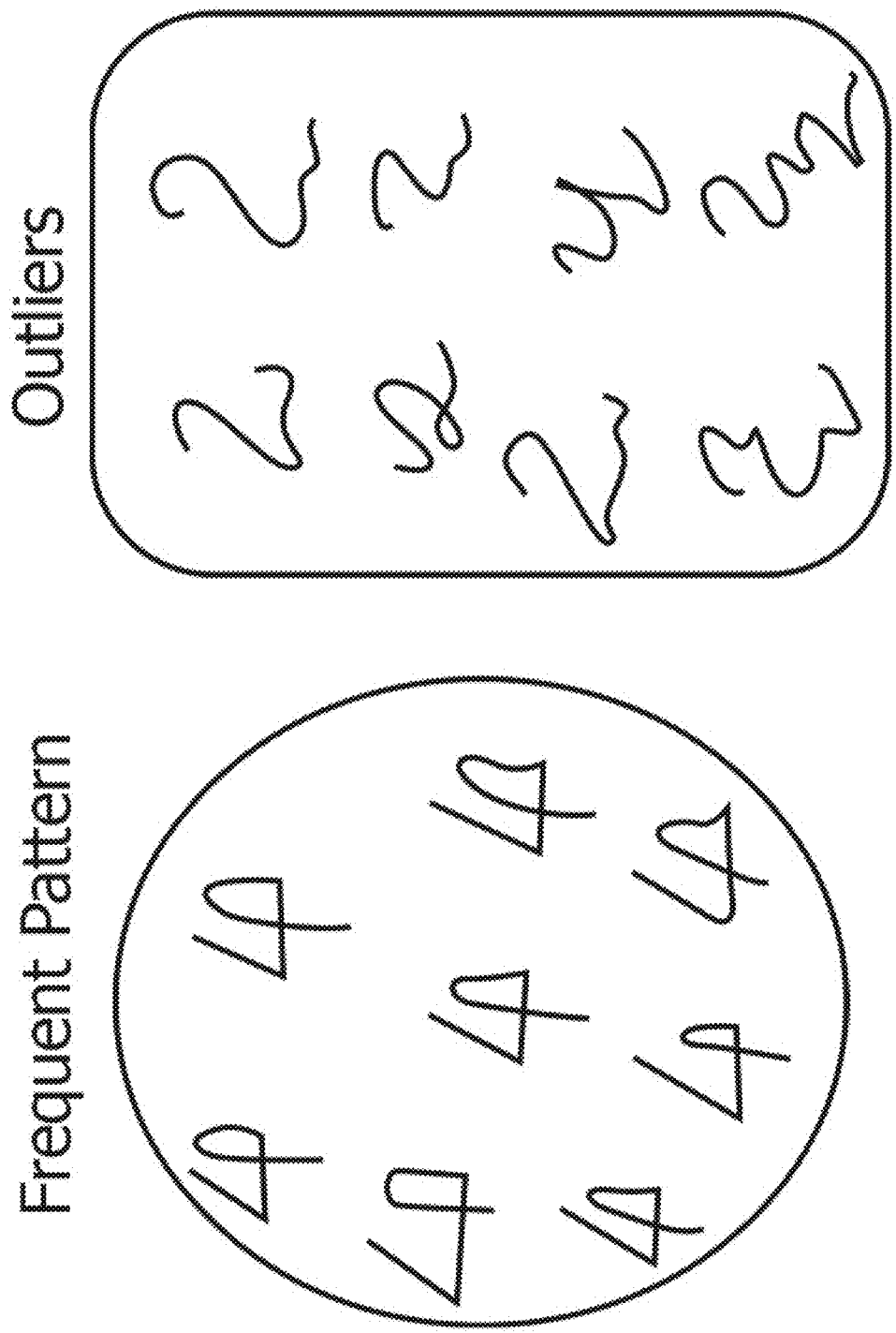
FIG. 15 is a representation of gesture movements separated into movements constituting a frequent pattern and movements that are outliers, according to a training phase of the present systems and methods.
Figure 16:
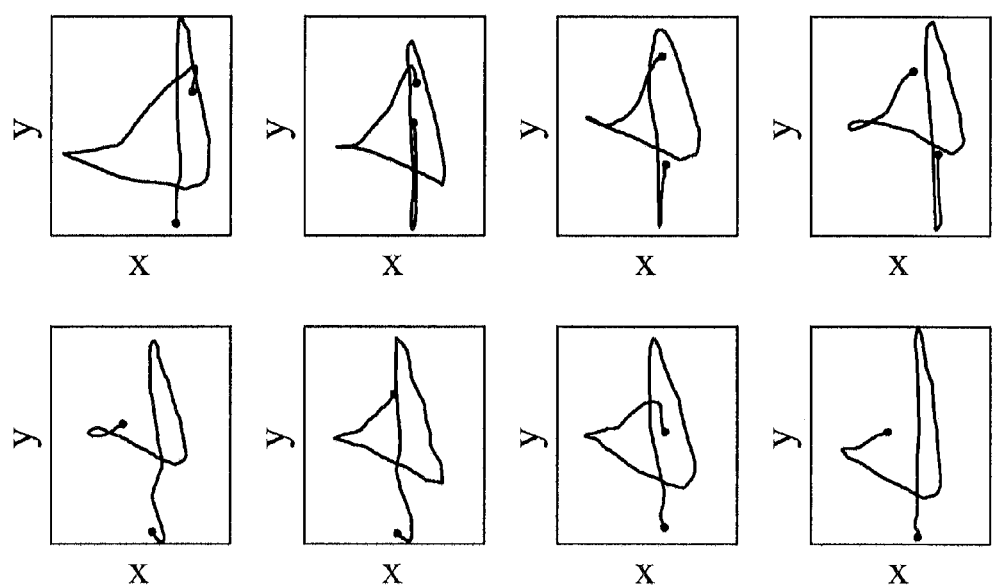
FIG. 16 are representations of frequent patterns for the numeral "4" that are evaluated in the training phase disclosed herein.

In the present framework, the training data is an entire trajectory with no segmentation. Thus, the training phase needs to automatically segment the trajectory. FIG. 12, 13 show two trajectory sequences that are the inputs for training. The problem is solved by first using a multi-scale sliding window to get a large number of instances, and then finding frequent patterns in the obtained data set. This is because a gesture to be recognized appears frequently in the training sequences, but other gestures only appear a few times. Thus, the gestures to be trained can be filtered out. This process can also be considered as a process of cleaning training data. FIG. 14 shows a method of obtaining training data using multi-scale sliding window. FIG. 15 shows the automatically segmented training data, where real trajectories of the digit "4" form a frequent pattern, and can thus be detected. Other trajectories will be considered as outliers, to represent the class "unknown". In this way clean training data is obtained, as well as training data for the class "unknown". FIG. 16 shows some examples in the frequent pattern of the digit "4". Since the present method can automatically find important characteristics to recognize and discard irrelevant characteristics, the training samples can have large variances, which can be important in a 3d space in which the variances are usually very large.

Figure 17:
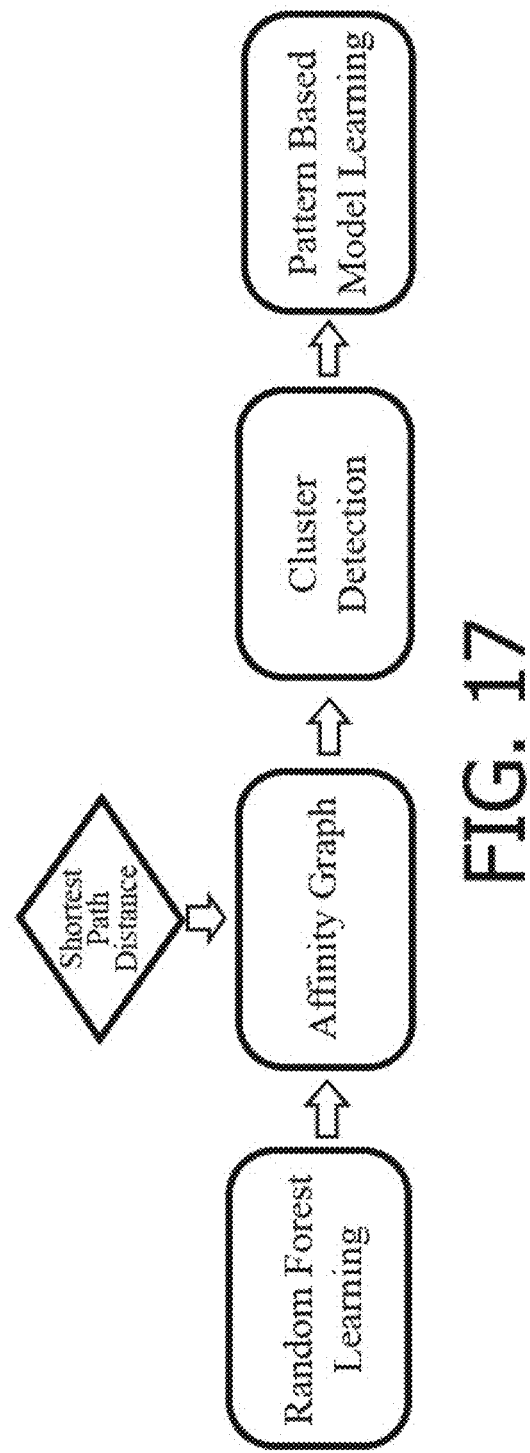
FIG. 17 is an overview of the gesture training phase for the systems and methods disclosed herein.

FIG. 17 shows a flowchart of the training phase disclosed herein. Generally speaking the framework includes four modules—random forest learning, affinity graph, cluster detection and pattern extraction. The random forest framework is utilized to identify discriminative features. Discriminative features appear unbalanced in different classes—that is, some classes tend to have these features, while other classes do not. In contrast, non-discriminative features are likely to appear in many classes in nearly equal probabilities. Due to the differences between discriminative features and non-discriminative features, in the process of training a random tree, the discriminative features have a much larger probability to be chosen.

Instead of classification, the present framework utilizes the affinity information embedded in the trained random forest to build an affinity graph. The affinity information is embedded in the random trees in the following way: if two instances have a large affinity, that is, they have a high probability of belonging to the same frequent pattern, they tend to distribute into the same or nearby leaf nodes. Based on such phenomenon, a distance measure and a shortest path distance can be determined that well represents such affinity information.

The affinity graph well describes the landscape of clustering in the training data. In fact, each cluster on this graph represents a frequent pattern in the training data. Ideally, all frequent patterns can be found by enumerating dense clusters; however, it is hard to determine the number of frequent patterns in the practical applications. Instead of specifying the number of frequent patterns, the present framework relies upon a rough proportion of true inliers of frequent patterns in the training data, which is usually easily determined. Such alternative control also provides an obvious advantage in that it is not necessary to detect each frequent pattern one by one. Instead, each pattern can be detected simultaneously, as a large cluster in whole.

In a further aspect of the present framework, a model is trained using random forest with respect to all instances not belonging to the detected frequent patterns as outliers. That is, a new "unknown" class is added into the training data. The introduction of this new class brings in many benefits into the present framework. For instance, in the context of human-computer interaction, most gestures should be meaningless, thus not belong to any predefined meaningful classes. By regarding the instances in non-dense regions of an affinity graph as "unknown", it is not necessary to collect such instances for the training purpose. A second benefit is that since only high density regions are regarded as true inliers, it is possible to eliminate the noises in the training data, which is a severe problem for the traditional classification methods.

Figure 18:
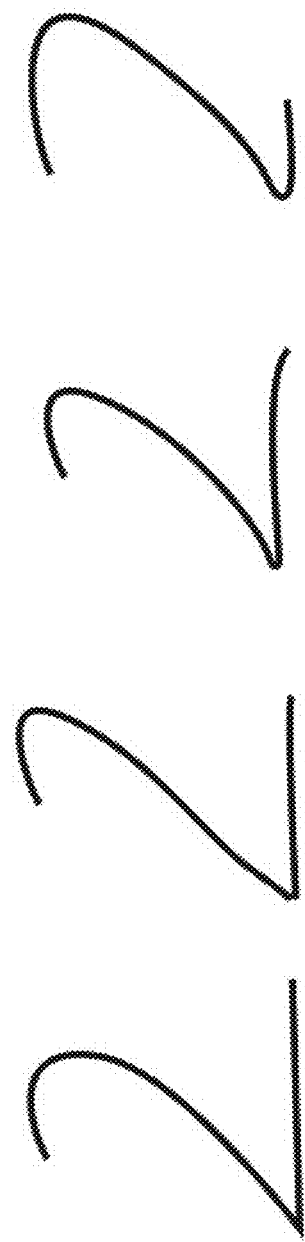
FIG. 18 are representations of gesture trajectories that can be recognized as the numeral "2" using the training phase disclosed herein.

For the trajectory of a gesture, in the frequent pattern there are usually partial gestures. The present framework can recognize a gesture by part of its trajectories and postures which can greatly boosts the performance of system and also reduce the response time. For example, in FIG. 18 some trajectories which will be recognized as "2". Note that some of the trajectories are only a part of the trajectory of "2", some even less than half, but the present framework can still correctly recognize them as forming a "2".

Testing Phase

Figure 19:
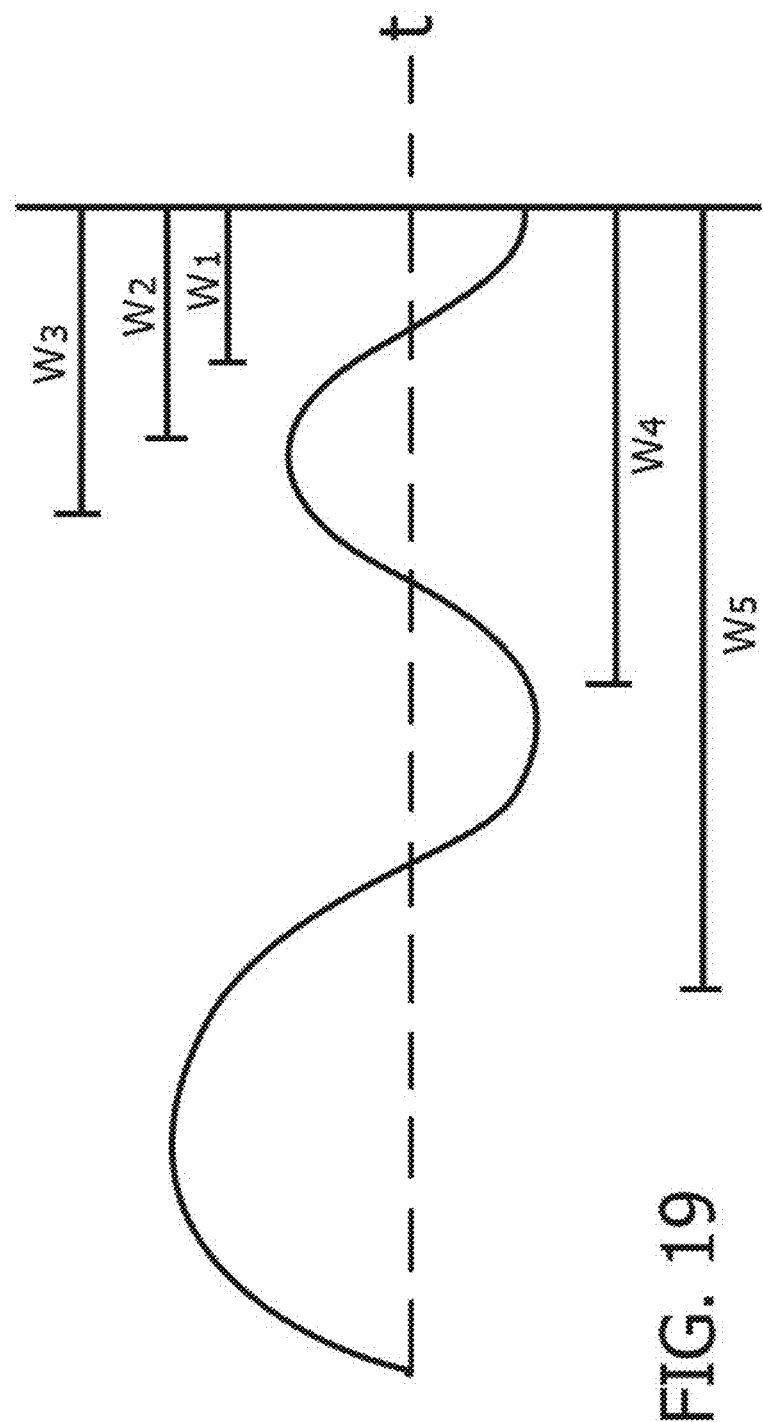
FIG. 19 is a graph of a multi-scale sliding time window used for gesture recognition based on trajectory.
Figure 20:
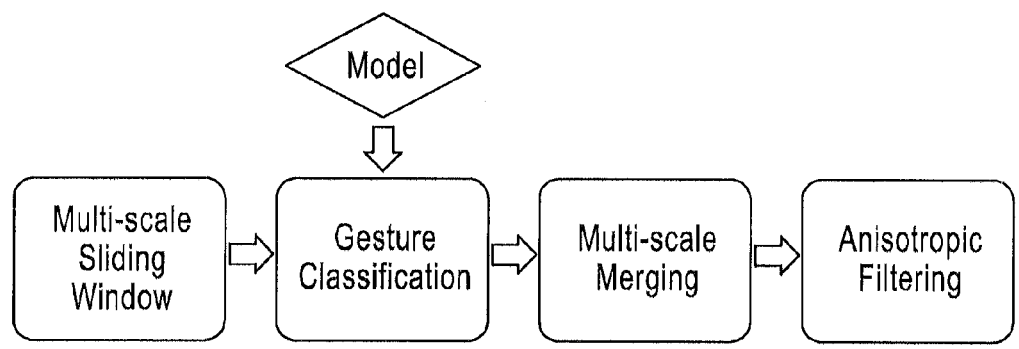
FIG. 20 is a chart of the testing phase for using the trained gestures from the training phase to recognize new gestures, according to one aspect of the systems and methods disclosed herein.

Since the duration of a gesture varies, it is essential to detect the gesture at multiple scales. In the present framework, at a time, multiple window sizes are traced back to get segments of gestures, and then these gestures are recognized by the model trained in the training phase. The graph of FIG. 19 and the flowchart of FIG. 20 illustrate the testing phase as contemplated herein. The testing phase uses the model trained in the training phase to recognize gestures. The gesture segments are segmented at multiple scales and then merged with the classification results. The merged result is usually noisy, therefore, anisotropic filtering is applied to smooth the output and get robust recognition.

In a typical gesture-based process, the user movement and behavior is continuous, so it is often difficult to determine the beginning and ending of a gesture. Even for the same gesture, different people perform the gesture differently, and the durations of gestures may also vary dramatically. Since a gesture can only be classified correctly at the correct scale, one way is to test a sequence of movements is at multiple scales. The sizes of the sliding windows are within a small range, usually 1~5 seconds. Thus, the number of scales is small—for example, 10 scales are usually sufficient. At each scale, a segment of sequence can be obtained using the sliding window. Before being classified by the model obtained in the training phase, some preprocessing is needed, such as resampling the sequence into a sequence of fixed dimensions. The processed sequence is then imported into the classification process to obtain its most probable label. Note that most will be classified as "unknown", which is a desirable property. At each time point, the sequences at multiple scales are considered and classified. To robustly determine whether there is a meaningful gesture or not at that time, it is crucial to make decisions based on all these classification results. Since the sequences at two adjacent scales should look similar, it is expected that they have the same labels. In other words, if there is a meaningful gesture, around correct scales, there should be multiple correct classifications. Based on this phenomenon, it is natural to detect the mode of the label distribution at all scales using a one dimensional variant of mean shift algorithm.

In the third step, the labels of sequences at different time are determined independently; however, there are strong dependences in the sequence of labels. In other words, the sequence of labels should be piecewise constant, and the changes between labels should be highly biased. This phenomenon suggests that an anisotropic filtering process is needed to suppress the noises in the labels. The aim of this process is to eliminate the pulse noises in the label and make it piecewise constant.

Inference of User Intent

Figure 21:
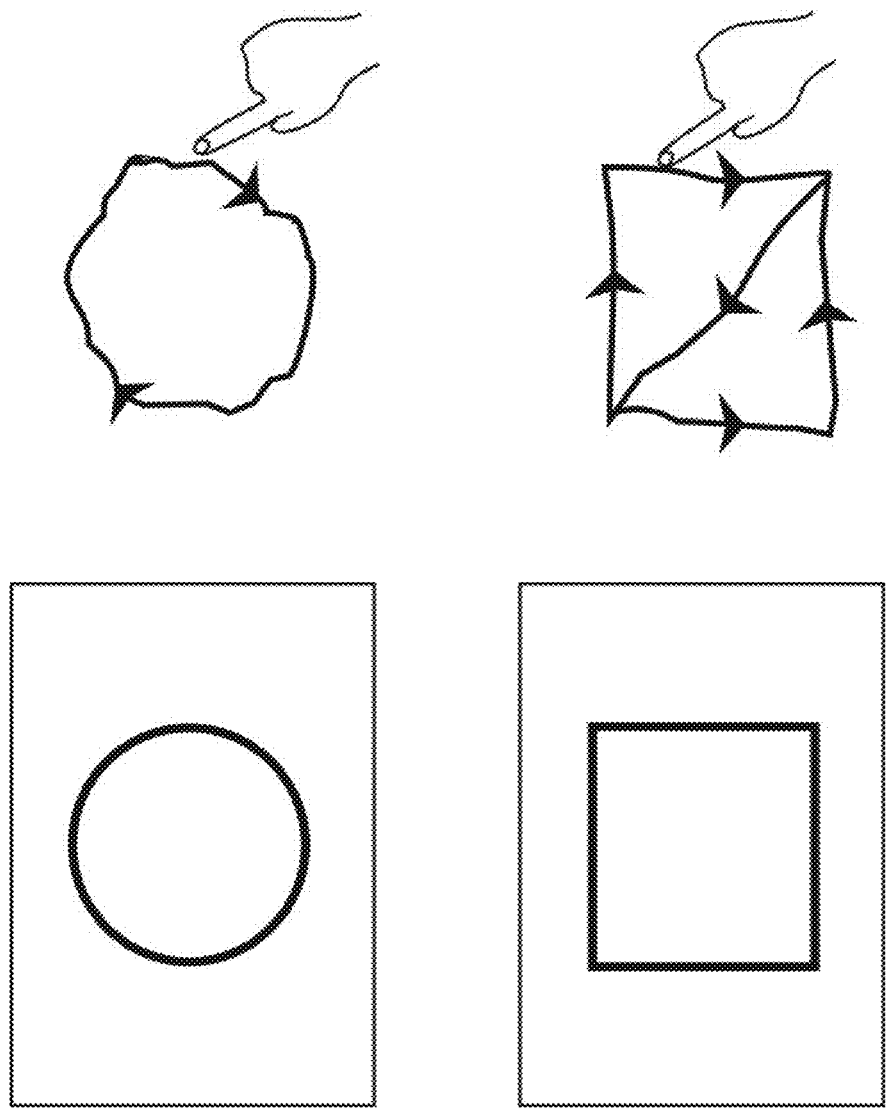
FIG. 21 is a representation of an expressed intent by a user's gesture to draw a circle and a square.

In human-computer interaction, determining the user intent is the most critical step, and also probably the most difficult step. Traditional interaction devices, such as mouse and keyboard, use clear physical signals to notify the computer of the user's intention. However, this is not true in the context of interactions by gestures because there is no signal which notifies the computer that users are intent on doing something—i.e., there is no "click" of the mouse or keyboard or the "touch" signal on a tablet. Moreover, most of time the user does not intend anything in particular or even intentional. Since no physical signal can be used to determine the user intent, it depends on the recognition of gestures to find out the user intent, which requires high precision of the recognition system. Consequently, the present system relies on the definition of meaningful gestures that represent certain user intent, while the remaining gestures are meaningfulness. For example, in FIG. 21, the user uses the trajectories of circle and rectangle to notify the computer that he want to draw a circle and a rectangle.

3D Navigation by Gestures

Navigation is the basic tool for nearly any human-computer interaction systems. It offers the basic functionality to explore the interaction space. Usually, navigation involves only a few basic operations, although these basic operations differ on different interaction paradigms. In the context of the present disclosure for shape creation with gestures, the basic operations are: translation, rotation, scaling and selection. Each basic operation corresponds to a specific gesture which can be robustly recognized. When choosing gestures, there is a balance between naturalness and difficulties of recognition. Some natural gestures are not easy to recognize, especially the gestures which fall into the third class described above. 3D Navigation by gestures as contemplated herein is context based. The relative position between the user's hands and the shape is also taken into account to recognize users' intent accurately. Two basic postures—grab and extend (FIG. 22) are used to indicate engagement and disengagement respectively.

The following table enumerates the possible cases in gesture-based human shape interaction (not just limited to navigation) which are considered over consecutive frames. A keep status means that the current status of the shape remains the same as in the previous status. It is noted that if the grab posture starts from inside the shape, the status is deformation. If the grab posture starts from outside the shape, the status is navigation.

| Previous fame | Current frame | Status |
| --- | --- | --- |
| Extend, Outside Shape | Extend, Outside Shape | Disengaged |
| Extend, Inside Shape | Extend, Inside Shape | Disengaged |
| Extend, Outside Shape | Extend, Inside Shape | Disengaged |
| Extend, Inside Shape | Extend, Outside Shape | Disengaged |
| Extend, Outside Shape | Grab, Outside Shape | Navigation |
| Extend, Inside Shape | Grab, Inside Shape | Deformation |
| Extend, Outside Shape | Grab, Inside Shape | Deformation |
| Extend, Inside Shape | Grab, Outside Shape | Navigation |
| Grab, Outside Shape | Extend, Outside Shape | Disengaged |
| Grab, Inside Shape | Extend, Inside Shape | Disengaged |
| Grab, Outside Shape | Extend, Inside Shape | Disengaged |
| Grab, Inside Shape | Extend, Outside Shape | Disengaged |
| Grab, Outside Shape | Grab, Outside Shape | keep |
| Grab, Inside Shape | Grab, Inside Shape | keep |

| Previous fame | Current frame | Status |
| --- | --- | --- |
| Grab, Outside Shape | Grab, Inside Shape | keep |
| Grab, Inside Shape | Grab, Outside Shape | keep |

Figure 23:
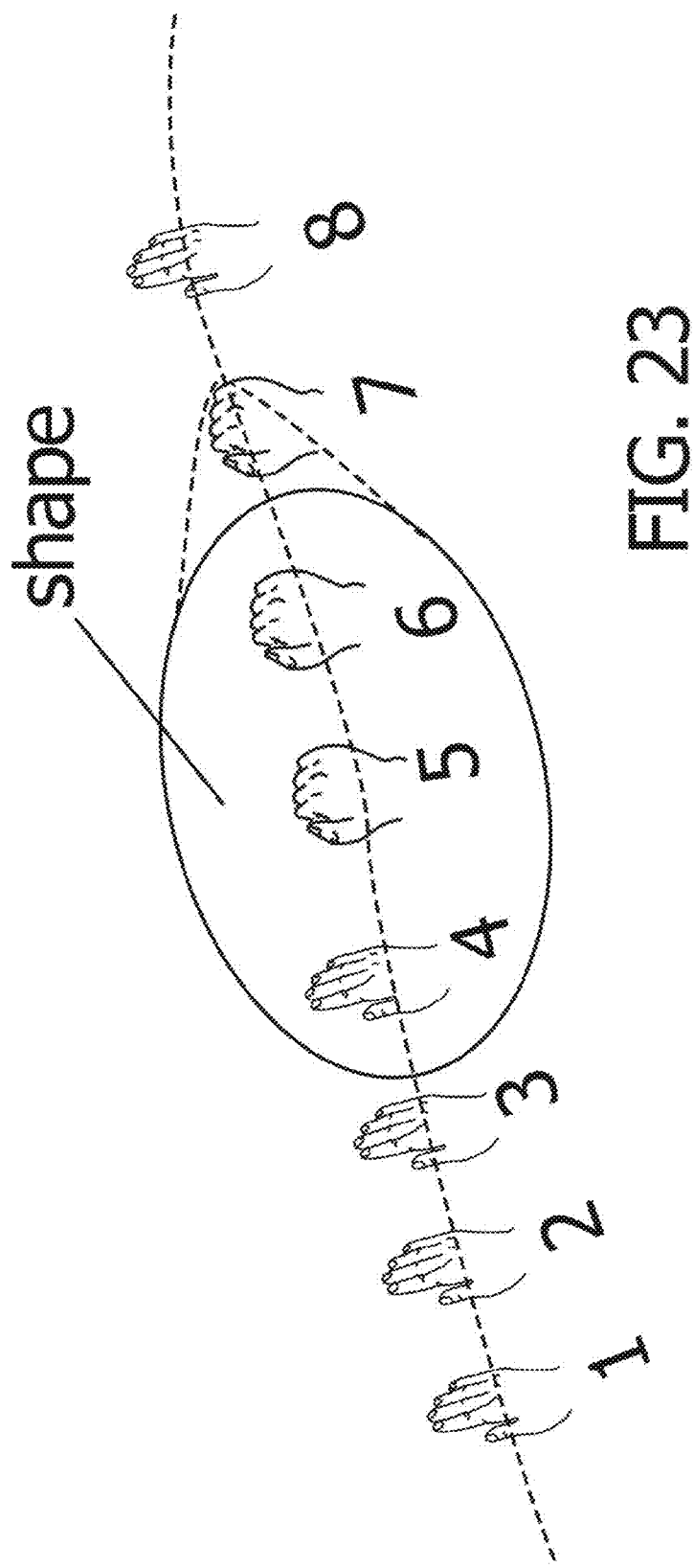
FIG. 23 is a representation of a sequence of hand gestures for deforming a virtual shape or object according to one aspect of the present disclosure.

FIG. 23 illustrates successive frames in a deformation case. Each hand indicates the posture of the hand in the nth of eight frames. In the first three frames the hand is in the extend posture outside the shape and the status is "disengaged". In the 4th frame the hand enters the shape while still in the extend posture, and the status is still "disengaged". In the 5th frame the posture changes to the grab posture inside the shape, resulting in the status changing to "deformation". According to the table above, status in the 6th and 7th frame is thus "keep", which means the status should remain "deformation" even if in the 7th frame the hand may go outside the shape. In the 8th frame the hand posture changes to extend, resulting in the status changing to "disengaged".

Figure 24:
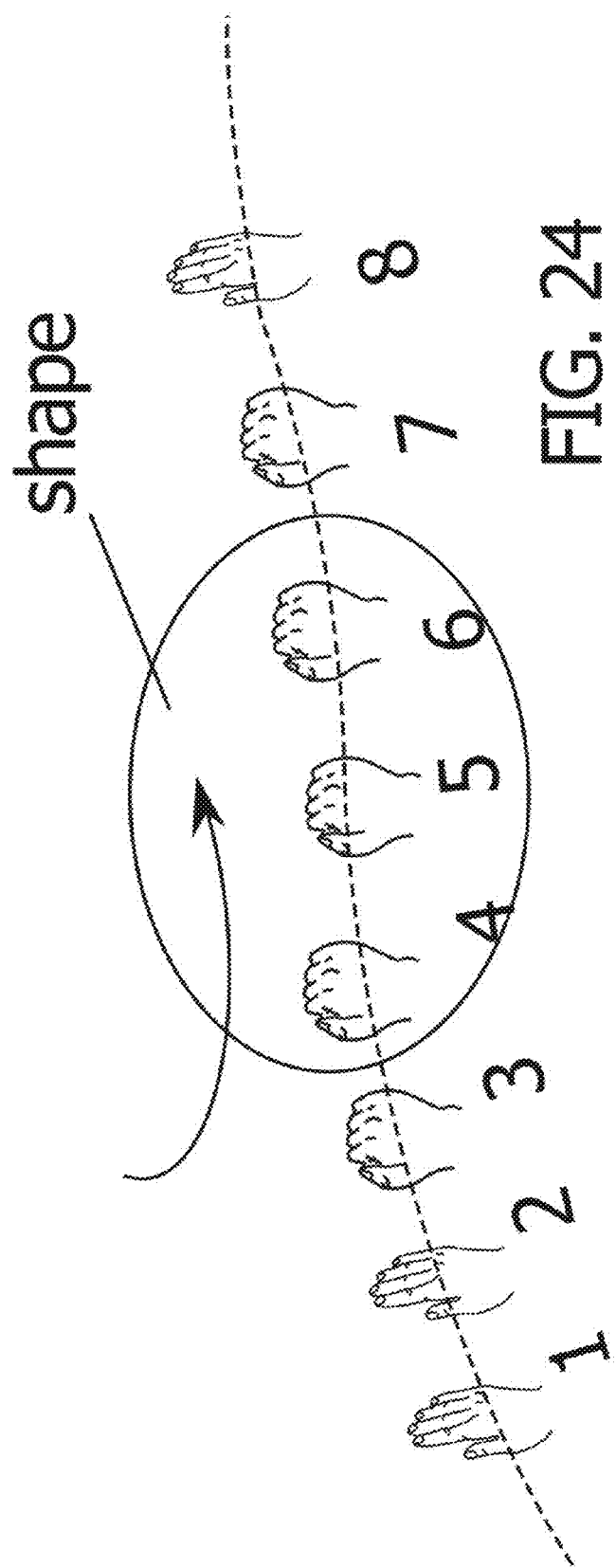
FIG. 24 is a representation of a sequence of hand gestures for rotating a virtual shape or object according to one aspect of the present disclosure.

FIG. 24 shows a rotation case. In the first two frames the hand is in the extend posture outside the shape so the status is "disengaged". In the 3rd frame the hand posture changes from extend to grab outside the shape, resulting in the status changing to "navigation". In the 4th frame the hand enters the shape while still doing grab posture so the status is changed to "keep", which means the status should remain "navigation". According to the table above, status in the 5th, 6th and 7th frame is "keep", which means the status remains navigation even if in the 7th frame the hand is outside the shape. In the 8th frame the hand posture changes to extend, resulting in the status changing to "disengaged".

Detailed gestures in navigation show as follows. In each case the hand starts from outside the shape.

Translation: Two hands move without changing relative position. Both hands are in the grab posture. The displacement vector points from the middle position of the initial two hands to the middle position of the final two hands as depicted in FIG. 25.

Rotation: One hand is in the grab posture while the other hand is in the extend posture. The grabbing hand controls the rotation. The rotation center is the screen center as shown in FIG. 25.

Figure 26:
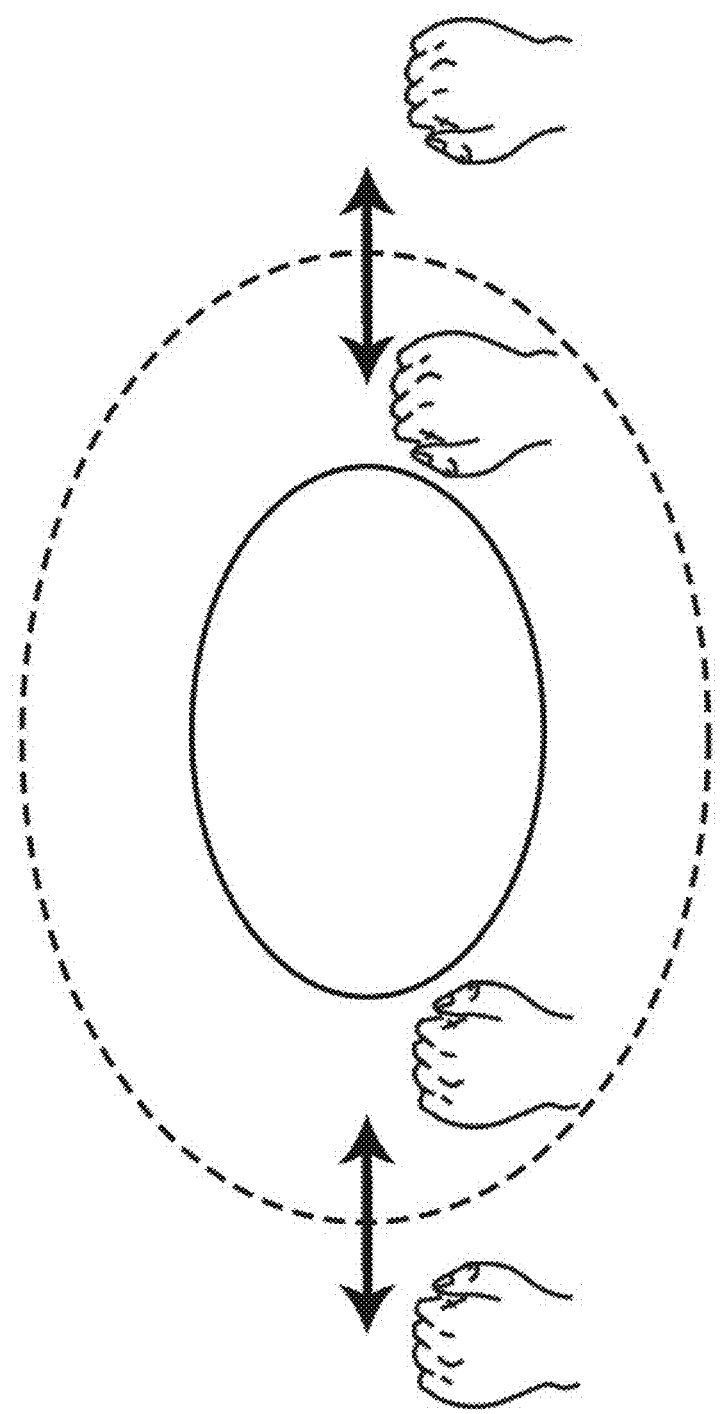
FIG. 26 is a representation of two-handed gestures for scaling a virtual shape or object according to a further aspect of the present disclosure.

Scaling: Two hands move away or close to each other horizontally. Both hands are in the grab posture. The scaling factor is the ratio of the initial and final distances between the two hands as illustrated in FIG. 26.

Context

The third prong of the SGC-I framework is context. Context is the element that connects the intended design operation on a 3D shape to the intention specified by the gesture from a user. In the real world, the behavioral properties and shapes of objects provide natural affordances to facilitate interactions with them using naturally evolved hand and arm movements (i.e., gestures). The present system and method capitalizes on this ability innate within all human designers to provide a reliable connection between human actions and the shape exploration process. Context thus serves as a computational method for encapsulating human actions to interface users' actions into coherent intents in the shape exploration process. The context is derived by the combination of the hand parameters, such as postures, locations and velocities, and the spatial proximity of the hands with respect to a given virtual shape or object. Here, spatial proximity has two components, namely the distance (nearness) of the hands from the virtual object and the prescribed location on the virtual object to which the hand(s) is (are) proximal (near). This representation is dependent on the representation of a shape only to the extent of defining the proximity of the user's hands to the shape.

The present system and method further contemplates a "shape search" feature in which contextual suggestions provided by the user through the SGC-I framework may be used to submit a search query. For example, the context of a user's gesture can indicate a search query to search through an array or database of virtual objects, including newly modeled objects, scans of existing 3D objects or previously modeled virtual objects obtained from a local repository or the internet. The results from this query may provide a virtual shape to modify or may be combined with other virtual objects to generate a distinct new object. The new object obtained from the query may also guide the creation process of the user in the SGC-I framework.

In certain embodiments, the SGC-I framework enables the automatic deduction of the nature and extent of geometric constraints imposed on the design, modification or manipulation of virtual objects by interpreting human gestures and motions. Through this process the representation of a shape can be tied seamlessly to the human interactions that are possible with the shape.

Gestures for 3D Shape Interactions

In the 3D design process, a holistic combination of computational ease, time efficiency and feasibility of readily usable gesture classifications and their application to shape creation is a challenging task. While multi-camera systems are advantageous in handling occlusions, they require careful positioning and proper calibration. On the other hand, methods which use monocular images involve modeling or estimation of features which are unobservable due to projections and occlusions. Further, environmental variations such as lighting, illumination and background clutter can significantly affect the appearance of hand and arm. In view of these difficulties, the present system and method contemplates a multi-representation multi-method architecture to achieve context-driven, robust, real-time hand gesture recognition.

Figure 3:
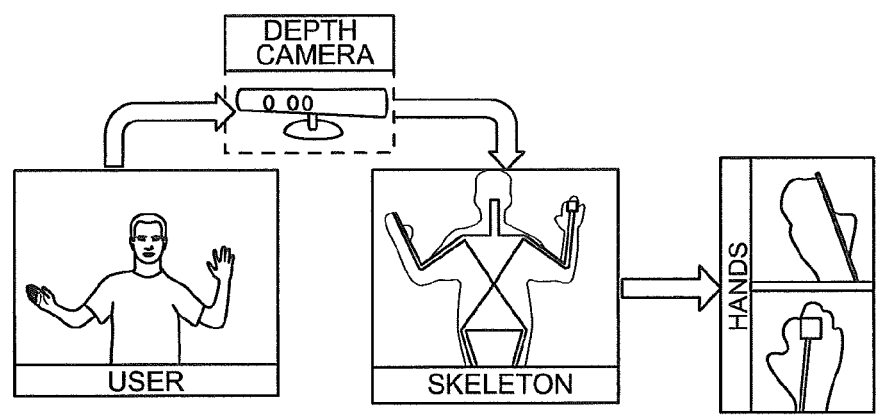
FIG. 3 is a pictorial representation of the use of a depth camera to extract skeletal or hand position data for use with the systems and methods disclosed herein.

In accordance with the present invention, the movements of the hand and the arms of the user are captured through a commodity 3D depth camera like the Kinect® camera system and are encapsulated within the above-mentioned computational framework. Important motion parameters such as locations, velocities and accelerations of the large-scale (shoulder and elbow) and small-scale (wrist and fingers) joints are deduced from the 3D depth data generated by the camera system and processed in the Gesture Module 20 resident in a computer of the data capturing or processing units. Algorithms within the Gesture and Context Modules 20, 25 interpret and decide what actions to take based on the spatial configurations and gestures of the hands in the context of a given shape modeling activity or operation. For instance, the Gesture Module may extract human skeleton 3D data and more specifically extract hand 3D data, as depicted in FIG. 3, with the Kinect depth camera system using open NI or the skeletal recognition features described in Published Application No. 2010/0199228 A1 of Microsoft Corporation, the disclosure of which is incorporated by reference. The algorithms thus isolate the hand (and arm) movements from the skeletal kinematics to generate 3D hand gesture data for use by the Context and Shape Modules (FIG. 2) of the system.

A variety of representations for hand postures and arm motions enable a wide variety of operations involved in the shape exploration process. The relevance of each of the hand representation schemes with respect to a given phase or operation is automatically decided within the computational framework and the most relevant scheme is used. Further, interactions with physical objects are connected with the human grasping capability. Thus, in addition to the standard kinematic models, the present system and method further utilizes grasp-taxonomy based representation of the hands and land-marking of several relevant regions of the hands which can be used in shape modeling and manipulation activities on a contextual basis. The conjunction of the various representations (kinematic, grasp-based, landmarks) of the posture and motion of hands and arms are used as the underlying input to the framework which transforms them to the intent and action. The data processing units 14 of the present system (FIG. 1) may include known software to accomplish each of these hand/gesture representation protocols.

Figure 4:
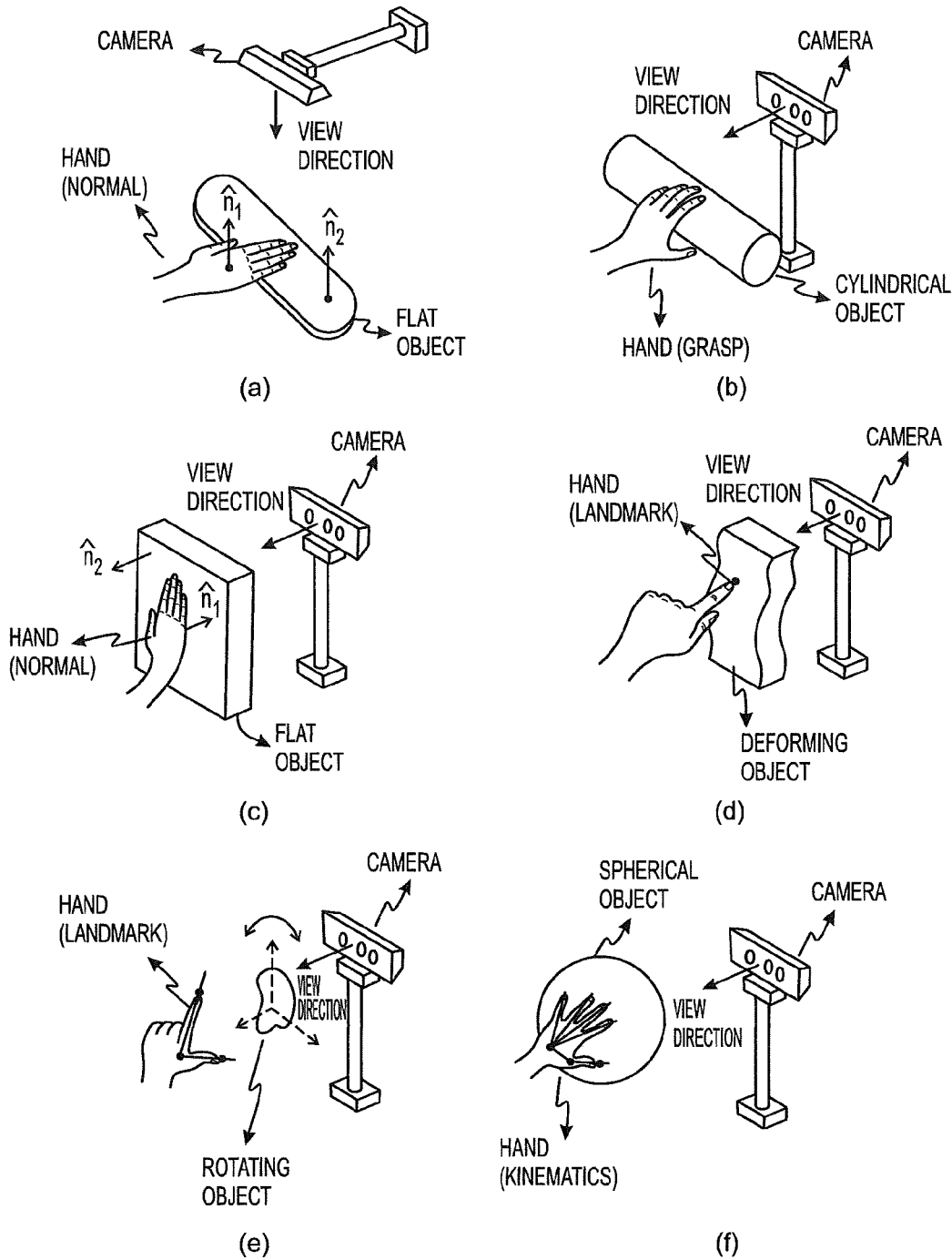
FIGS. 4(a)-4(f) are representations of exemplary interaction scenarios associated hand representations according to one aspect of the systems and methods disclosed herein.

The choice of hand representation (kinematic, grasp-based, landmarks) depends on: (a) the general nature of activity currently taking place; and (b) the fidelity and stability of the hand posture classification for the given camera view. For the present invention, exemplary interaction scenarios and corresponding optimal hand representations are depicted in FIG. 4. It is understood that all objects shown in FIG. 4 are virtual objects, so that they do not cause occlusions of any part of the hands or the body relative to the depth camera. For configurations involving the camera looking vertically downwards or for manipulating flat shapes, orientation estimation of the hands gives optimal information. Thus as shown in FIGS. 4a and 4c, the hand is represented simply by its normal vector $\hat{n}_1$, which is evaluated relative to the normal $\hat{n}_2$ of the virtual object being manipulated. For graspable objects, such as shown in FIG. 4b, a kinematic hand-grasp representation is best suited. For a hand-grasp representation a front-viewing camera system may be preferred, rather than a vertically looking camera, because the grasp posture of the hand is more easily recognized from a frontal camera orientation. For precise operations involving postures such as pointing, landmarks on the fingertips best represent the hands. Thus, as shown in FIG. 4d, a landmark on the end of a finger is sufficient to identify a single point deformation of a virtual object. In FIG. 4e, single plane rotation of an object may be identified with three landmarks on the hand along with movement of these three landmarks to signify the rotation. Complex manipulations utilize full kinematic hand pose estimation. For instance, manipulation of a spherical object, as depicted in FIG. 4f, requires consideration of the kinematics of the entire hand. It can be appreciated that the hand posture or pose in each figure is different. The Gesture and Context Modules 20, 25 of the present system 10 are operable to distinguish the particular hand posture and utilize the appropriate hand representation approach. Thus, while the modules may evaluate data for a full 3D kinematic representation of the user's hand(s), once the posture has been identified as a particular gesture, the pointing gesture of FIG. 4d for instance, the Context Module 25 can readily determine that the single pointing landmark is all that is necessary to describe the hand gesture and movement during the specific design step. Likewise, if the hand kinematics shows a flat hand representation, as in FIGS. 4a, 4c, the Context Module determines that the normal vector representation is sufficient to perform the intended design step.

The gestures shown in FIG. 4 are illustrative and non-limiting. Although other gestures and contexts will be discussed herein, no limitation is intended by such discussion. The range of gestures and their context can be very broad and may vary between users and even cultures. However, certain gestures are believed to be generally universal, such as the gestures shown in FIG. 4.

Modes for 3D Shape Interactions

The modes of 3D shape interactions are defined as the set of all possible ways in which a user can interact with a virtual object or shape using gestural inputs. The Shape Module 32 (FIG. 2) contemplates three primary modeling operations accomplished by the sub-modules for creation 33, modification 34 and manipulation 35 of shapes. The Shape Module 32 identifies a further operation, namely shape iteration 36, which allows the user to iterate on the design of a particular shape, from its initial creation or from successive modifications. Additional or auxiliary operations are also contemplated, such as replication, assembly, deletion and documentation of 3D shapes. These auxiliary operations may be implemented by a separate input protocol, such as through a keyboard or mouse, or instead also (and more preferably) be based on hand gestures and movements. The Context Module 25 is capable of distinguishing gestures and intent indicative of a desired auxiliary operation.

Figure 5:
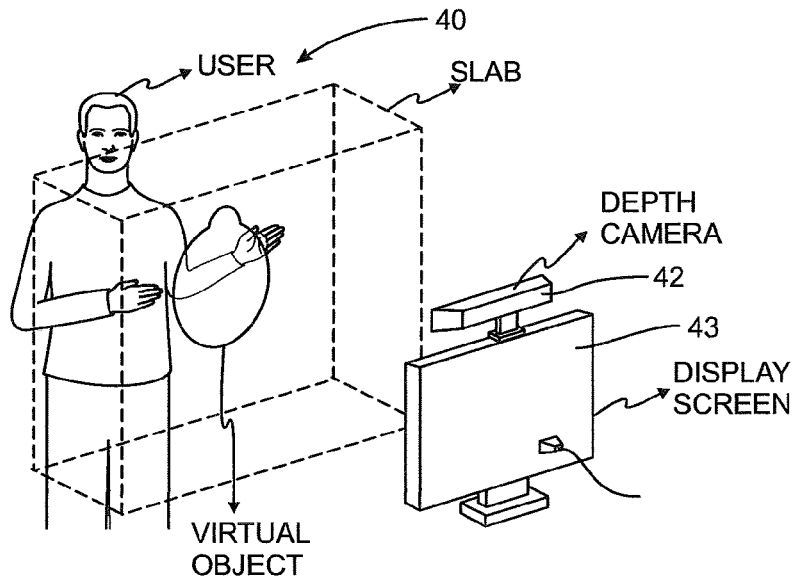
FIG. 5 is a representation of a user interaction in a 3D interaction space according to certain aspects of the systems and methods disclosed herein.
Figure 6:
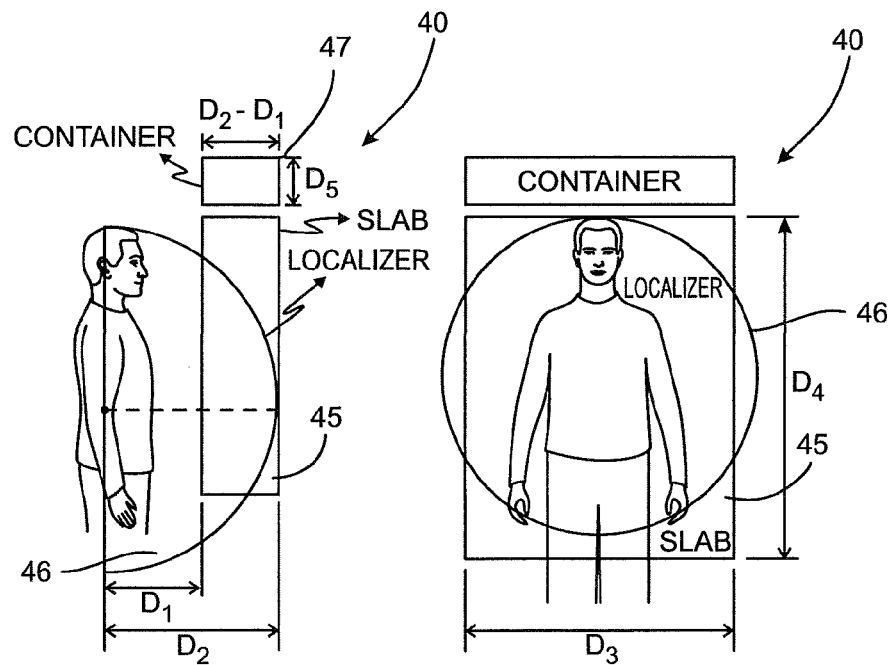
FIG. 6 includes side and front representations of a 3D user interaction space for use in the systems and methods disclosed herein.

The present system and method operates within a virtual interaction space in the proximity of the user, as illustrated in FIGS. 5, 6. The interaction space 40 is defined as a set of prescribed volumes in a given environment in which a user interacts with virtual objects. In general terms, the 3D interaction space 40, is situated between the user and a 3D camera or depth camera system 42, as shown in FIG. 5. The system also includes a display screen 43, on which the depth camera may be mounted as shown in the figure. Alternatively, the display screen can be independent of the camera system, projected onto a screen or wall, or positioned at any location convenient for viewing by the user during the 3D design process. The display screen 43 is one of the visualization/feedback units 18 of the system 10 illustrated in FIG. 1, and is the vehicle through which the user can iteratively visualize his/her hand movements, the virtual object and the design steps.

In more specific terms, as illustrated in FIG. 6, the interaction space 40 defined and utilized by the present system 10 includes: (a) creation volume or slab 45; (b) selection volume or localizer 46; and (c) panel volume or container 47. The creation volume or slab 45 is defined as the volume bounded by a cuboid parallel to the frontal plane of the user and whose center is at a prescribed distance from the user. In one embodiment this center distance is $$\frac{D_2 - D_1}{2},$$

where the distances $D_1$ and $D_2$ are preferably prescribed as percentage lengths of the total arm length of the user. It is contemplated that the slab location and distanced $D_1$ and $D_2$ may be pre-set, provided in pre-determined selections (i.e., short, standard and long arm lengths), numerically entered by the user in setting up the 3D design system, or generated interactively in a calibration step in which the arm length is derived from a skeletal representation of the user standing with one or both arms extended toward the depth camera. It is understood that the horizontal location of the slab 45 is established at a location that allows the user to produce natural hand and arm movements within an interaction space that is continuously monitored by the 3D depth camera system. The width ($D_3$) and height ($D_4$) of the slab may be defined as sum of the shoulder width and twice the arm length of the user. These dimensions can be generated in any of the ways described above, again with the ultimate goal being to create a virtual interaction that is comfortable for the user. In the case of multiple users of the 3D shape design system, the requisite dimensions $D_1$-$D_4$ can be stored in memory and assigned to a particular user to be accessed when the system is initialized by the particular user.

It can be appreciated that the slab dimensions must be calibrated to the field of view for the 3D camera system so that the hand position within the slab can be accurately determined. By way of example, the Microsoft Kinect® depth camera system has a range of about 2 to about 20 ft and an angular field of view of about 57° horizontally and 43° vertically. The angular field of view may be used to determine the necessary proximity of the user to the camera system in order to achieve the desired slab dimensions. For a typical slab dimension the user is preferably positioned about 6 ft. from a Kinect® camera system.

Figure 38:
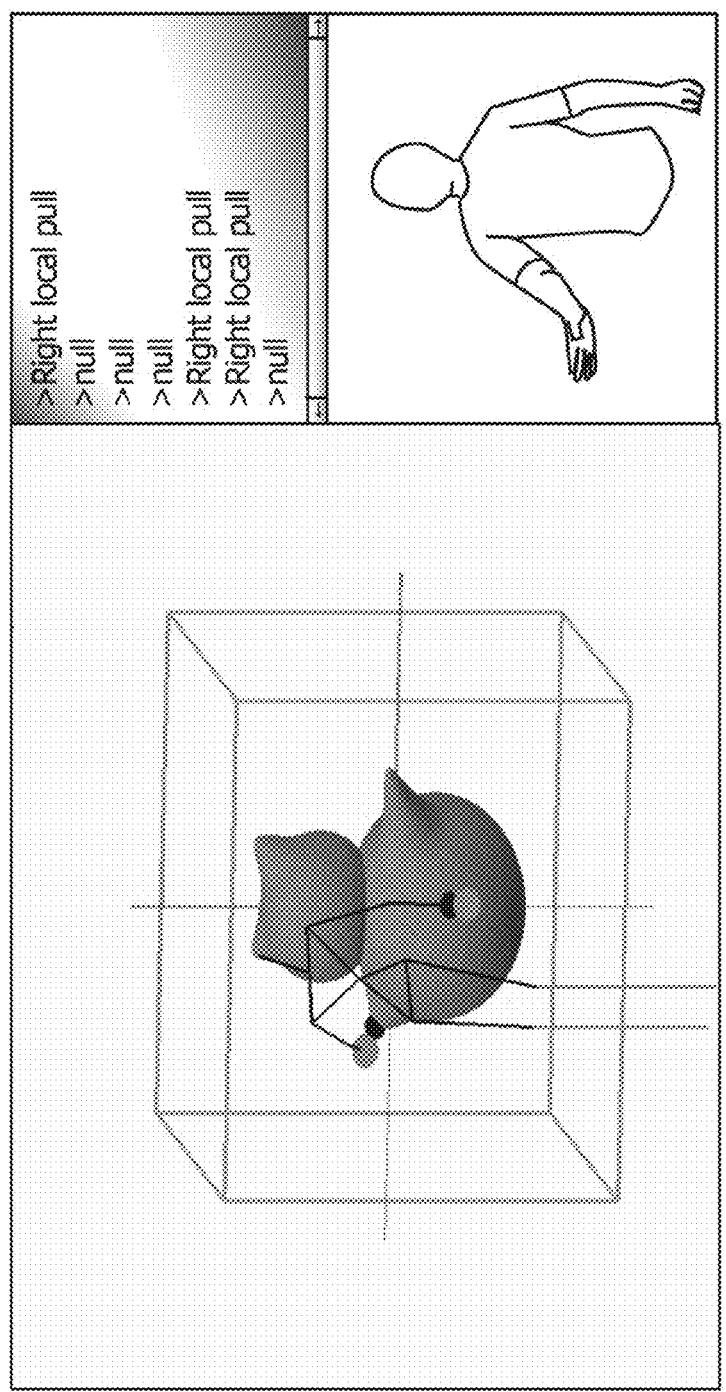
FIG. 38 is a representation of a virtual 3D model being modified by a user using a pinch gesture according to one aspect of the systems and methods disclosed herein.

In accordance with one aspect of the present system, the slab 45 can be used to invoke a 3D modeling process when the user's hand(s) are registered to be inside the slab. For instance, once the system has been initialized and the virtual slab defined by the system, the user may initiate a shape creation process by moving one or both hands into the virtual slab. To facilitate this process, the display 43 can show a representation of the virtual slab in relation to a skeletal representation of the user (such as shown in FIG. 3 or FIG. 38). Movement of the user's arms are interactively displayed so that the user can discern whether he/she has entered the slab. The visualization and feedback units 18 may also provide a visual or audible indicator when the slab has been breached to signify the beginning of the particular shape design process, such as shape creation.

The selection volume or localizer 46 is defined as a hemispherical volume of radius $D_2$ with its center at the user's center of mass. According to the present system 10, the selection volume is a virtual volume generated by the system to activate and highlight any existing virtual objects lying wholly or partly inside the hemisphere. Virtual objects situated within the localizer 46 can be selected by the user for modification or manipulations. In other words, the localizer indicates which objects are proximal to the user amongst a set of objects. It is contemplated that during a given design process the user may move virtual objects to and from the slab 45 and localizer 46.

The panel volume or container 47 is an auxiliary cuboidal volume above the slab where the user can temporarily keep selected virtual objects for future use. The dimensions of this volume can be $D_3 \times D_2$-$D_1 \times D_5$, where $D_5$ is may be equal to $D_2$-$D_1$. The data processing units define and maintain these 3D spaces virtually and can compare the 3D position data for virtual objects to determine whether they are within the slab, localizer or container, as well as to determine whether a virtual object has been moved by the user from one virtual location to another.

The Context and Shape Modules 25, 32 are preferably configured to respond only to gestures within the slab 45 when performing the shape creation, modification or manipulation steps. However, the Context Module may be capable of recognizing hand movements and gestures within the interaction space 40 but outside the slab 45, such as when the user moves a virtual object to and from the localizer 46 or container 47. It is further contemplated that the use of certain gestures outside the slab may be interpreted for performing auxiliary operations, such as saving a finished 3D design or erasing all or part of a shape or design. It should be appreciated that the system 10 is configured to "recognize" the virtual boundaries of the interaction space 40 and the specific volumes within and makes a determination in the Gesture Module 20 as to where a particular gesture is located, For shape modeling activities occurring on planar or surface configurations the area of visualization on the surface may be defined as the working volume or interaction space 40. Thus, as shown in FIGS. 7*a, b*, a virtual object 50 may be projected by a projector 52 onto a physical surface 51, 51', which may be planar as in FIG. 7*a* or three-dimensional or curved as in FIG. 7*b*. A depth camera 53 thus evaluates the hand gestures within the area of the physical surface, which may be predefined or sensed by the camera during initial set-up of the system.

Shape Modeling and Auxiliary Operations

A primary goal of the systems and methods described herein is to provide the user with the capability to interact with 3D shapes in a naturalistic manner to thereby facilitate the 3D shape modeling process. To perform the modeling and auxiliary operations, a set of hand postures are required which are natural to use in the sense that they associate with the intention of the user to perform a given operation. Thus, in one aspect, a set of seven hand postures has been developed, as depicted in FIG. 8. These hand postures include certain postures, namely release/press, grab, hold and pinch, which are primarily used for shape modeling operations such as object deformation. Certain postures, such as point and knife, can be used for modeling and for auxiliary operations based on their spatial configurations and context. For example, the point posture when used with one hand may refer to the intent of drawing a 3D curve, as depicted in FIG. 27*a*. However, moving the single finger in the form of an X on a virtual object can refer to a deletion action to delete the specific object, as shown in FIG. 27*b*. Similarly, the knife posture can refer to a replication action when both hands are in the knife posture, as in FIG. 27*c*, or can refer to a cutting operation on an existing object with a cut-through motion by a single hand as illustrated in FIG. 27*d*. The save posture of FIG. 27*e* can be an auxiliary posture to invoke a save function for a shape within the interaction space in the proximity of both hands. The same posture in a single hand can signify the planar rotation of a virtual shape, as in FIG. 5*e*. It is understood that the set of hand gestures depicted in FIG. 8 have been identified in one embodiment as intuitive or natural to the user to achieve a given intention. The Gesture Module of the present system is adapted to "learn" these gestures for a given user so that the interactive representation of the user's hand can be compared to the data base of gestures to determine the user's intent. These "pre-programmed" gestures may be modified by the user to fit his/her own intuitive behavior. Moreover, additional design actions may be correlated to other gestures by the user, with the Gesture Module again "learning" these gestures and associating them to a desired design intent.

In the present system the primary mode of shape creation is through the use of hand gestures. However, the present system also contemplates the use of virtual tools for shape modeling. For instance, as shown in FIGS. 28*a, b*, a pen tool 60 may be provided sketching on a 3D virtual surface, such as surface 51', and a "shaping" tool 61 may be used to perform fine modifications of a given shape. The shaping tool 61 can be of any general shape allowing the user to achieve different effects on the 3D shape. The pen and shaping tools 60, 61 may be virtual in the sense that they are inferred by the posture and/or movement of the user's hand. In each case, the hand posture for grasping the particular virtual tool may be unique, as in the case of grasping an imaginary pen. Alternatively, the tools may be real and physically grasped, in which case the data capturing units 14 (FIG. 1) and data processing units 16 may be configured to recognize the tools and translate their movement to a particular design operation. As a further alternative, the physical tools may include a sensor or visible marker indicative of the particular tool and its orientation. In this latter instance, the Gesture, Context and Shape Modules may be adapted to interpret the movements of the tools 60, 61 and make appropriate modifications to the virtual 3D shape.

The Shape Modeling Process

The shape generation and modeling systems and methods described herein rely upon hand postures and movements of the user. Thus, as a preliminary matter, it is envisioned that the observed locations of the hands may jitter, either due to noise in the input data or due to the inherent properties of the control of hand movements. The present system may be configured to avoid any adverse impact on the shape modeling process due to jitter. In the shape creation and modification process, smoothing functions may be applied to ensure that the resulting virtual shape/model is devoid of discontinuities. Alternatively or in addition, averaging techniques may be applied to the sensed location of the user's hand. As explained above, the context of a particular gesture includes evaluation of proximity of the user's hand to a virtual shape and the location on that shape. Proximity and location may be evaluated within a predetermined error range about the true virtual location of a point on the virtual shape, and the Shape Module of the system may "lock" the hand or finger position to follow the true 3D position on the virtual shape as the hand is moved.

In the process of shape creation, predetermined rules may be implemented to map the hand movements to inherent geometric constraints of a desired shape. For instance, in a very simple case, a cylinder may be generated by vertical movement of the hands in a pointing posture spaced apart by a Euclidean distance equivalent to the diameter of the cylinder. As the hands move upward to define the vertical extent of the cylinder, the resulting virtual cylinder can be provided with a constant diameter along a vertical skeletal axis even if the sensed hand positions deviate from the virtual cylinder surface. Deviation of movement of both hands from the virtual skeletal axis outside a predetermined threshold can be interpreted as a deflection of the skeletal axis, with the cylinder diameter remaining constant along the modified axis. Deviation of the Euclidean distance between the hands beyond a predetermined threshold can be interpreted as a change in diameter of the cylinder. Similar rules may be applied to the creation of other geometric 3D shapes, such as cubes or spheres. The foregoing are exemplary of approaches that can be implemented to account for jitter in the true or sensed position of the user's hands during the 3D modeling process, while other techniques are contemplated.

Figure 29:
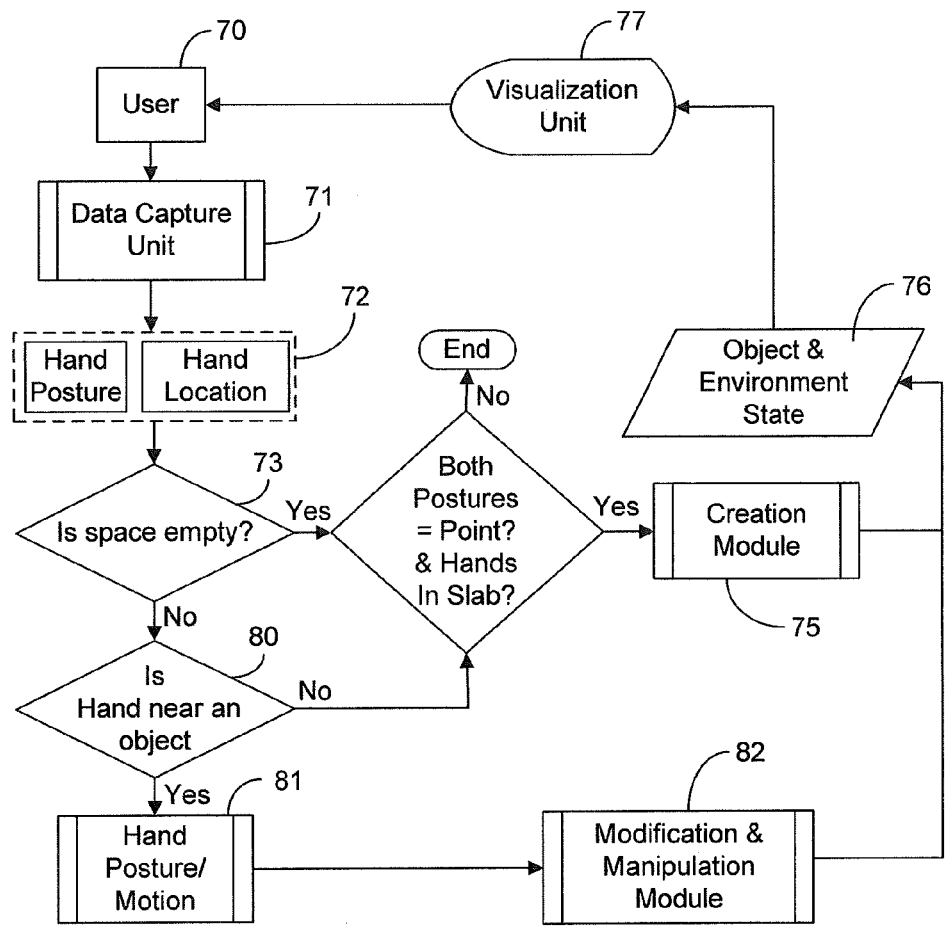
FIG. 29 is a flowchart of a 3D modeling process according to one aspect of the systems and methods disclosed herein.

An overview of the present 3D modeling process is shown in the flowchart of FIG. 29. As reflected in the flowchart the process steps all flow through the user 70. The user's movements are sensed by the data capture unit in step 71 and the Gesture Module is invoked to generate the hand posture and hand location data at step 72 for use by the Context Module of the system. In the ensuing conditional step 73 the Context Module may determine whether the interaction space 40 or slab 45 (see FIGS. 6, 7) is empty, or whether a virtual shape is already present within the interaction space adjacent the user. If no shape is present within the space the Context Module then evaluates the hand posture and location data in step 74 to determine whether both hands are located within the slab and whether the posture of both hands is a "point", as illustrated in FIG. 8e. If both conditions are met, the Context Module determines that the user's intent is to generate a new 3D shape, so control passes in step 75 to the Shape Module, and particularly to the Shape Creation sub-module 33.

As shown in FIG. 29, the process flow continues to determine the state of the virtual object being generated as well as the environment in step 76. In this step the data processing units continuously update the 3D model of the shape being generated, as well as the representation of the environment and user position within the interaction space 40. This information is fed in step 77 to a visualization unit to be observed by the user. The user 70 then continues the hand movements to achieve the design intent, with the movements being continuously captured and analyzed as the process loops between steps 70 and 77. It can be appreciated that until a new virtual object is generated and recognized within the interaction space the conditional step 73 will always be answered in the affirmative, meaning that the space is empty. Moreover, as long as both hands of the user are within the slab 45 the process will continue through the shape creation sub-module. The completion of the desired shape is signified by the user moving one or both hands out of the interaction space/slab, in which case the conditional of step 74 will be answered in the negative and the creation process is terminated. The Shape Module 32 (FIG. 2) then fixes the data describing the newly generated shape and adds the virtual shape to the slab in step 76. The completion of the design process may be displayed in step 77 for the user after which the user can make additional gestures to further process this virtual object.

Figure 30:
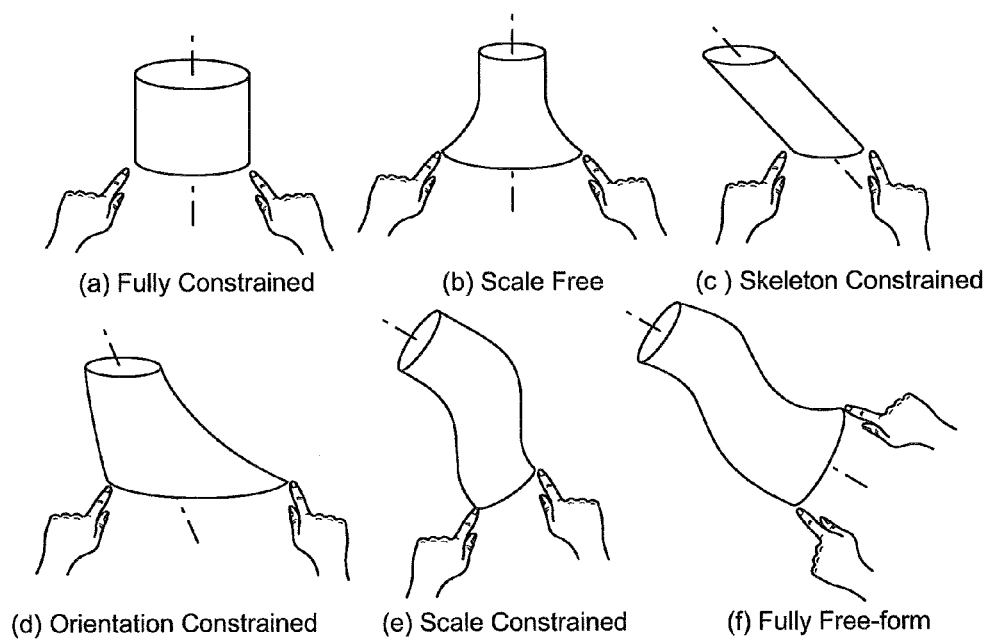
FIGS. 30(a)-30(f) are representations of 3D shapes formed as a function of the context of user's gestures, according to one aspect of the systems and methods disclosed herein.

In the illustrated embodiment, the "two-handed point" posture may be used in conjunction with motion thresholds to define the intent for the creation of a generalized cylinder. In one embodiment, as referenced above, the shape creation process for a cylindrical shape can assume that the shape is formed along a global z-axis and that the diameter of the cylinder is given by the Euclidean distance between the pointing fingers of the user's hands determined from the 3D hand position data produced by the data capturing units. In one embodiment, a 3D cylindrical shape can be generated under a fully constrained set of rules—i.e., the cylinder is a constant diameter right circular cylinder formed about a skeletal axis that extends along the global z-axis. In the Shape creation sub-module 32 movement of the hands, or more specifically of the pointing fingers, as sensed by the data capture units 14 is restricted to produce the fully constrained cylinder, as shown in FIG. 30a, in spite of any jitter in the hand movements. Any alteration of the cylinder can be accomplished through the modification or manipulation sub-modules of the Shape Module 32, as described below.

Alternatively, the initial cylindrical shape creation can be governed by different rules based on the context of the user's gestures. Thus, as shown in FIGS. 30b-f different 3D cylindrical shapes can be generated depending upon the initial constraints. For instance, in the scale free cylinder creation of FIG. 30b the skeletal axis of the cylinder is constrained along the z-axis but changes in the Euclidean distance between pointing fingers defines a changing diameter of the cylindrical shape. The user's movement of the fingers outside a predetermined threshold deviation from the initial Euclidean distance while moving vertically along a constant global z-axis (jitter aside) can be construed as an intent to produce a scale free cylinder. In FIG. 30c, the diameter is constrained but the user can alter the skeletal axis by moving both hands at an angle relative to the global z-axis. In this instance, movement of the fingers beyond a predetermined deviation from the global z-axis can be interpreted as an intent to form the cylinder in FIG. 30c. In FIG. 30d the orientation of the skeletal axis and diameter can be modified but the skeletal axis is constrained to be linear as the user's hands move at an angle relative to the global z-axis. The skeletal axis is fully unconstrained in FIG. 30e but the diameter is constrained to the initial Euclidean distance of the hands, regardless of any variation in the Euclidean distance as the hands move to trace a varied skeletal axis. Finally, a fully free-form shape creation is contemplated as shown in FIG. 30f, in which both the diameter and skeletal axis may be fully varied. It should be appreciated that since the hand/point motions are being sensed in three-dimensions, any of the skeletal axis variations may occur in 3D. Each of the cylinder constraints can be inferred from the context of the user's gestures and hand movement, all as interpreted by the Context Module 25.

It should be understood that the data processing unit of the overall system may include software that interprets the data generated by the 3D camera system of the data capturing units, and in particular that identifies the location of the user's hands over time in the context of the 3D design process being performed. That data is generated at the sampling rate of the camera system, which in certain systems may be about 30 frames per second. The 3D data may be considered as a 3×n matrix corresponding to the three degrees of freedom (x, y, z) and the number "n" of samples taken during the hand movements of the user occurring in the lab. For instance, if a particular shape creation process involves hand movements over a three second interval, the data capturing units 14 will generate 90 images (3×30) and the resulting hand movement matrix will be a 3×90 matrix. In the process of 3D shape creation, this 3×n matrix is used to generate the data matrix defining the three-dimensional shape.

In the illustrated example in which the 3D shape being generated is a generalized cylinder, certain rules govern the generation of the 3D matrix defining the shape. For instance, in the case of the fully constrained cylinder of FIG. 30a the diameter is fixed based on the initial Euclidean separation of the user's hands/pointing fingers and the direction of the axis of the cylinder is fixed (i.e., along the vertical z-axis). The software may be configured to enforce rules for creation of the fully constrained generalized cylinder so that only the vertical extent of the hand motion need be determined in order to fully define the 3D data for the shape. On the other hand, the fully free-form cylinder of FIG. 30f requires consideration of the full 3D position of the user's hands throughout the entire creation process. In this case the only creation rule that is enforced is the determination that each location of the user's hands defines a diameter of the generalized cylinder. Each of the shapes shown in FIG. 30 incorporate different motion constraints and therefore different creation rules in the generation of the 3D shape data from the hand position data.

Once a 3D shape has been generated the modeling process takes a different path, as reflected in the flowchart of FIG. 29. Thus, in the conditional step 73 the answer to the condition is negative, meaning that a virtual shape is resident within the interaction space. The virtual shape may have been just generated as described above, or may have been obtained from another source, such as a data base of shapes maintained by the data processing units or uploaded from another design program or from an Internet depository. The Context Module 25 then determines the context of the user's hand gestures within the slab 45. Thus, in the conditional step 80 a determination is made as to whether the user's hand is in proximity to or near the virtual object. It can be appreciated that the virtual object exists as a matrix of 3D data points while the data capturing units 14 produce 3D position data for the user's hands visualized within the interaction space. Various known techniques may be applied to determine the distance between a location or locations on the user's hand and the virtual shape, and to assess whether this distance falls within a "proximity" or "nearness" threshold signifying that the user's hand is "near" the object with the intention of performing a design function on the virtual object. A predetermined "proximity" value may be hard-wired into the system or may be selected or calibrated by the user. Alternatively, proximity may be signified with the intersection of the 3D hand coordinates with the 3D model coordinates fixed in virtual space. The proximity determination may be accomplished using known matrix calculations, with the calculations occurring at the frequency of the 3D depth camera. As the user's hand(s) move within the interaction space 40, position data for the hand or landmarks thereon are continuously updated at the camera frequency. The gesture recognition step need not occur continuously, with the gesture instead being "locked in" when the hand posture is initially sensed within the slab. Alternatively, the gesture is continuously evaluated and only "locked in" once a shape modification of manipulation step has begun.

If the answer to the conditional step 80 is negative, meaning that the user's hands are not near a virtual object, then control returns to the conditional 74 to permit the creation of a new 3D shape in the ensuing creation module 75. If no hands are present, the shape modeling process is deemed complete, at least in the current user iteration. In some cases the user's hands may be positioned within the container 47 of the interaction space 40 to pull a temporarily "stored" shape into the slab 45 for further modeling.

If the user's hand is deemed to be near a virtual object within the slab 45, then the Context Module 25 determines the user's intent to alter the existing virtual shape or object. The hand location, as determined in step 72, and the hand posture and motion, as determined in step 81, are fed to the Shape Module 32 in step 82. Whether the shape is modified, using sub-module 34 or manipulated, using sub-module 35, depends upon the gesture and context of the user's hands (and arms), as discussed above.

Geometric deformations or modifications of a virtual 3D shape or object can be achieved in accordance with one aspect of the present system 10 by evaluating a prescribed hand posture along with the motion of the hands. According to one protocol, the naturalistic hand gestures catalogued in FIG. 8 can be used to modify, or deform, a 3D shape, and to manipulate, or move, the shape. With respect to object/shape manipulation, the hold gesture of FIG. 8c can be used to move an object to a different location within the interaction space or slab. With respect to shape modification, or deformation, the pinch (FIG. 8d) and grab (FIG. 8b) gestures may be used for local and global deformations through a pulling motion, while the press (FIG. 8a) and point (FIG. 8e) gestures may be used for global and local deformations through a pushing motion.

Figure 31:
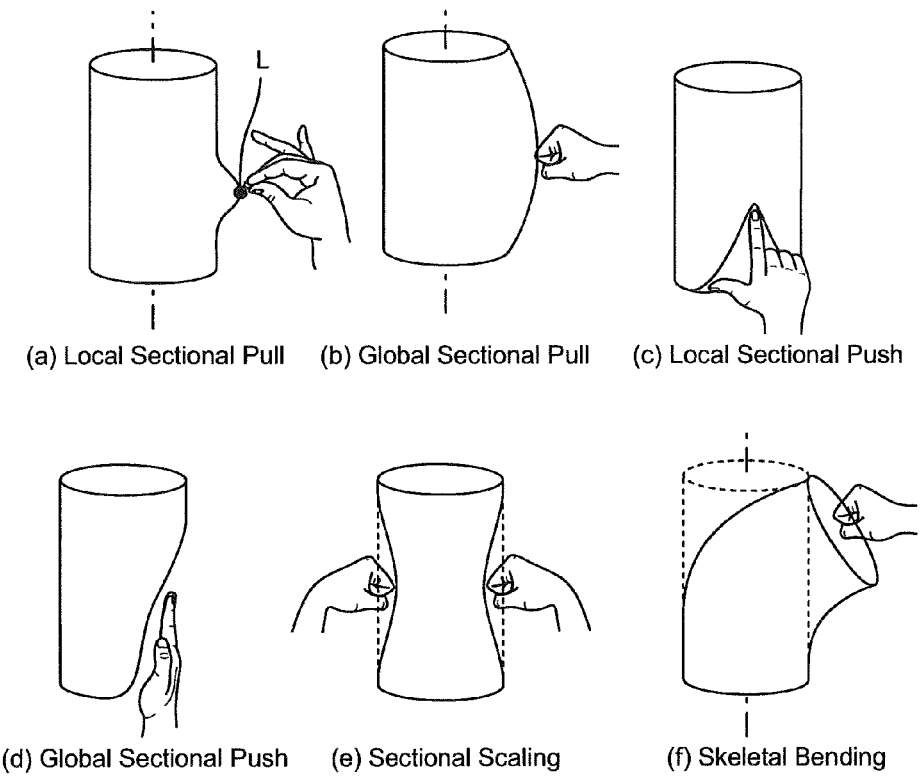
FIGS. 31(a)-31(f) are representations of modifications to a 3D cylindrical shape as a function of the context of user's gestures, according to one aspect of the systems and methods disclosed herein.

In one example, a generalized cylindrical shape may be modified using these push and pull hand gestures. For instance, as shown in FIG. 31a a single hand pinch gesture (FIG. 8d) in the proximity of a location on the virtual cylinder results in a local deformation of the cylinder. A grab motion (FIG. 8b) applied to the same location results in a global deformation of the cylinder, as depicted in FIG. 31b. Likewise, a local indentation of the cylinder can be accomplished by moving a point gesture (FIG. 8e) into the virtual cylinder as in FIG. 31c, while moving the press gesture (FIG. 8a) in the same way produces the global indentation shown in FIG. 31d. While the deformations in FIGS. 31a-d are shown occurring with single-handed motion, similar deformations maybe accomplished using two-handed gestures. Thus, as shown in FIG. 31e, applying a grab gesture (FIG. 8b) to both sides of the cylindrical shape produces a deformation or scaling of the cylinder at that location. In the case where constraint rules are applied to a particular shape, the hand gestures can be used to achieve global bending. Thus, as shown in FIG. 31f, applying a grab gesture to the top of a constrained cylinder can produce skeletal bending of the virtual cylinder in the direction of the hand movement.

Figure 32:
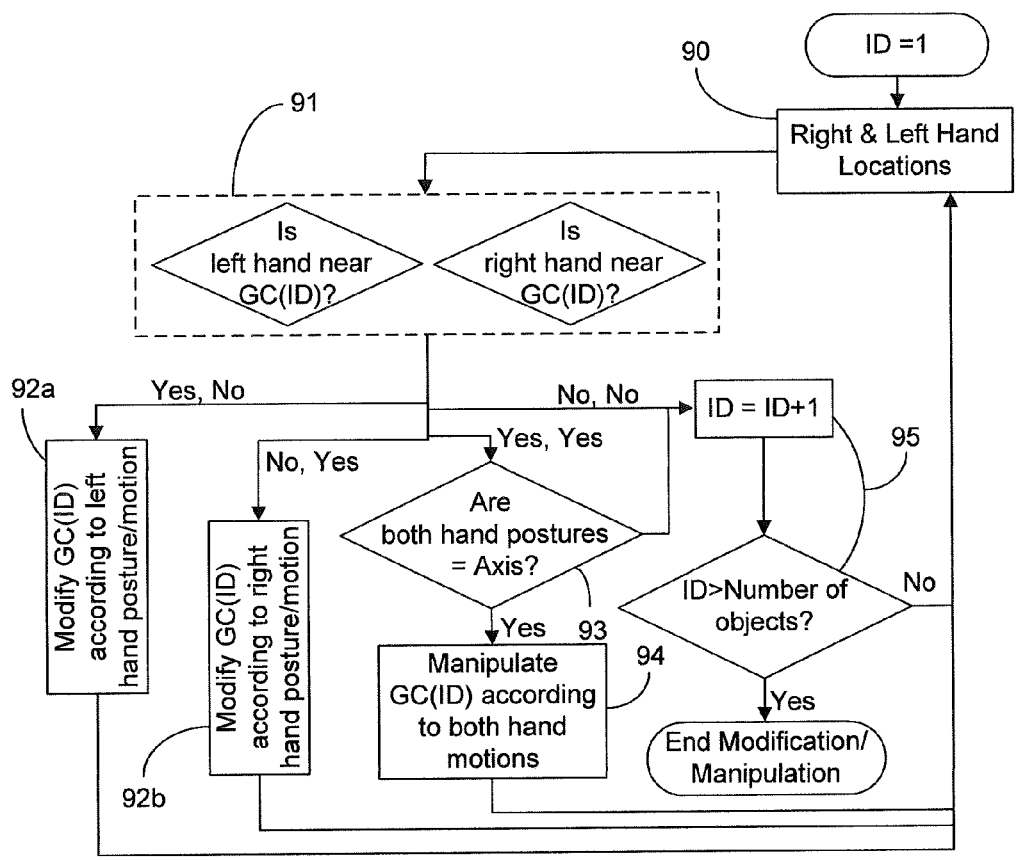
FIG. 32 is flowchart of the modification and manipulation step of the flowchart in FIG. 29.

The modification and manipulation module step 82 may be implemented according to the flowchart of FIG. 32. The modification and manipulation can commence with an evaluation of the location of the user's right and left hands in step 90, and subsequently whether either or both hand is in proximity to or near the virtual shape or object in conditional step 91. As previously discussed, proximity is one factor to determine context of a particular gesture. A particular left-hand gesture has a different context if it is alone versus if it is accompanied by a right-hand gesture. Depending upon the outcome of the conditional step 91 the shape modification or manipulation occurs in steps 92*a*, 92*b* when only one hand or the other is near the object. If both hands are found to be in proximity to the 3D shape/object in step 93 then the hand gestures have a different context and are applied to modify or manipulate the virtual shape accordingly. If neither hand is near the object a determination is made whether there are additional objects in the slab that have not been modified as part of the 3D design process. If additional generalized cylinders GC(ID) are identified in step 95 then control returns to the beginning step 90 to re-evaluate the hand positions and continue accordingly. If no additional objects are found, the modification and manipulation step 82 (FIG. 29) is complete.

The modify and manipulate steps 92*a*, 92*b* and 94 involve modifications to the 3D data that defines the virtual generalized cylinder. Once the particular location on the virtual cylinder has been identified as proximate to the user's hand the Shape Module 32 modifies the 3D position of that location according to the movement of the user's hand. Thus, for the local sectional pull movement depicted in FIG. 31*a*, the module moves the data point corresponding to location L by the distance and direction traveled by the user's hand in the pinch posture. Depending upon the nature of the 3D model for the shape, adjacent locations on the cylinder will also deform according to the constraint rules for the model. Alternatively, the Shape Module itself may invoke predetermined motion constraints for the deformation of a 3D model. It is understood that the deformation process of the 3D cylinder occurs iteratively as the Shape Module cycles through the steps of the flowchart of FIG. 32. The process continues until any of the conditionals in steps 91 or 93 fail for a particular object. The calculations necessary to deform a 3D model or the transformations necessary to manipulate or move the virtual model can be readily performed by the typical desk top or laptop computer for the typical 30 Hz camera system. Higher speed motion cameras operating at higher speeds mean more frequent calculations in less time, which may require the use of higher speed computers.

In the foregoing examples, the 3D shape is regarded as a conventional cylinder. The methods and systems disclosed herein may also be used to perform 3D design operations on deformable meshes (DM). A mesh is a well-known and well-studied form of boundary representation of geometric objects. Mesh deformation has been grouped in the literature into two broad categories—space based and surface based. By way of non-limiting example the computational characteristics of mesh deformation may follow a variety of known approaches, such as: using generalized sweeps; free-form shape deformation strategies using global and local geometric characteristics of shapes; differential coordinate representation for surface editing; surface-based methods in which the initial and target positions for a subset of surface points are used to compute the positions of all remaining points; cage methods creating a cell complex around an original shape and performing the deformation on the cell complex with the deformed position of all points calculated with respect to each cell; skeletal methods including methods that constrain the deformation of a surface so that properties of the skeleton are preserved; feature based methods using either automatic or user chosen features typically represented as a contour or area where the deformation is constrained; and space based methods in which a shape is modified by deforming the embedded space in some fashion.

In accordance with the present invention shape modeling through a deformable matrix (DM) is based on the proximity of the hands with the object, coupled with the posture and motions of the hand. The proximity decides whether or not the deformation of the DM object should take place, while the postures and motions decide the kind of deformation which is to be applied when the hand(s) are close to the surface of the object. As described above, one-handed and two handed postures and movements may be used to generate local or global deformation. Local deformations lead to pointed features in shapes while global deformations result in flattened or oval-type shapes. The natural push or pull motions of the hands described above facilitate the modeling interactions, and further allow the user to combine hand postures, such as enabling hold and pinch postures for pulling while press and point are enabled for pushing. A flow-chart of the modeling process for deformable meshes is similar to the flowchart of FIG. 29, except that the creation step 75 is not present. The DM is obtained from another source, such as a CAD-type program or downloaded from a data base. Thus, in the present disclosure DM-based modeling is purely a modification/manipulation based scheme which requires the presence of an object to be modified.

The modification and manipulation step 82 of the flowchart of FIG. 29 is different for the deformable mesh than for the generalized cylinder discussed above. As shown in the flow-chart of FIG. 3 the DM modification process commences with a determination in step 95 of the locations of the user's left and right hands and a conditional step 96 to determine whether either or both hands are in proximity to or near the virtual DM object. If only one or the other is in proximity then the appropriate deformation is applied to the DM based on the user's gesture in steps 97, 98. On the other hand if both hands are near the DM, the conditional 99 determines whether the hands are postures along the axis of the DM, signifying the user's intention to manipulate (i.e., move) the DM rather than modify (i.e., deform) the DM. Is the answer to that conditional is affirmative then the Shape Module 32 directs the manipulation of the DM in accordance with the gesture. In particular, the movement of both hands translates the virtual DM through the virtual interaction space, with coordinate transformations of the DM data points occurring continuously as the hands, and therefore DM object, are moved. On the other hand, if the user's hands are not aligned with the axis of the virtual mesh object, then the user's intent is determined to be to deform the object. In this case, a negative response to the conditional 99 sends the program flow to step 101 in which the Shape Module applies two-handed deformation of the DM according to the hand postures and motion of both hands. Once all the modifications and/or manipulations have been completed for the particular object and the user's hands move away from the object, a determination is made as to whether another virtual object exists within the slab 45 (FIG. 6). If additional objects are identified in step 102 then control returns to the beginning step 95 to re-evaluate the hand positions and continue accordingly. If no additional objects are found, the modification and manipulation step for the deformable mesh is complete.

Figure 34:
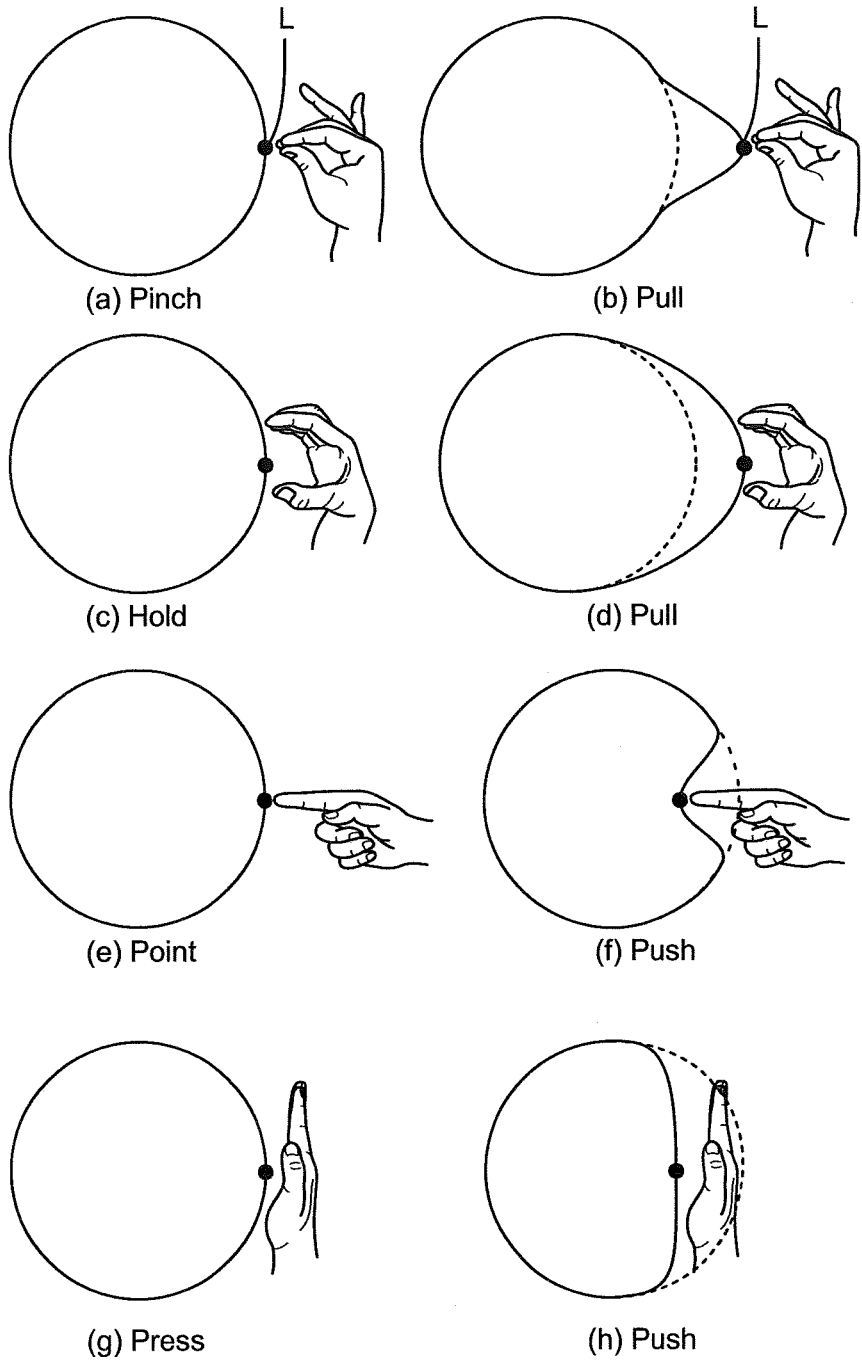
FIGS. 34(a)-34(h) are representations of hand gestures for use with the systems and methods disclosed herein.

The hand gestures shown in FIG. 8 may be applied in steps 97, 98 and 101 to modify or deform the deformable mesh according to the modeling protocols shown in FIGS. 34 and

35. The single handed deformations shown in FIG. 16 utilize the gestures for pinch (FIG. 8*d*), hold (FIG. 8*c*), point (FIG. 8*e*) and press (FIG. 8*a*). As discussed above, the context of a particular gesture includes a determination of not only proximity to the virtual object but also the location on that object. Thus, as depicted in FIG. 34, the Context Module 25 (FIG. 2) identifies the location L on the DM to be deformed based on the nearness of the user's hand to the DM. Various algorithms may be used to interpolate the subject location L from the hand posture, with the point gesture of FIG. 34*e* perhaps providing the least complex indication of location. The Context Module evaluates the hand posture to determine which action to be taken by the Shape Module 32 as the user's hand moves away from the DM location L. Thus, as illustrated in FIGS. 34*a, b*, applying a pinch gesture to the location L results in the deformable mesh being pulled in the direction of the hand motion resulting in a local deformation centered around the single point L of the mesh being pulled. On the other hand, if the same pulling motion is applied with a hold posture, as shown in FIGS. 35*c*-*d*, the resulting deformation of the DM is a global deformation since a greater region of the DM is being "held" by the hand posture. A similar dichotomy exists for the "push" movements of FIGS. 34*e, f* and 34*g, h*. Pushing with the point gesture results in a local deformation of the mesh, while pushing with the press gesture results in global deformation. The manner in which the deformable mesh is defined will dictate the kinematics of the local and global deformations imposed by the hand gestures and movements of FIG. 34.

Figure 35:
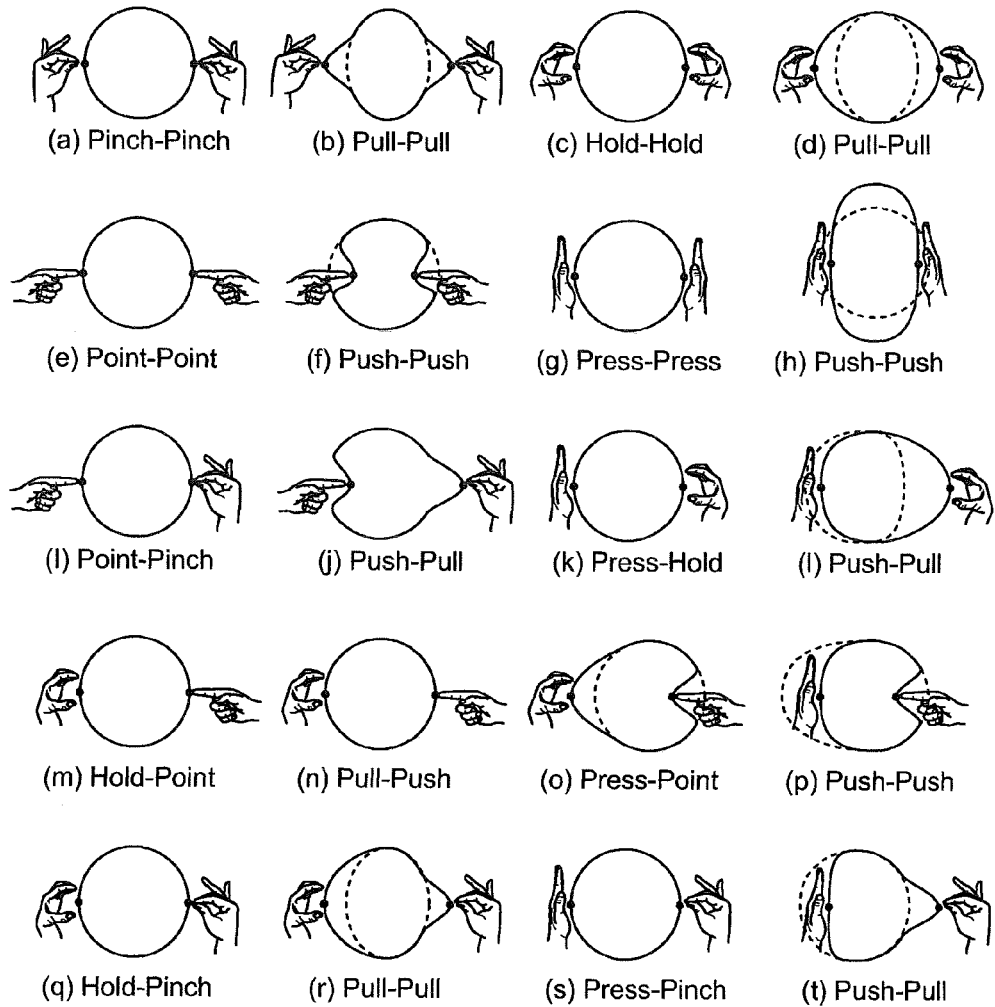
FIGS. 35(a)-35(t) are representations of hand gestures for use with the systems and methods disclosed herein.

The same gestures may be used in two handed interactions with the DM. Thus, as shown in FIG. 35 different combinations of hand gestures may be applied on opposite sides of a DM to result in unique deformations of the object. It can be appreciated that using the same gesture and movements for both hands will result in symmetric deformations of the deformable mesh, as illustrated in FIGS. 35*a*-*h*. Asymmetric deformations can be produced by combining different gestures, as shown in FIGS. 35*i*-*t*. For instance, a left hand point gesture combined with a right hand pinch gesture of FIG. 35*i*, with both hands moving in the same direction, produces the asymmetric deformation of FIG. 35*j*. It should be appreciated that since the object being deformed is a virtual object, the laws of physics, namely action-reaction, need not be applied. Consequently, the deformation protocols permit a left hand push and a right hand pull, as depicted in FIGS. 35*j* and 35*t*, to produce the desired deformations in the left and right sides of the DM.

2D-3D Objects

In a further feature of the system 10 disclosed herein, a 2D drawn input may be generated on virtual or physical 3D surfaces using physical or virtual tools. As used herein, a "physical surface" is a regular surface of an object that one can feel and that offers a resistance to drawn input. In the context of the present disclosure, the 2D image may be drawn directly onto such a physical surface, while the data processing units 16 may generate the desired texture or view through the visualization units 18 to assist the user. The 3D camera system of the data capturing units 14 can determine contact of the user's finger(s) or a physical tool with the physical surface. Examples of physical tools include passive tools such as a finger, pen, knifes, or other tools such as drills etc. Physical tools may also include tools that can transmit, such as by ultrasound or infrared, their precise position, such as the X-Y coordinates, to be sensed by the data capturing units 14 and used by the data processing units 16 to triangulate to the position of the "drawing" end of the tool. The tool may be in the form of a pen calibrated to any surface size and capable of working both horizontally and vertically. In a specific embodiment, the pen may be configured to transmit the 2D location of the point at which it is pressed, which information is then processed by the data processing units and visually displayed back onto the same surface through a projector. This process allows the user to write and sketch on any surface, thus making it interactive.

Figure 36:
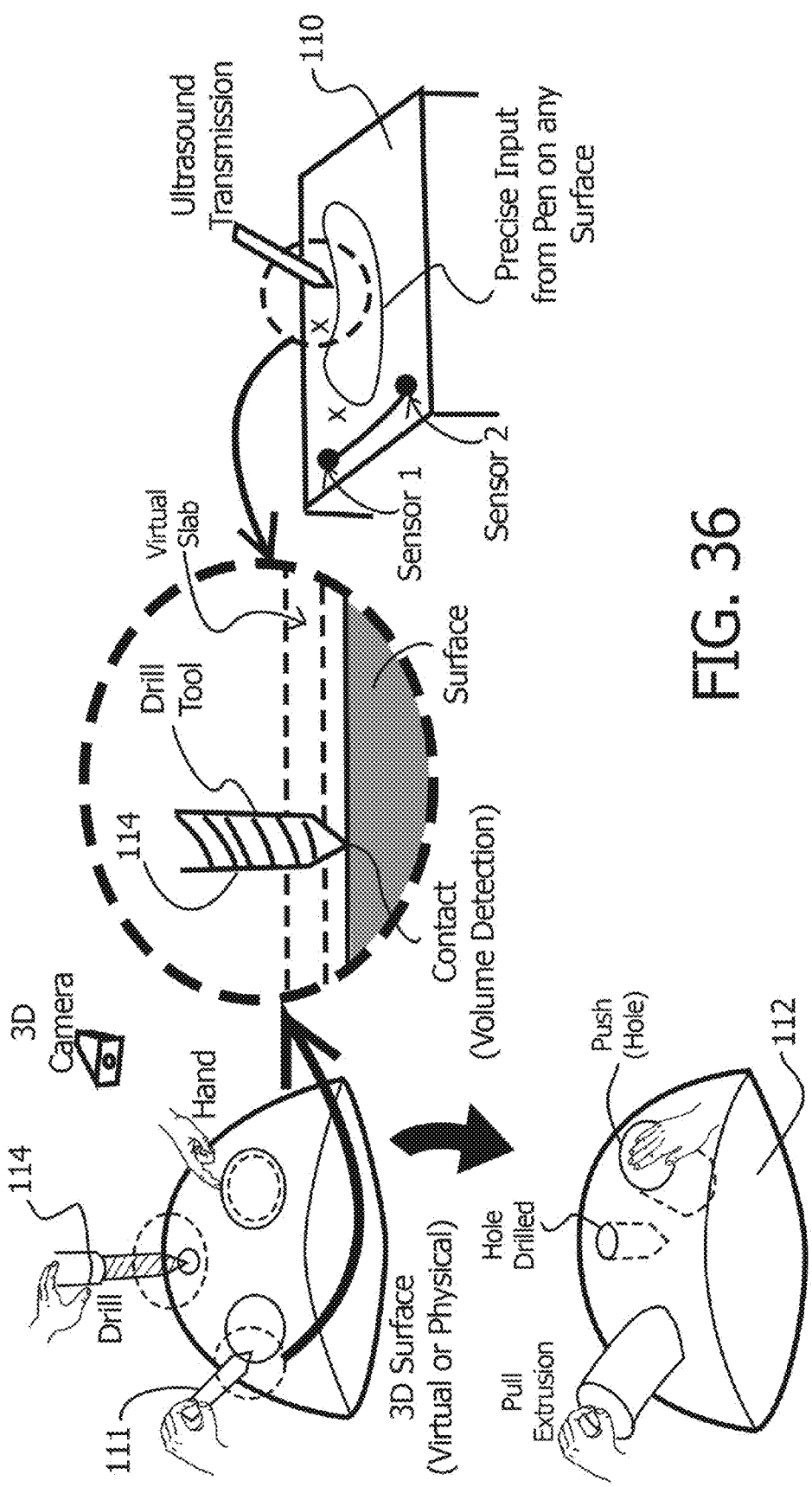
FIG. 36 is a representation of steps for using a virtual tool to modify a 3D model using the systems and methods disclosed herein.

Once the 2D object is generated on the physical or virtual surface, the object may be modified in 2D using the hand gestures disclosed herein. A 3D or depth camera may be used to sense the hand gestures on the surface indicative of the user's intent to modify the 2D object. The depth camera determines that the user's hand is contacting the physical or virtual surface on which the 2D object is present, evaluates the proximity and location of the hand to the object and senses the hand gesture at that location to instruct the Shape Module to modify the 2D object accordingly. Thus, each of the deformations describe above, such as the DM deformations of FIGS. 34-35, may be applied to the 2D object, as depicted in FIG. 36. As can be appreciated from FIG. 36, the surface on which the 2D object resides and on which the design steps are taken need not be a planar surface 110, but may be a three-dimensional surface 112.

Figure 37:
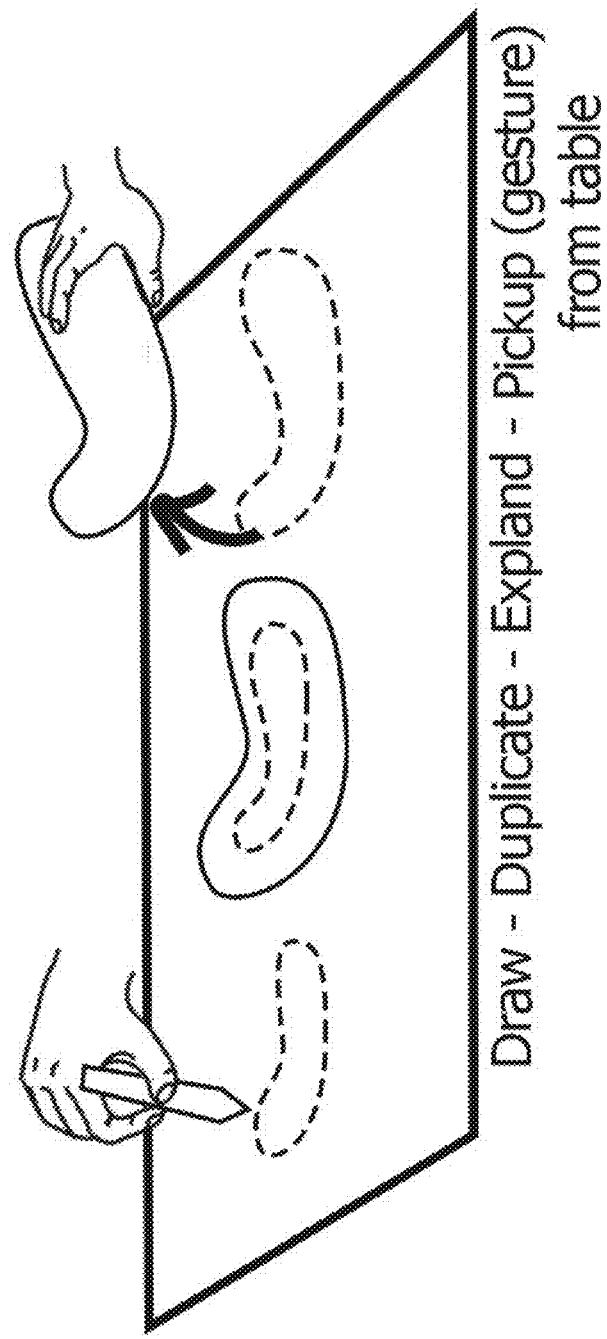
FIG. 37 is a representation of steps for using a virtual tool to modify a 2D model using the systems and methods disclosed herein.

Use of the 3D or depth camera system allows the 2D object to be picked up out of the surface by an appropriate hand gesture (such as the hold gesture of FIG. 8*c*), thereby making the original 2D object into a 3D object, as depicted in FIG. 37. In the 3D design environment the pen may be modified to provide X-Y-Z coordinates, thereby allowing the pen to generate features on the surface of the 3D object. This concept may be further extended to transmit positions for virtual tools such as a drill. For instance, referring back to FIG. 36, the drill tool 114 may be manipulated by the user relative to the surface of the 3D object. The drill tool can transmit position data for the drill tip and a location along the length of the tool. The data processing units can evaluate the position data for the drill tool 114 over time to determine where and how deep the tool "drills" into the virtual (or physical) 3D object, to thereby generate a virtual hole in the 3D object. In all these operations it is noted that the interactive methods described herein utilize hand movement in 3D on and around the physical and virtual objects themselves. Moreover, these operations can combine virtual and physical surfaces in the same perceived environment, especially if the user is wearing augmented reality goggles.

Figure 33:
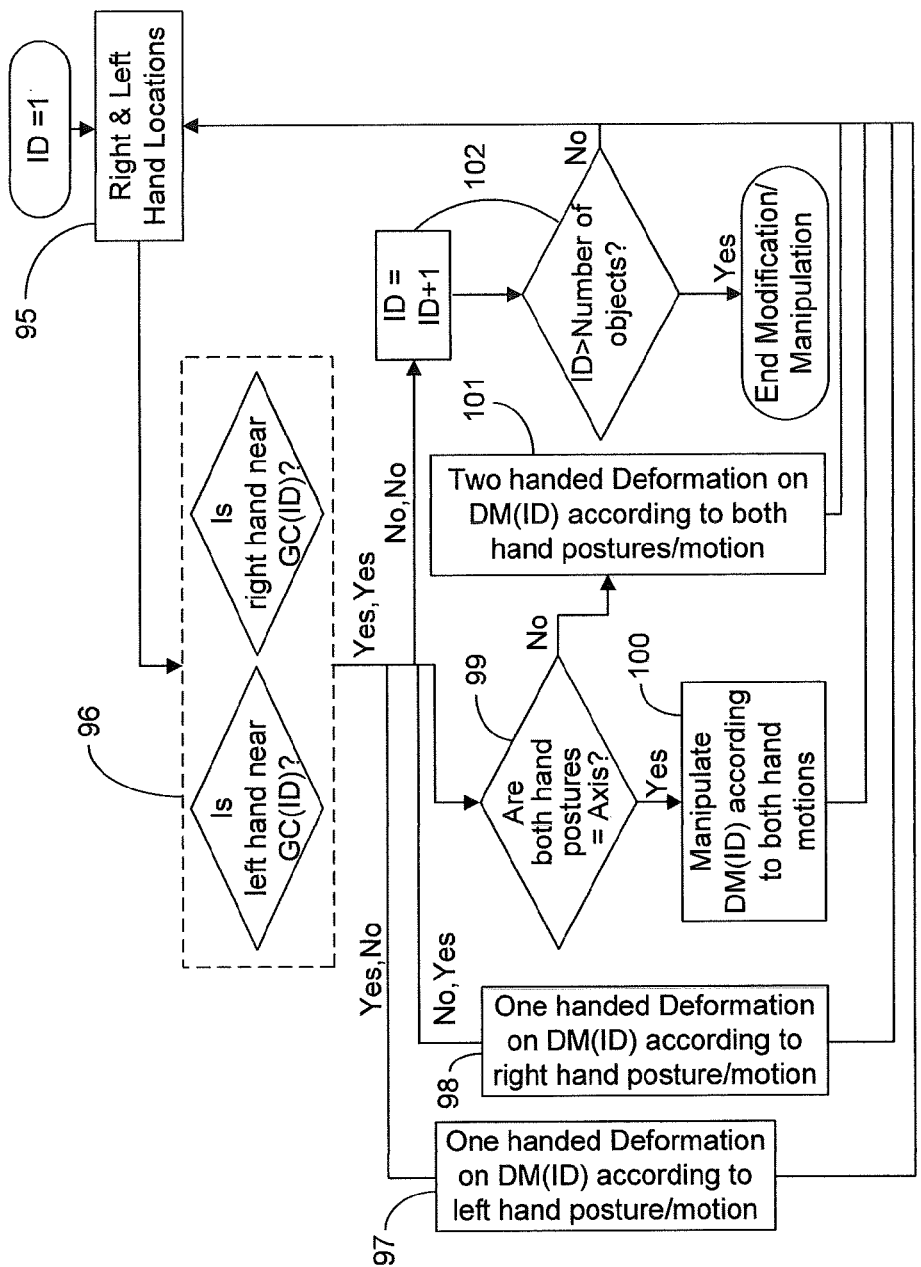
FIG. 33 is a flowchart of another embodiment of the modification and manipulation step of the flowchart in FIG. 29.

Hand gestures may also be used in accordance with the present system and method to connect one object to another virtual or physical surface or object. With a pick up gesture (such as the hold gesture of FIG. 8*c*) a user can move one object into contact with another, such as the objects 120, 121 in FIG. 38. The manipulation steps 94, 100, of the flowcharts of FIGS. 32, 33, respectively, can be invoked by the user to move objects within the slab. The data processing units can evaluate the changing 3D data for the shape/object being manipulated relative to the set of objects known to be within the virtual space. When the 3D data coincide or conflict the Context Module determines the user's intent to combine the two objects. Once combined the user may modify one or more of the objects, such as the modifications being performed in FIG. 38 to produce the arms of a teddy bear shape.

It can be appreciated that the data processing units 16 of the present system are continuously processing 3D data in the form of the hand gesture inputs, as sensed by the data capturing units 14, or the changing 3D data defining the virtual objects or shapes. The 3D data is generated and refreshed at the sample rate of the 3D camera or depth camera system. In the shape creation process, the result is a 3×n matrix defining the newly generated shape, in which "n" is the number of "pictures" obtained by the camera system during movement of the user's hands. Thus, in the example discussed above, a five second shape creation hand movement will initially produce a 3×150 matrix for a camera sampling rate of 30 Hz ((30 frames/second). However, it can be appreciated that this initial matrix is simply a matrix of the 3D locations of the user's hand over time, and thus only the framework of the 3D shape. The data processing units may be configured to manipulate this matrix in a known manner to produce a full 3D digital model of the shape intended by the user based on rules associated with the desired shape. For instance in the examples above the desired shape is a cylinder, it is known that at each time sample the Euclidean distance of the user's hands in the creation mode defines the diameter of the cylinder at that virtual location. The size of the 3D digital model depends upon how much additional data is required to fully define the cylindrical shape relative to the existing matrix. Software within the data processing units can readily expand the initial matrix to generate a complete digital model of the shape generated by the user.

With respect to modifications and manipulations to an existing virtual object, the data processing units maintain and operate on existing data used to define the virtual 3D object or objects and to spatially orient the objects within the interaction space 40. The creation, modification and manipulation of 3D models is well known and the system 10 may implement any of these techniques. The present system integrates knowledge of the posture, position and motion of the user's hand(s)—i.e., gesture—with the data defining the virtual 3D object. More particularly, the present system interacts the physical gestures of the user with the virtual object in three dimensions to facilitate and enhance the 3D shape design process. This approach is a departure from prior techniques in which 2D hand movements are used to signify movements that are then independently applied to a virtual object or shape. In the prior techniques the 3D object serves as a visual backdrop for the user to calibrate his/her hand movements, but this approach is devoid of the human-virtual model interaction produced by the present system.

Figure 39:
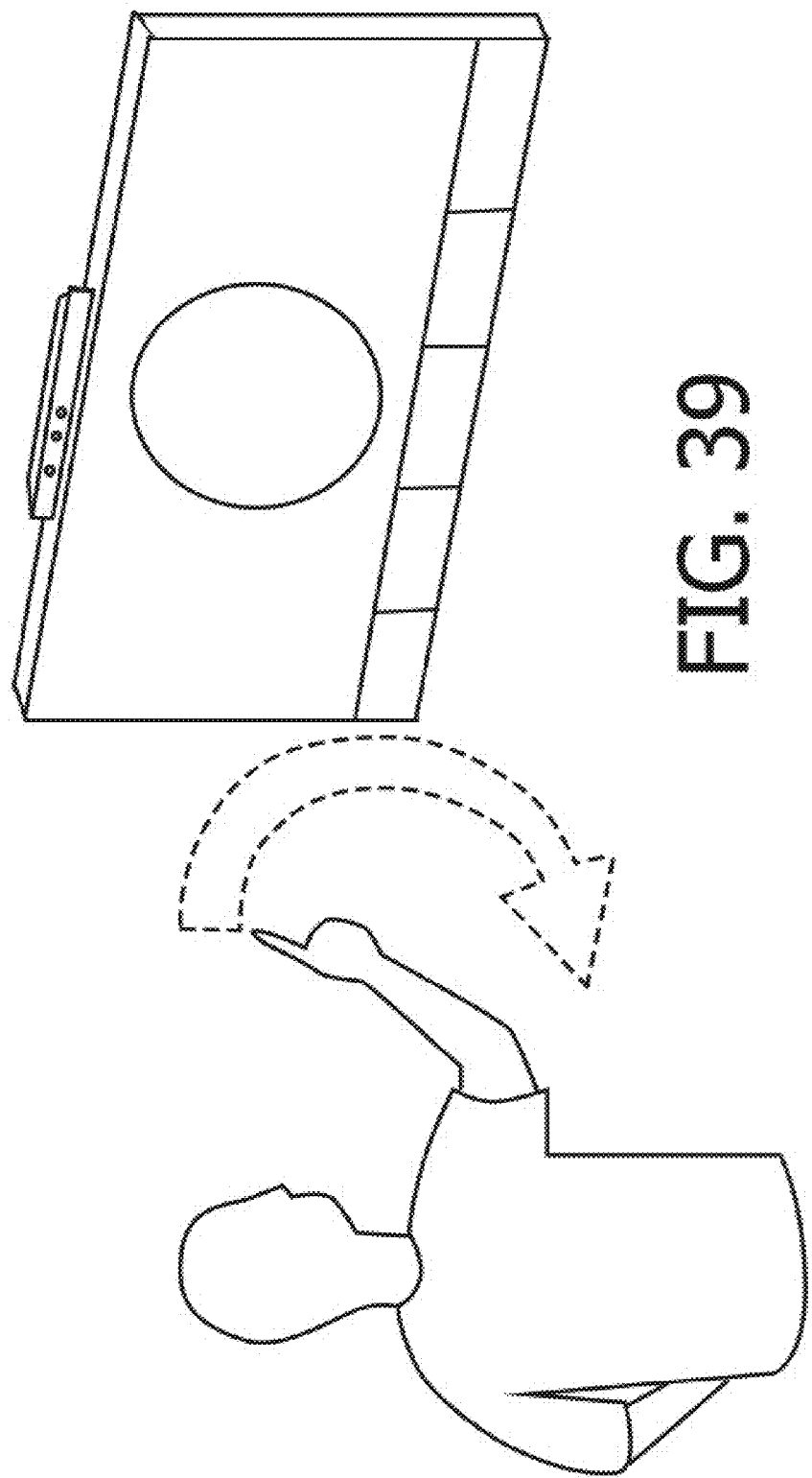
FIG. 39 is a representation of the creation of a circle by a user's gesture using the systems and methods disclosed herein.
Figure 40:
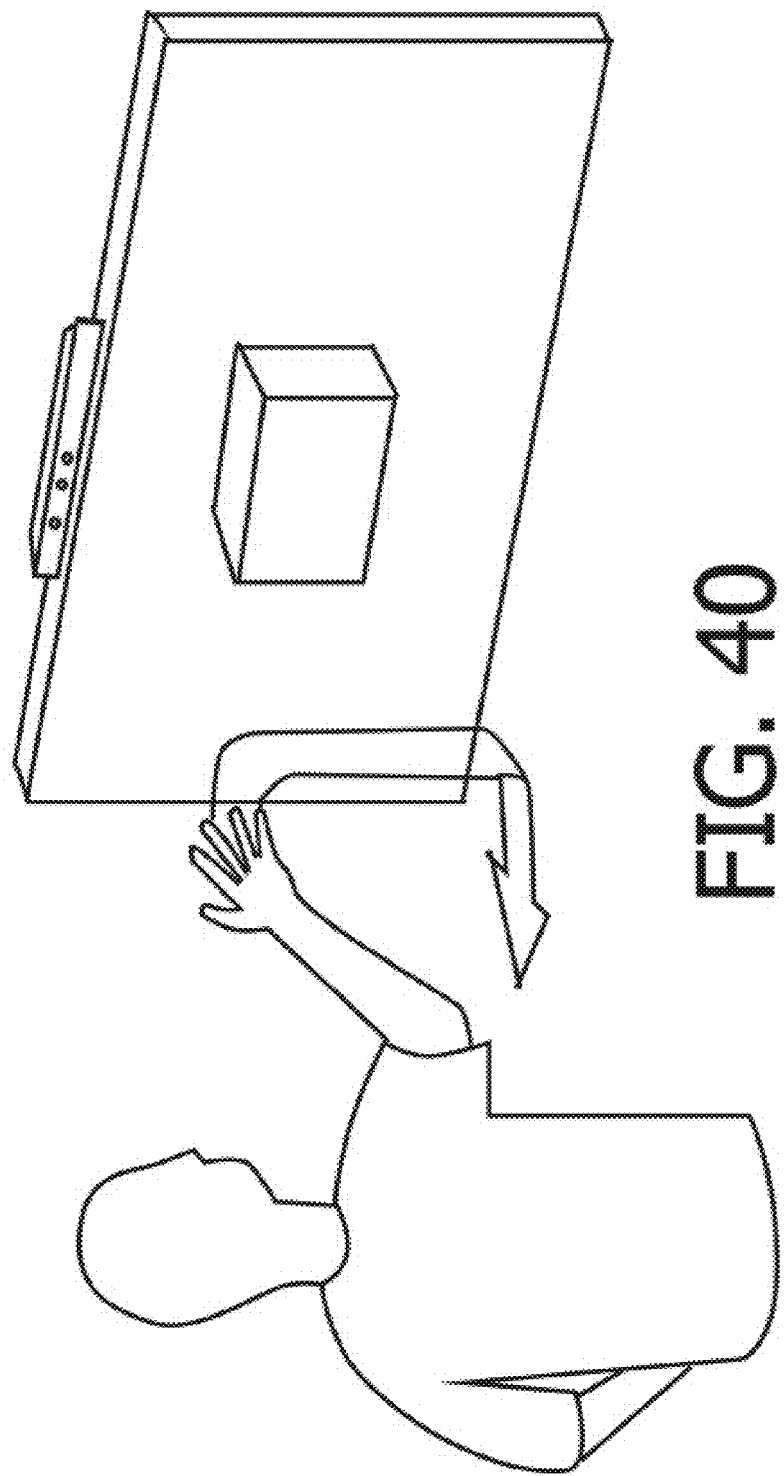
FIG. 40 is a representation of the creation of a square by a user's gesture.

Gestural Interactions for Creating, Combining, and Retrieving Shapes for Virtual Assembly Suggestive Hand Gestures for Creating Simple Shapes As explained above, hand gestures play a critical role for the present system and method in the expression of simple shapes during natural modes of communication. The shape modeling system disclosed herein utilizes this paradigm for enabling natural and intuitive ways of creating digital shapes. Specific hand gestures are used to indicate creation of analogous shapes in a virtual environment. For example, to create a circle, a user will inscribe a circular geometry in air with his index finger as shown in FIG. 39. The hand posture and trajectory involved in that particular gesture is analyzed by a gesture recognition system to infer the user's intention of creating a circle. Similarly, other intuitive hand gestures can be used for creating various precise geometric structures such as polygons, polyhedrons, and spheres (see, e.g., FIG. 40). The suggestive gestures can also be used to create simple 2D and 3D freeform shapes that are represented as either volumetric or surface based models, such as depicted in FIG. 41). During use of this feature, the user's hand trajectory directly defines the outline of the shape being created.

Suggestive Hand Gestures for Creating Complex Geometries from Simple Shapes

Figure 42:
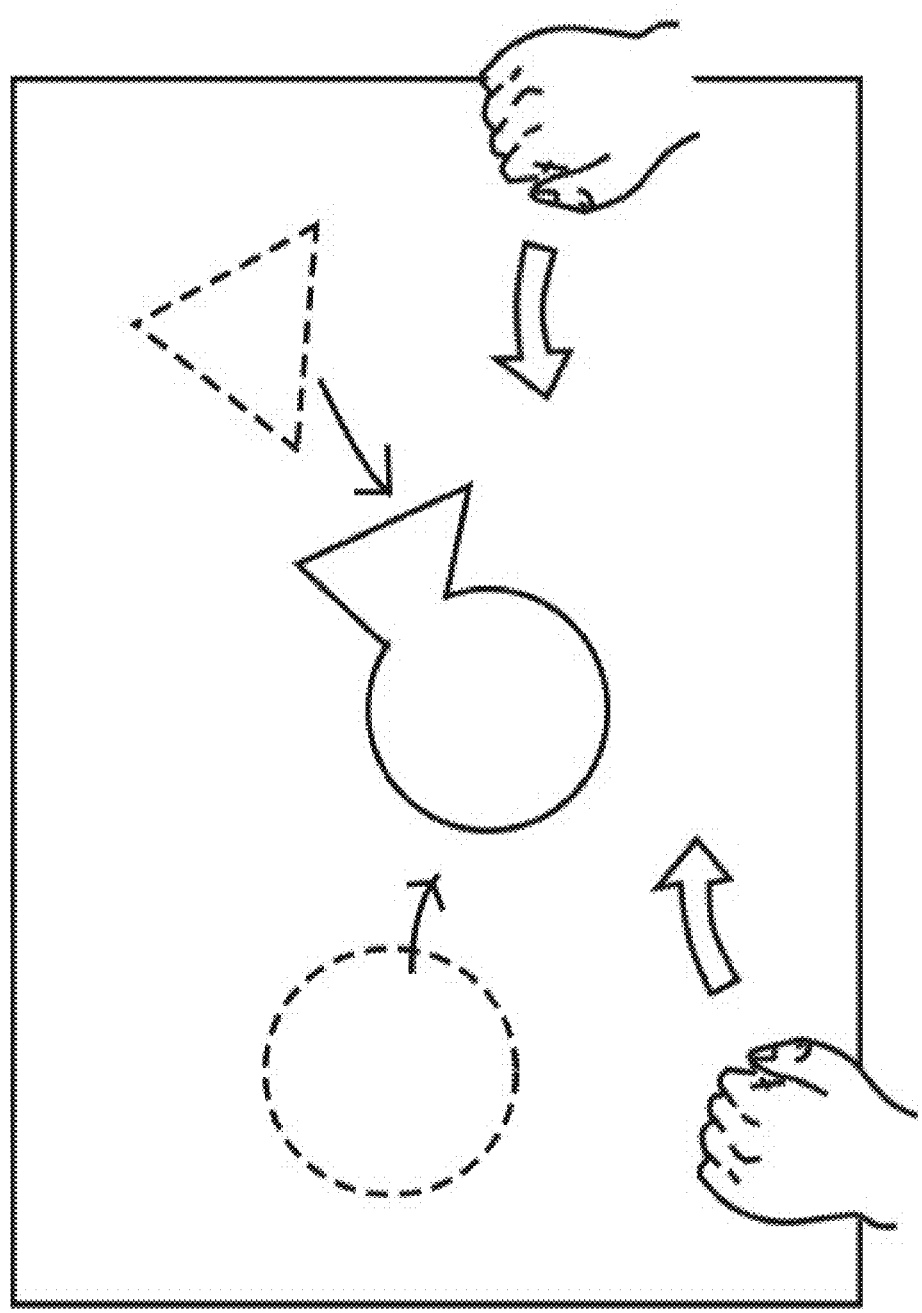
FIG. 42 is a representation of a gesture-based union of two simple shapes to create a more complex geometry.

Suggestive hand gesture based shape modeling operations can also be performed on one or more simple shapes to create complex and detailed geometries. These operations include: shape (a) combination; (b) deformation; (c) scaling; (d) replication; (e) symmetrization; and (f) slicing. To combine multiple shapes, a user can grab and bring two or more shapes close together such they are either partially or fully intersecting. The geometry resulting from either a union or difference between the shapes can be used to create a separate shape on its own (FIG. 42).

Figure 43:
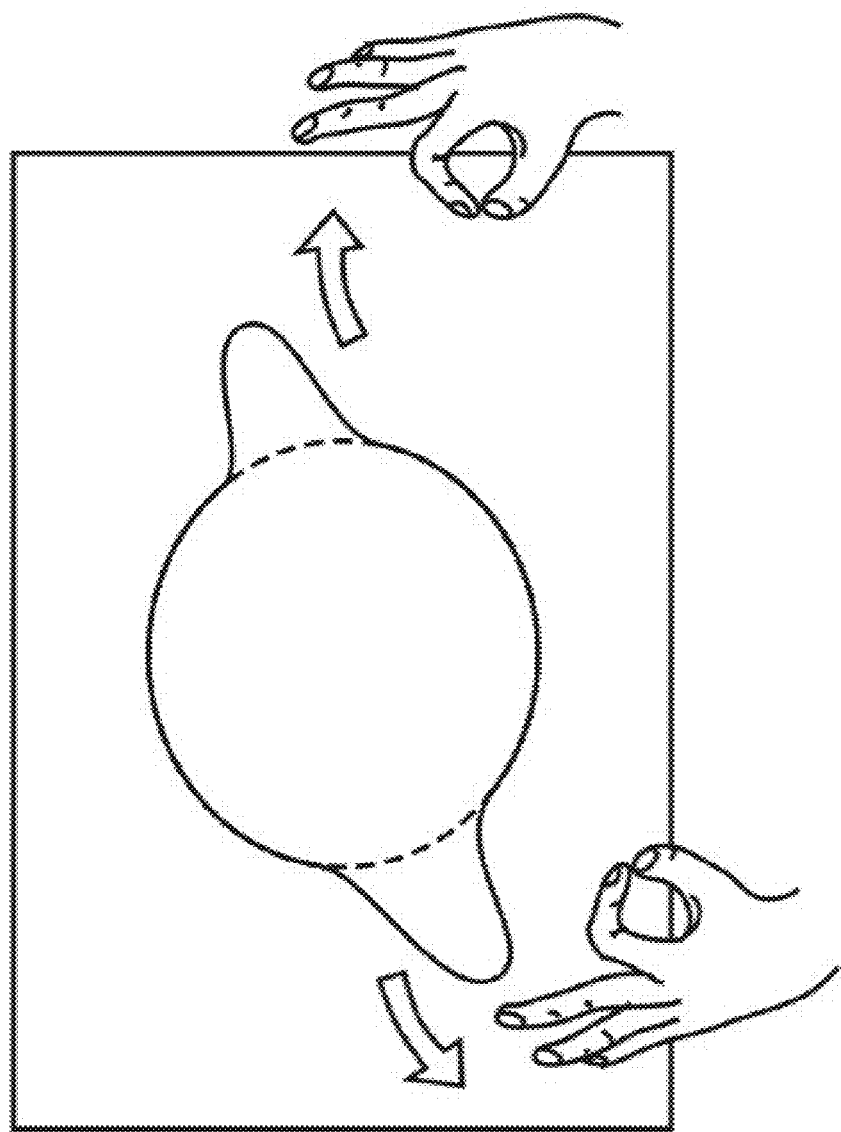
FIG. 43 is a representation of local deformation of a virtual shape or object by a pinching hand posture.
Figure 44:
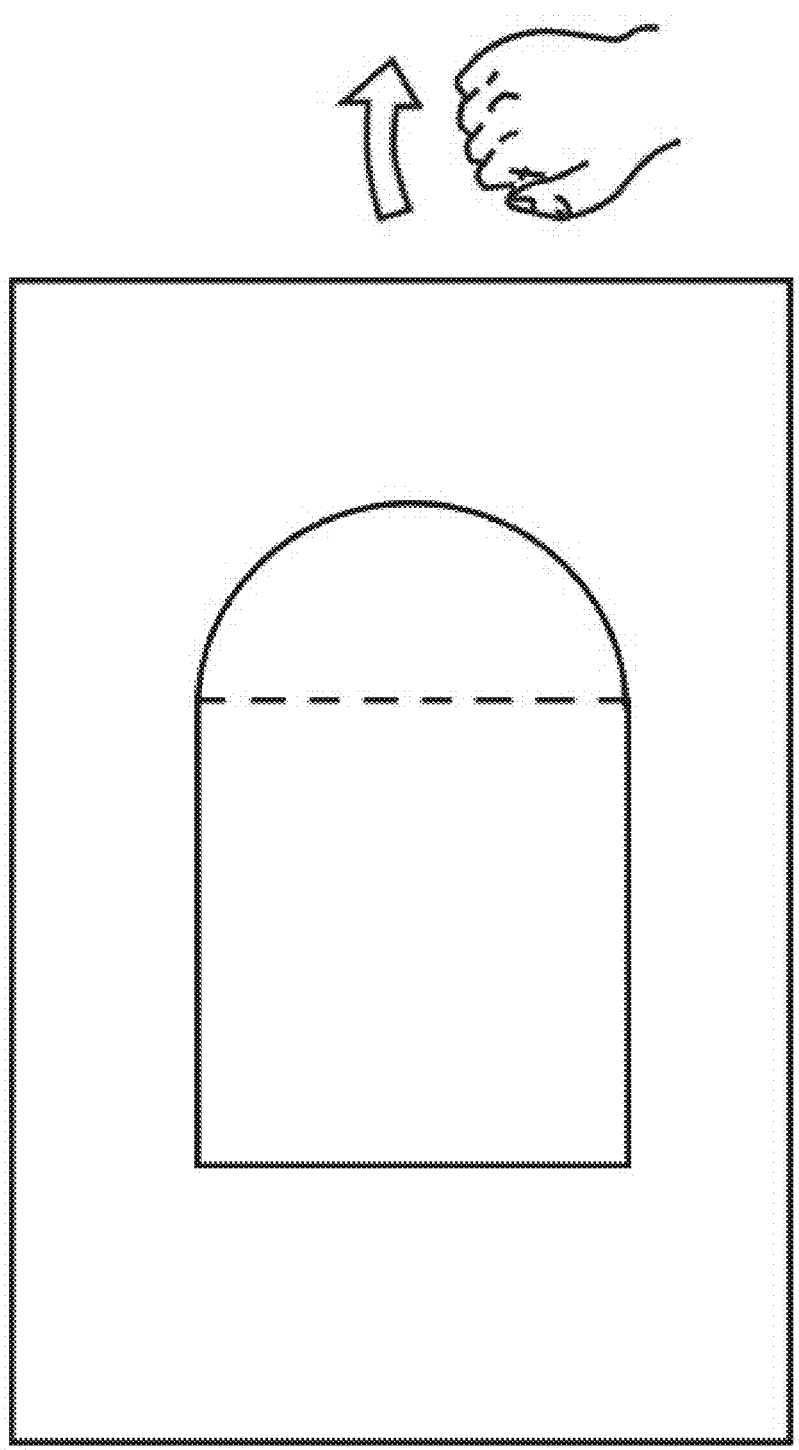
FIG. 44 is a representation of the deformation of a larger region of a virtual shape or object by a grasping hand posture.

Deforming a shape involves pinching at a point or grabbing a relevant region on a shape and moving the hand along the direction of intended deformation. A pinching hand posture indicates small scale deformation (FIG. 43) while a grabbing posture indicates large scale deformation (FIG. 44).

Figure 45:
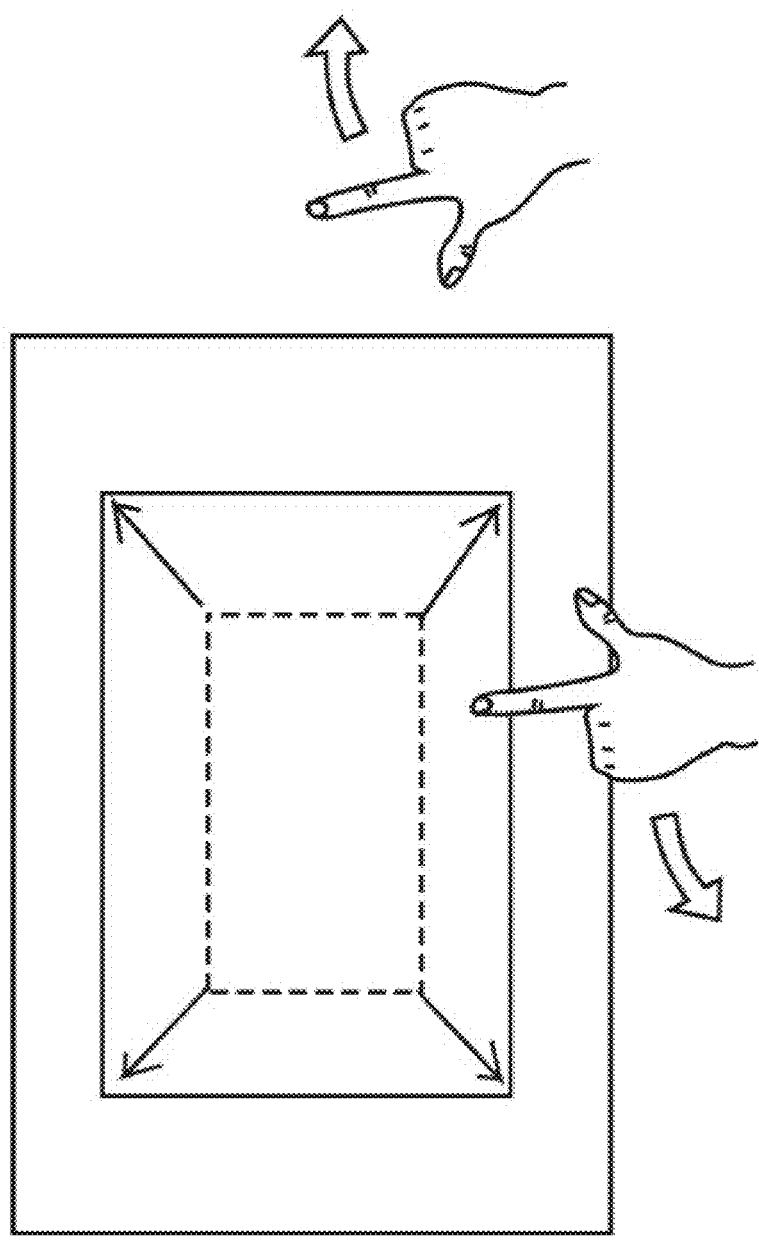
FIG. 45 is a representation of a scaling operation performed on a virtual shape or object by a user's gesture.

For scaling the overall size of a given shape, the user places both hands with an L-shaped posture around the shape as shown in FIG. 45. The hands are then either brought towards or away from each other to increase or decrease the scale of the shape respectively. Such scaling can be performed either along a single direction (axial scaling) or in all directions (proportional scaling).

Figure 46:
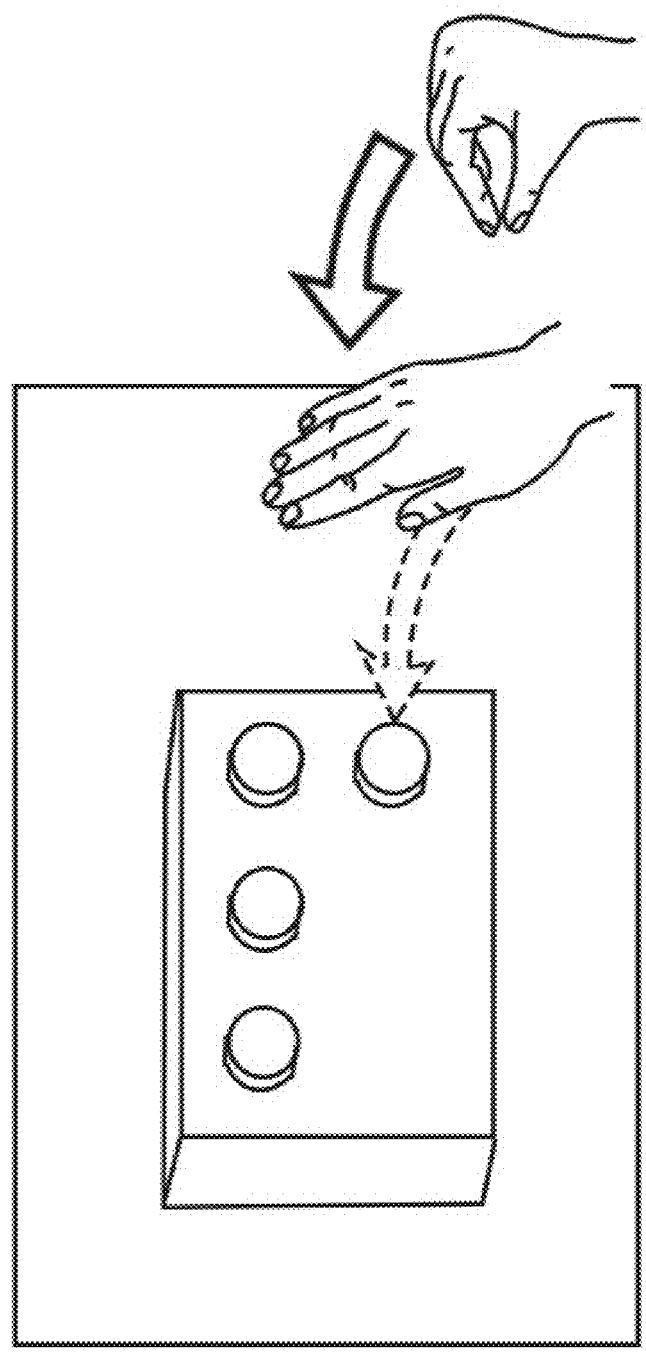
FIG. 46 is a representation of the generation of a repeating pattern from a single virtual shape or object based on a user's hand gestures.

In situations where repeating geometric patterns need to be embedded within a shape, suggestive gestures are used to enable a "copy-and-paste" functionality that allows users to disperse smaller shapes across the body of a larger one. In the example of FIG. 46, the user grabs the smaller shape and places copies of it at different regions of the larger shape by applying a throwing gesture towards such regions.

Figure 47:
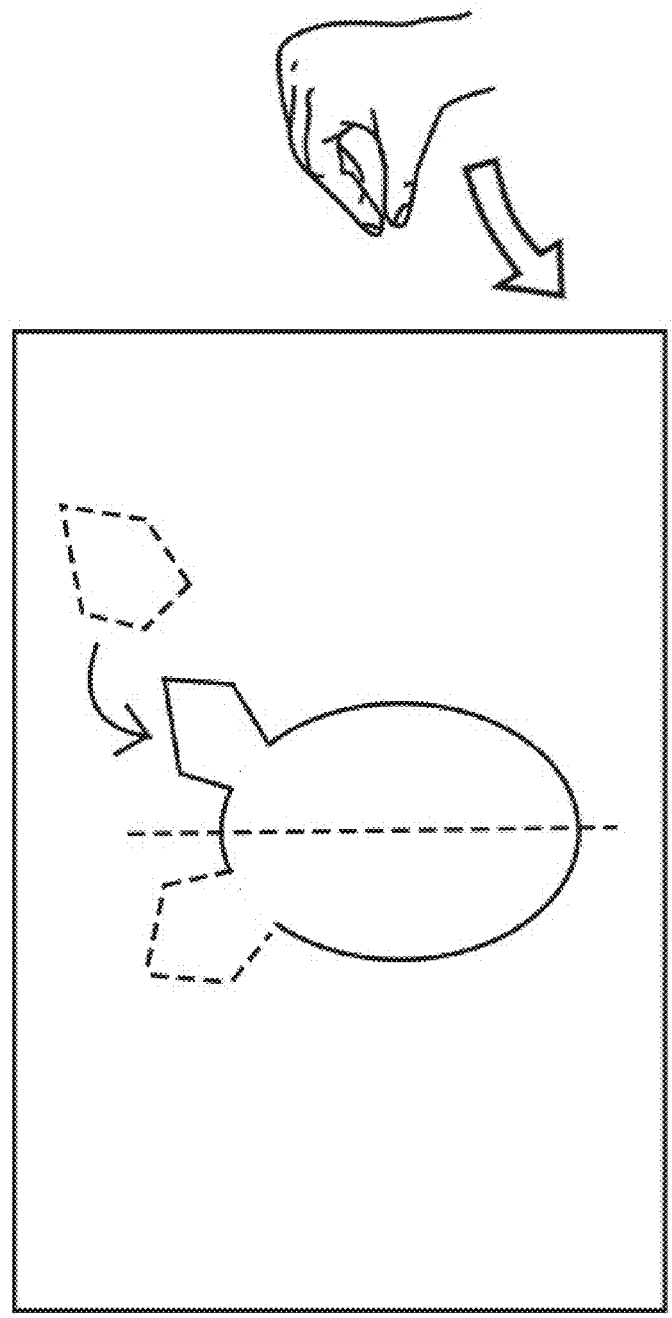
FIG. 47 is a representation of an automatic symmetrical generation of a combination of virtual shapes.

Shape symmetrization is used in the system to ensure structural stability and aesthetic appeal within the shapes created (FIG. 47). During a shape creation process, any new geometric entity that is added to a developing shape can have its symmetric counterpart determined in the symmetrization mode. This counterpart will be displayed within the developing shape as a visual suggestion which the user can decline by using a pinch and throw gesture or accept by doing nothing.

Figure 48:
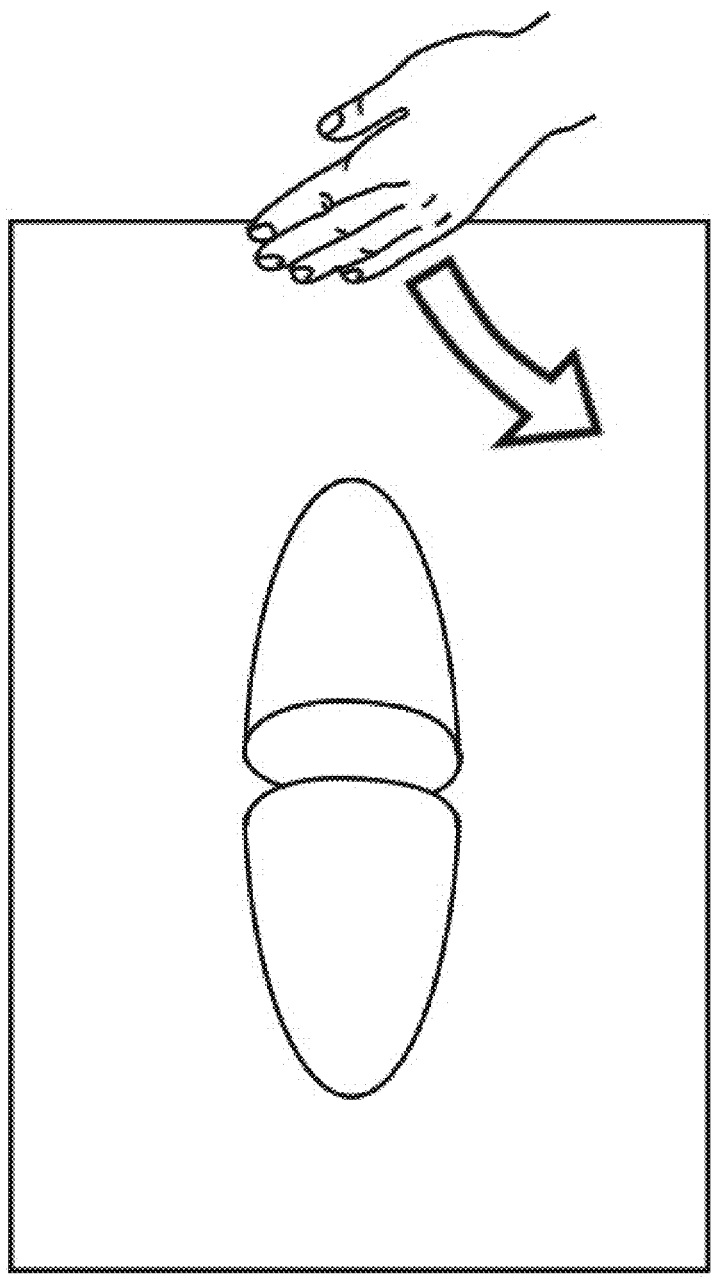
FIG. 48 is a representation of the dissection of a virtual shape or object using a slicing hand gesture according to one aspect of the present disclosure.

A shape can also be divided into two or more parts using a slicing hand gesture as shown in FIG. 48. The trajectory of the hand during this gesture is used to indicate the slicing profile.

Hand Gesture Based Shape Retrieval

Figure 49:
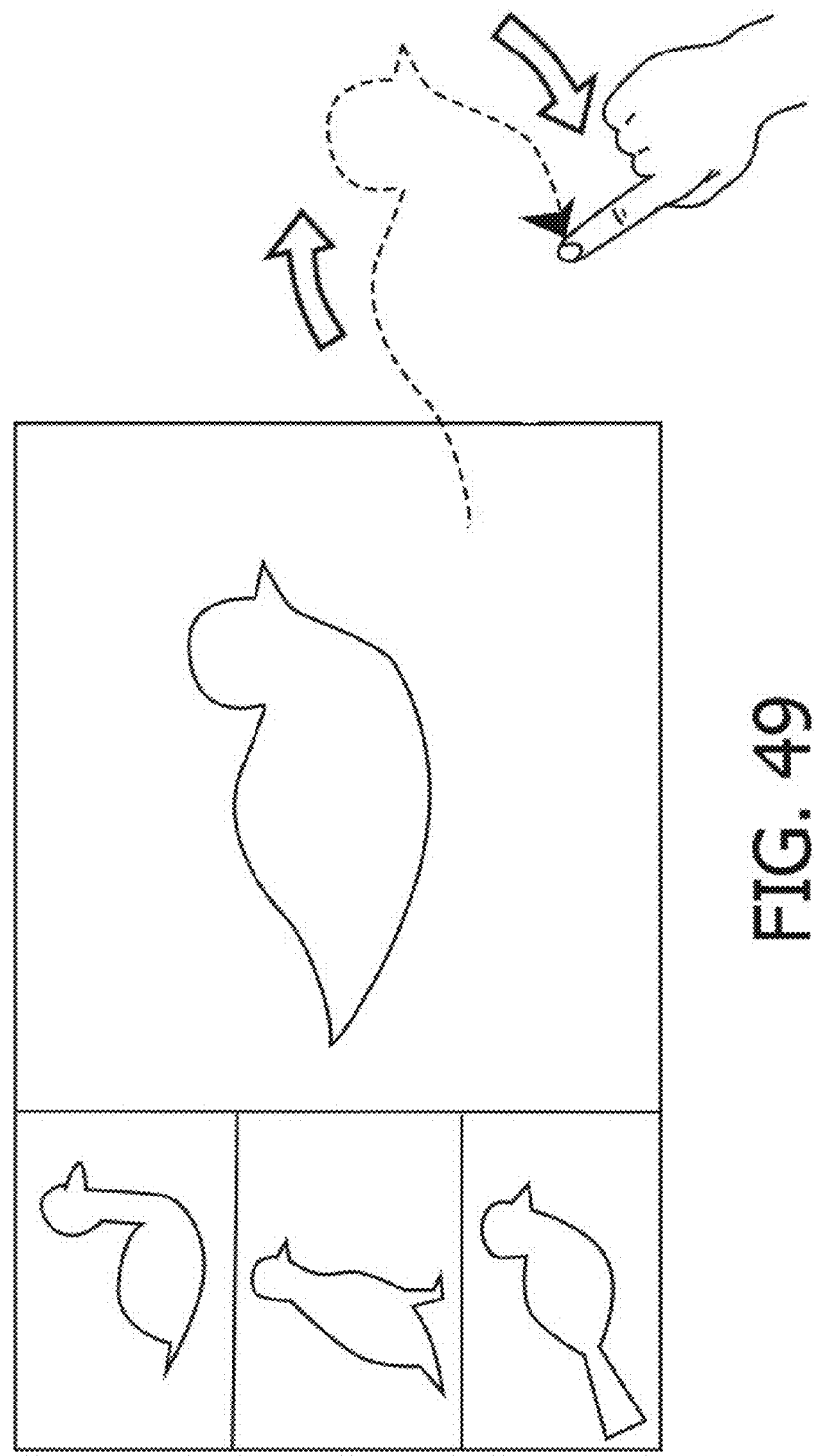
FIG. 49 is a representation of the use of a hand gesture to generate a query for a hand scribed shape for comparison to a shape data base, in accordance with one feature of the present disclosure.

In one embodiment, the system and method described herein may utilize a digital repository with a vast collection of pre-defined shapes. This repository can be expanded through the inclusion of new user defined shapes created by using the methods described above. During use of the present shape modeling system, any one of such stored shapes can be retrieved and reused for a given shape modeling task. Of course, the shape retrieval process is carried out using hand gestures. In one embodiment, a user roughly traces the outlines of an intended shape in air by using his hand(s). The hand trajectory recognition algorithm in the system then performs a shape search process where shapes that most closely resemble the traced outlines are retrieved from the repository and presented to the user for selection (FIG. 49).

Unified 2D and 3D Interactions within a Common Medium 2D and 3D shape modeling tasks within traditional natural user interfaces are based on the utilization of separate hardware and distinct modes of interactions. The present modeling system utilizes a single interface where a common set of hand gesture-based interactions can provide instructional input for creating both 2D and 3D shapes. In order to differentiate between creation of a 2D and 3D shape using a common hand gesture, the user can pre-specify the type of shape that is to be constructed. In order to switch between 2D and 3D shape creation modes, a user may extend a hand towards a virtual tab button located at the side of a visual interface. Upon reaching this button (as indicated by iconic and other visual cues in the display), the user "grabs" the button and pulls on it in an inward direction to indicate change of shape modeling mode. It can thus be appreciated that the present system can differentiate the intent behind a particular gesture based on whether the gesture occurs in proximity to the shape or slab, or whether the gesture occurs in a control region.

Moreover, the system is also provided with intelligent intent recognition capabilities that help identify the context within which a shape is being created. This feature automates selection of an appropriate shape creation mode based on the predominant activity being carried out in the user interface at a given instance. Since all tasks within the shape modeling system are carried out using hand gestures, the resulting interface is entirely hands free in nature. Consequently, the physical work space where the hand gestures are provided does not need to be fixed at one location (as long as the user stays within the visible range of the depth sensing camera). This work space is thus mobile and invariant to a user's physical orientation.

Hand Gesture Based Tools for Customizing Shapes

The present shape modeling system enables users to define various attributes and physical properties within the shapes created. Such characteristics primarily pertain to: (a) shape color; (b) imprinted or embossed images and patterns on shape surface; (c) material properties; and (d) shape textures. The assignment of these characteristics is performed using suggestive hand gestures. As described above, in order to color a shape, a user first hand picks a color from a color palette and then waves a hand over the shape surface in a manner that is analogous to a painting motion. To emboss or imprint a pattern on the surface of a shape, the user picks up a deformable sheet containing the pattern and places it direct over the surface. To apply a texture over a shape's surface, the user first selects a texture of interest from a pre-defined texture library. A 3D icon that resembles a texture roller is then grabbed and rubbed over the shape surface for texture application.

Methods and 3D Shape Interactions for Assembling Components for Creating 3D Objects The assembly of virtual shapes to create complex designs and systems has been extensively explored during the last three decades. Innovation in virtual assembly at a given time has always been confined to the computational capabilities, hardware sophistication, and input-output mechanisms available during that time. In prior approaches virtual assembly has been based primarily on computational methods that take inputs in the form of transformation parameters for assigning spatial relationship and graph-based data structures for representing inter component assembly constraints. With the advent of WIMP based systems that utilize mouse based graphical inputs, the assembly operations were capable of real time rendering of visual assembly output, assembly operations based on a mouse click over suggestive icons and descriptive menu items, and direct visual selection of geometric entities. However, these approaches suffer from the drawbacks discussed above, such as the requirement that the user think in terms of mathematical constraints, the imposition of excessive cognitive loads on the user to mentally translate 2D mouse motions to a 3D visualization, and the highly procedural nature of the 2D process.

Hand Gesture Based 3D Shape Assembly with Physically Relatable Experiences

Using the present systems and methods, virtual 3D shapes are simply picked up (virtually), brought together, and connected at an appropriate joining location. For precisely orienting assembly components, the system also allows application of relative positional constraints, such as parallelism and perpendicularity, between 3D shapes. Intuitive and suggestive hand gestures are used for specifying such constraints. Moreover, the system also enables creation of mobile joints, such as hinge joints, ball joints, pin joints and prismatic joints, for connecting non-stationary components in the assembly. These joints allow relative motion between the connecting shapes along specific linear or rotational directions. The specification of these joints is provided through metaphorical hand gestures. For example, to create a hinge joint between two shapes, the user places his open palm hands together along the inner edges and flaps it back and forth. The gesture recognition system evaluates the relative positions, postures and motion of the hands to identify the action as an indication for a hinge joint between two shapes.

Creation of an assembly that can be physically prototyped requires the constituent parts of the assembly to be constrained with respect to each another. The following constraints are the most commonly used options during the process of assembly modeling:

Parallelism—Vertical alignment—Insertion
Perpendicularity—Horizontal alignment—Coincidence
Tangency—Inter-surface mating
Concentricity—Alignment (axis, edge or surface)
Symmetric Placement—Offsetting (angular and linear)

Assembly constraints can be applied between two or more geometric objects or geometric entities (edge, surface, corners etc.). In the present gesture based assembly framework the following scheme is used to enable such constraint application:

1) Use of one hand for selecting the first geometric object or its entity that will be used in the constraint computation. The selection event is specified with a distinct gesture.
2) The same method is applied to the second object.
3) Once both constraint geometries or entities have been selected, the user provides a two handed gesture that corresponds to a specific constraint type.

Figure 51:
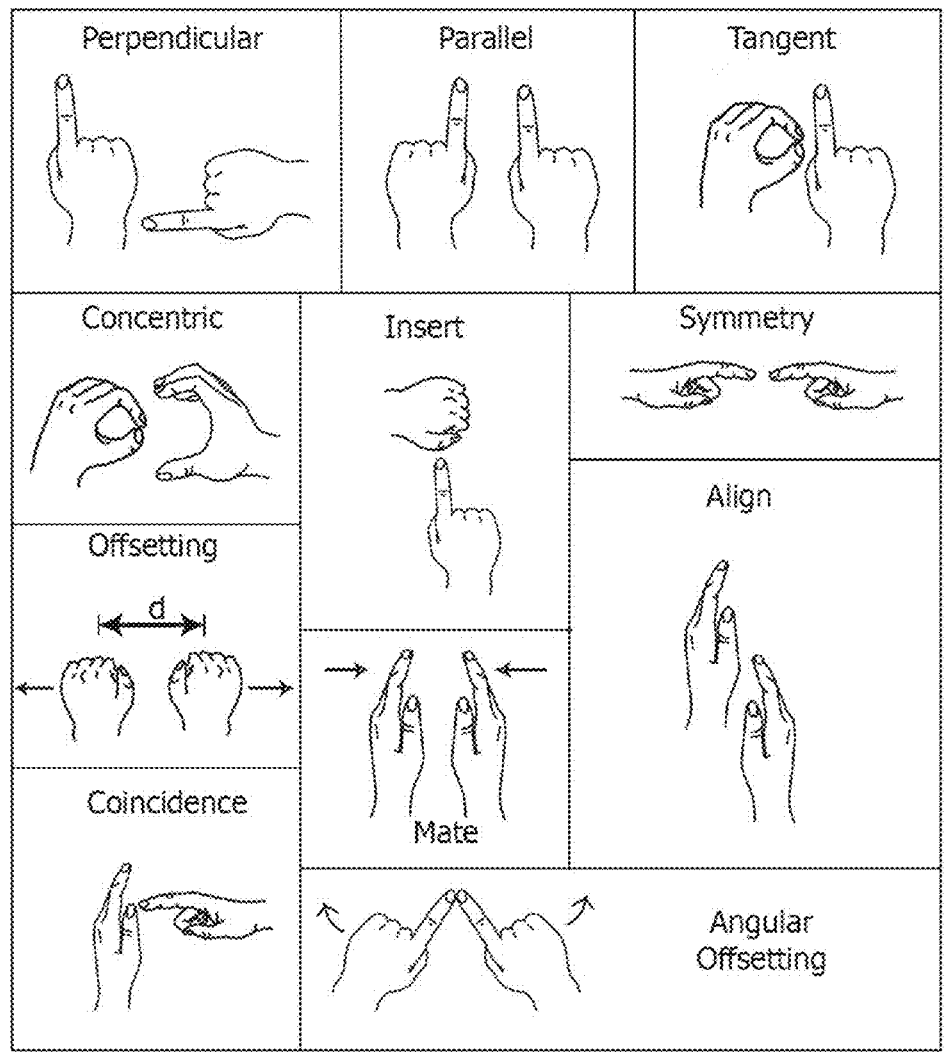
FIG. 51 is a catalog of hand gestures corresponding to pre-determined constraints for use in generating and manipulating virtual 3D shapes or objects according to the present disclosure.

FIG. 50 illustrates the process. Here the user is selecting two edges on two separate objects with one hand. The use then provides the system with the alignment gesture (using two hands) to indicate the intent that the two selected edges of the objects to be aligned. FIG. 51 depicts examples of hand based gestures that correspond to the application of specific constraints in one embodiment of the present system.

Snap Based Constraint Recognition Between Shapes for Smart Assembly

Figure 52:
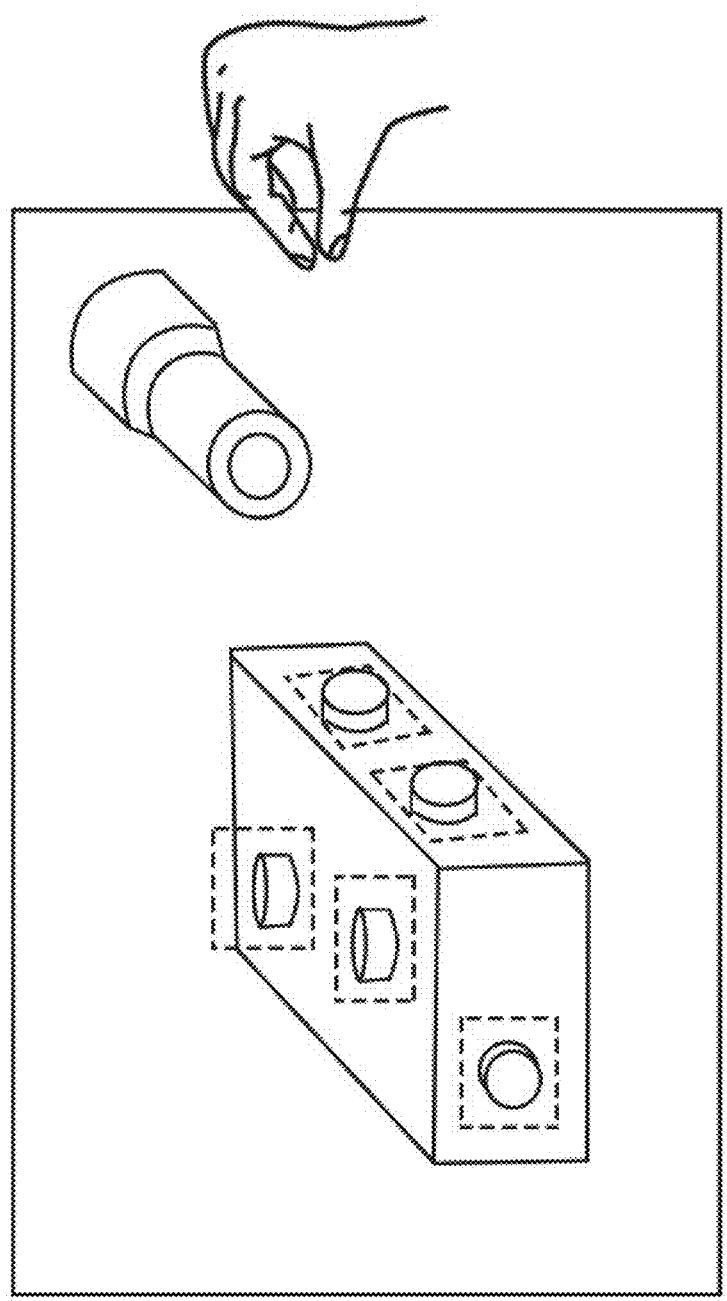
FIG. 52 is a representation of a smart assembly feature of the systems and methods disclosed herein based on pre-determined connectivities between 3D shapes or objects.
Figure 53:
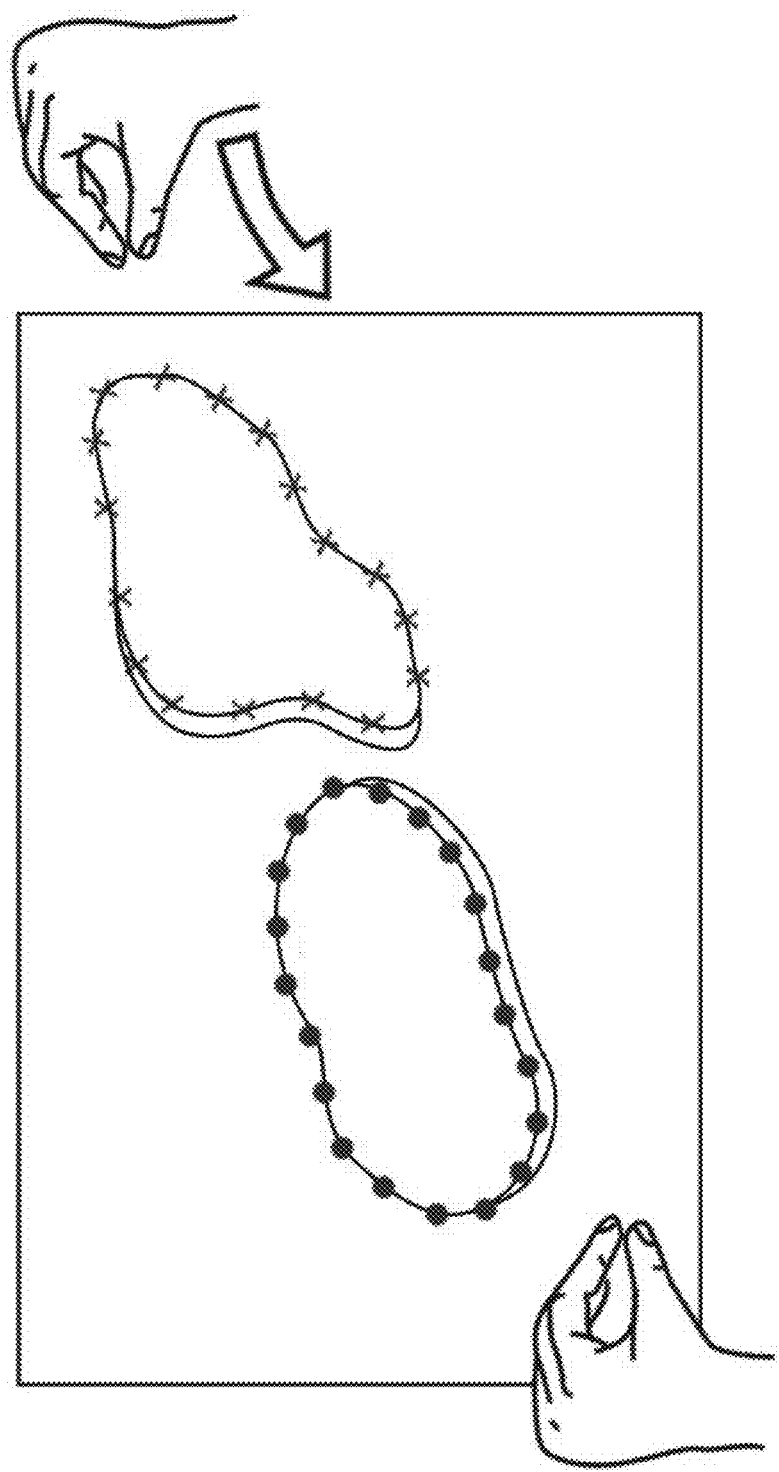
FIG. 53 is a representation of a smart assembly feature based on pre-determined snap engagements between 3D shapes or objects.

Complex assemblies require insertion of a large number of constraints between constituent components. Under such circumstances, manual application of individual constraints becomes a highly tedious process. In order to prevent such a scenario, the shape modeling system disclosed herein provides an intelligent assembly functionality that enables automatic constraint detection between two shapes being assembled. During an assembly task, the individual geometries of two shapes being assembled are analyzed to determine specific regions between the shapes where structurally stable connectivity can be established. Snapping points placed directly over such regions are used to visually indicate the possibility as illustrated in FIGS. 52, 53.

User's Skeleton Based Adaptive View Adjustment for 3D Shape Interactions

Within traditional shape modeling systems, the viewing orientation of the virtual 3D workspace can only be adjusted manually through the use of non-intuitive control widgets. To overcome this limitation, the systems and methods disclosed herein utilize the skeletal information of a user's body to perform automated real time view adjustments of the virtual 3D workspace for optimally displaying shapes and assemblies. Here, the physical head and hand positions of the user are evaluated to determine the orientation at which the user would be able to view the virtual objects if he was actually holding them in his hands. For instance, if the user is standing up and holding virtual objects at his waist level, the objects get displayed along an overhead orientation as illustrated in FIG. 54. Similarly, if the user is holding the virtual objects with extended hands at face level, the objects are displayed along a front view orientation as in FIG. 55. Moreover, the user can also choose to conveniently rotate the virtual objects for making certain regions of the objects more visible than others. The rotation of a shape is performed by a twisting gesture of the hand holding the virtual shape in a direction that indicates the desired rotation. As in all of the gesture-based processes described herein, the software within the system recognizes the context of the gesture and manipulates the virtual shape according to selected modes of operation.

Figure 56:
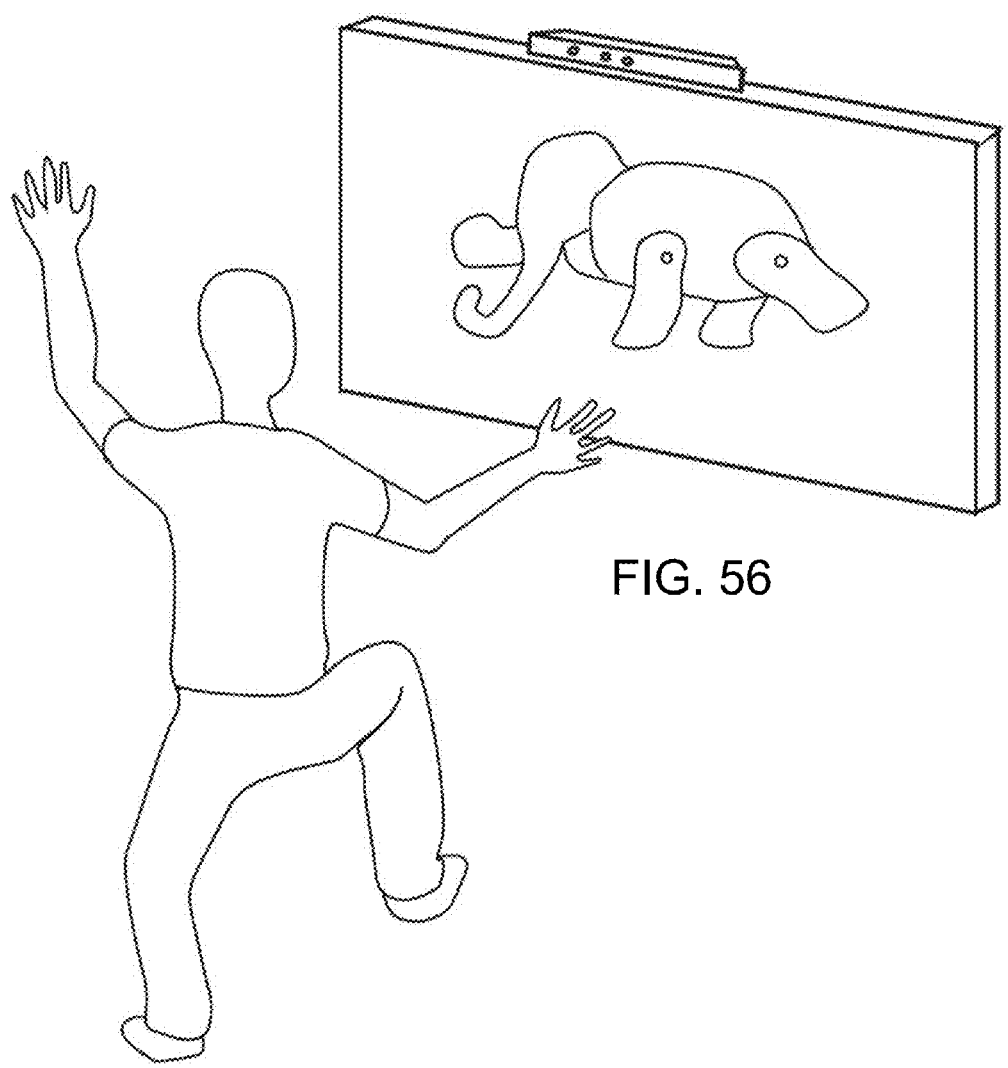
FIG. 56 is a representation of animation of a 3D assembly or object based on user motions according to a further feature of the systems and methods disclosed herein.

Methods for Simulating 3D Assemblies for Design Validation and Creative Animation User Motion Based Animation of 3D Assemblies The 3D assemblies created using shape modeling systems and methods described herein are amenable to animations within virtual environments. The relative motions between adjoining components of an assembly occur at connecting joints and the characteristics of such motions are governed by the type of joints being used. For example, a ball joint allows spherical rotation of a component around the point of connectivity, while a pin joint only permits rotation about the axis of the pin. For animating the assembly, the input parameters that define the motion of the assembly components are directly obtained from a user's physical actions. In this process, a skeletonization algorithm is first employed to determine an appropriate skeleton of the assembled object. Each link within the user's skeleton is then either automatically or manually associated with one or more links in the assembly skeleton. The automatic skeletal link associations are performed using a functionality detection algorithm that can identify semantically similar correspondences between the two skeletons. Movement of the user's body parts can thus stimulate analogous movement within the corresponding components in the assembly through the skeleton based association as illustrated in FIG. 56. During animation, the assembly constraints are not violated and the motions are allowed only along the directions enabled by the connecting joints.

Constraint and Joint Based Automatic Animation of 3D Assemblies

The motion capabilities of individual assembly components are defined based on the type of joint and constraints used for connecting them to the assembly. The 3D assemblies can thus be automatically animated through the use of such information. A user can pre-specify the initial state and position along with the motion parameters of each component.

Hand Gesture Based Behavioral Modeling of 3D Assemblies for Design Validation

In a further aspect of the present shape modeling system, a design simulation and verification tool is provided can be used for gaining insight into how an assembled 3D object will behave under real world conditions. This tool enables the following forms of analyses: (a) determination of an assembly's structural stability under the application of gravity and other potential environmental factors; (b) functionality checks on kinematic systems within an assembly; (c) fundamental static and stress analyses within the assembly components; (d) behavioral response of an assembly under application of external loads; and (e) efficacy of joints applied between components of an assembly. The results of the analyses are provided through visual means such as suggestive animations and iconic indicators that illustrate the behavioral responses and the validity of an assembly. The system also incorporates internal mechanisms for determining inherent design flaws within an assembly and providing visual suggestions to help designers modify the shapes and/or the connectivity of the assembly components in order to restore the physical legitimacy of the assembly. All interactions between the user and the interface during simulation and shape/assembly adjustment are conducted using hand gestures.

Visual Feedback During Shape Creation or Assembly

In our system when the user performs gestures and if the context is not correct, the system is capable of relating to the gesture to the context and make suggestions to the user visually and even help him. Examples include if the user attempts to rotate the object with the right pose but uses the hands inside the object, the system can suggest to him to try it outside the object to make rotation work. In a similar manner as the user attempts to assemble objects and is close with set threshold to the assembly constraints, the system can prompt completion of the action. Visual feedback directly relates to the parametric intent of the user or the meaningful gestures for correct ones and unintentional gestures for wrong ones. If users are attempting to use the wrong gestures the system can learn the pattern and provide suggestions.

What is claimed is:

1. A method for generating a three-dimensional shape in three-dimensional space comprising:
   defining a three-dimensional interaction space in the proximity of a user;
   visualizing the interaction space with a three-dimensional camera system operable to generate three-dimensional coordinate data corresponding to three-dimensional physical objects within the interaction space;
   interpreting a three-dimensional physical hand gesture of the user within the interaction space according to predetermined rules, the three-dimensional physical hand gesture including a movement of a three-dimensional physical object and wherein the interpreting is performed at low latency and includes detecting intended interactions using pattern mining, wherein the pattern mining selects relevant salient features by detecting frequent gesture patterns and discarding irrelevant features of the three-dimensional physical hand gesture, wherein the interpreting further includes applying a classification method to only the selected relevant salient features to obtain an interpretation of the three-dimensional physical hand gesture;
   generating or manipulating a virtual shape based upon the obtained interpretation of the three-dimensional physical hand gesture, the virtual shape residing virtually within the interaction space; and
   interactively displaying a representation of the virtual three-dimensional shape during the three-dimensional physical hand gesture.

2. The method of claim 1, further comprising interactively displaying a representation of the three-dimensional physical object during the three-dimensional physical hand gesture.

3. The method of claim 1, wherein the three-dimensional physical object is at least one hand of the user.

4. The method of claim 1, wherein the step of interpreting the three-dimensional physical hand gesture includes determining the context of the three-dimensional physical hand gesture in relation to the interaction space and/or virtual shape, wherein a different rule is applied to the same physical gesture in different contexts.

5. The method of claim 4, wherein the step of determining context includes determining the spatial proximity of a physical object to the virtual shape within the interaction space and determining the location of the physical object on the virtual surface of the virtual shape.

6. The method of claim 5, wherein the step of determining context includes determining the spatial distances using predefined thresholds between the virtual shape and the physical object in spatial proximity to the shape.

7. The method of claim 4, wherein the step of determining context includes determining whether the physical gesture is made simultaneously on one object or multiple objects in the interaction space.

8. The method of claim 4, wherein:
the physical gesture includes pointing with a finger of at least one hand of the user within the interaction space;
the context includes a determination that no virtual shape is present within the interaction space in proximity to the pointing fingers; and
the predetermined rule applied to the gesture in the context is that movement of the finger generates a three-dimensional shape.

9. The method of claim 4, wherein:
the physical gesture includes pointing with a finger of at least one hand of the user within the interaction space;
the context includes a determination that a virtual shape is present within the interaction space and that the pointing finger is in spatial proximity to a location on the virtual surface of the virtual shape; and
the predetermined rule applied to the gesture in the context is that movement of the finger modifies or manipulates the three-dimensional shape at the location.

10. The method of claim 9, wherein the pre-determined rule is that movement of the finger into the three-dimensional shape inwardly deforms the virtual surface of the shape at the location.

11. The method of claim 4, wherein:
the physical gesture includes pinching together two fingers of at least one hand of the user within the interaction space;
the context includes a determination that a virtual shape is present within the interaction space and that the pinched fingers are in spatial proximity to a location on the virtual surface of the virtual shape; and
the predetermined rule applied to the gesture in the context is that movement of the pinched fingers modifies or manipulates the three-dimensional shape at the location.

12. The method of claim 11, wherein the pre-determined rule is that movement of the finger away from the virtual surface of the three-dimensional shape outwardly deforms the virtual surface of the shape at the location.

13. The method of claim 4, wherein the context includes whether the virtual three-dimensional shape is being generated using previously stored data.

14. The method of claim 13, wherein the previously stored data includes predefined types of shapes generated by predetermined gestures.

15. The method of claim 1, wherein the step of interpreting a gesture includes interpreting a posture of the physical object and interpreting the movement of the physical object in the pose.

16. The method of claim 1, further comprising:
comparing the virtual shape to previously generated three-dimensional shapes maintained in a data base; and
displaying a representation of a previously-generated shape determined to be a match to the virtual shape.

17. The method of claim 1, further comprising generating a machine-readable output containing data defining the virtual three-dimensional shape.

18. The method of claim 1, wherein the virtual three-dimensional shape is generated using previously stored data.

19. The method of claim 1, wherein:
the three-dimensional physical gesture of the user includes a plurality of gestures within the interaction space during a time period, the plurality of three-dimensional gestures including meaningful gestures corresponding to an intent of the user and unintentional gestures; and
the step of interpreting the three-dimensional physical gesture includes recognizing the meaningful gestures from among the plurality of gestures.

20. The method of claim 19, further comprising training a processor to recognize the meaningful gestures based on core characteristics of predefined gestures.

21. The method of claim 20, wherein:
the core characteristic of a predefined gesture is unique among all of the predefined gestures; and
the step of recognizing the physical gesture occurs before the user completes a meaningful gesture corresponding to the predefined gesture having the unique core characteristic.

22. The method of claim 20, wherein the training includes applying a random forest algorithm to detect a core characteristic from among multiple instances of a meaningful gesture.

23. The method of claim 22, wherein a core characteristic is a frequent pattern of movement of the physical object creating the gesture.

24. The method of claim 23, wherein the frequent pattern is detected in the plurality of gestures by:
applying a multi-scale sliding time window during the plurality of gestures to generate a data set of gestures; and
then applying a random space partition scheme to the data set to find gestures that include the frequent pattern.

25. The method of claim 23, wherein:
the physical object is the user's hand(s), the gesture is the posture or pose of the user's hand(s) and the trajectory of movement of the hand(s) and the core characteristic is independent of the physical orientation of the posture or of the trajectory.

26. The method of claim 19, wherein the class of meaningful gestures to be recognized includes the subclass of gestures that are only the posture of the physical object, the subclass of gestures that are only the trajectory of movement of the physical object and the subclass of gestures that include posture and trajectory.

27. The method of claim 1, further comprising:
maintaining a data base of predetermined shape templates;
interpreting a physical gesture to conduct a search within the data base; and
interpreting a subsequent physical gesture to generate a shape; and
selecting a shape template within the data base corresponding to the generated shape.

28. The method of claim 1, further comprising:
providing a virtual navigation feature; and
interpreting a physical gesture to select a navigation command in the navigation feature.

29. The method of claim 28, wherein the physical gesture for the navigation feature occurs in the interaction space during the generation or manipulation of a virtual shape.

* * * * *